US011803784B2

(12) United States Patent
Bergdale et al.

(10) Patent No.: US 11,803,784 B2
(45) Date of Patent: Oct. 31, 2023

(54) SENSOR FUSION FOR TRANSIT APPLICATIONS

(71) Applicant: Bytemark, Inc., New York, NY (US)

(72) Inventors: Micah Bergdale, New York, NY (US); Edward Donovan, New York, NY (US); Michael O'Haire, Smithtown, NY (US); Nicholas Ihm, New York, NY (US); Ross Smith, Edinburgh (GB)

(73) Assignee: Siemens Mobility, Inc., New York, NY (US)

( * ) Notice: Subject to any disclaimer, the term of this patent is extended or adjusted under 35 U.S.C. 154(b) by 747 days.

(21) Appl. No.: 16/007,021

(22) Filed: Jun. 13, 2018

(65) Prior Publication Data

US 2018/0293523 A1    Oct. 11, 2018

Related U.S. Application Data

(63) Continuation-in-part of application No. 15/927,305, filed on Mar. 21, 2018, which is a
(Continued)

(51) Int. Cl.
*G06Q 10/02* (2012.01)
*G06Q 20/40* (2012.01)
(Continued)

(52) U.S. Cl.
CPC ......... *G06Q 10/025* (2013.01); *G06Q 20/405* (2013.01); *G06Q 20/40155* (2020.05);
(Continued)

(58) Field of Classification Search
CPC ............. G06Q 50/30; G06Q 10/06311; G06Q 10/047; G06Q 10/0833; G06Q 10/067; G06Q 30/0206; G06Q 30/0284
See application file for complete search history.

(56) References Cited

U.S. PATENT DOCUMENTS

| 4,193,114 A | 3/1980 | Benini |
| 5,253,166 A | 10/1993 | Dettelbach |

(Continued)

FOREIGN PATENT DOCUMENTS

| EP | 1439495 A1 | 7/2004 | |
| EP | 2991041 A2 * | 3/2016 | ............... G07C 9/10 |

(Continued)

OTHER PUBLICATIONS

Starnberger et al., "QR-TAN: Secure Mobile Transaction Authentication," area, pp. 578-583, 2009 International Conference on Availability, Reliability and Security, 2009.

(Continued)

*Primary Examiner* — Peter Ludwig

(57) ABSTRACT

A system and method in which various sensors collect and/or generate data that are analyzed to provide automated transit features. In the automatic capacity management feature, a transit operator is alerted of potential capacity issues in advance to enable the operator to handle the situation before a station or a vehicle reaches its capacity limit. The automatic trip planning feature allows a passenger to dynamically plan the fastest route to a destination according to real time data and historical data trends. The automatic fraud detection feature alerts a fare inspector to a ticket fraud or other fraudulent activity at a specific transit station or on a specific transit vehicle. The automatic vehicle routing feature dynamically routes autonomous transit vehicles to stations, notifies transit vehicle drivers to stop at a particular station, and/or notifies transit operators to route a vehicle to a particular station based on current and historical demand from passengers.

20 Claims, 13 Drawing Sheets

Related U.S. Application Data continuation-in-part of application No. 15/692,503, filed on Aug. 31, 2017, now Pat. No. 10,453,067, and a continuation-in-part of application No. 15/228,232, filed on Aug. 4, 2016, now Pat. No. 10,375,573.

(60) Provisional application No. 62/206,196, filed on Aug. 17, 2015.

(51) Int. Cl.

| | | |
|---|---|---|
| *G06Q 50/30* | (2012.01) | |
| *G07B 15/04* | (2006.01) | |
| *H04W 12/06* | (2021.01) | |
| *H04W 4/029* | (2018.01) | |
| *H04W 4/80* | (2018.01) | |
| *G07C 9/10* | (2020.01) | |
| *G07C 9/28* | (2020.01) | |
| *H04W 12/126* | (2021.01) | |
| *G07C 9/00* | (2020.01) | |
| *H04M 1/72412* | (2021.01) | |

(52) U.S. Cl.
CPC .............. *G06Q 50/30* (2013.01); *G07B 15/04* (2013.01); *G07C 9/10* (2020.01); *G07C 9/28* (2020.01); *H04W 4/029* (2018.02); *H04W 4/80* (2018.02); *H04W 12/06* (2013.01); *H04W 12/126* (2021.01); *G07C 2009/00769* (2013.01); *H04M 1/72412* (2021.01); *H04M 2250/12* (2013.01)

(56) References Cited

U.S. PATENT DOCUMENTS

| | | | |
|---|---|---|---|
| 5,465,084 A | 11/1995 | Cottrell | |
| 5,559,961 A | 9/1996 | Blonder | |
| 5,590,038 A | 12/1996 | Pitroda | |
| 5,621,797 A | 4/1997 | Rosen | |
| 5,777,305 A | 7/1998 | Smith | |
| 5,789,732 A | 8/1998 | McMahon | |
| 5,797,330 A | 8/1998 | Li | |
| 5,907,830 A | 5/1999 | Engel | |
| 5,918,909 A | 7/1999 | Fiala | |
| 6,023,679 A | 2/2000 | Acebo | |
| 6,023,688 A | 2/2000 | Ramachandran | |
| 6,085,976 A | 7/2000 | Sehr | |
| 6,175,922 B1 | 1/2001 | Wang | |
| 6,251,017 B1 | 6/2001 | Leason | |
| 6,315,195 B1 | 11/2001 | Ramachandran | |
| 6,373,587 B1 | 4/2002 | Sansone | |
| 6,393,305 B1 | 5/2002 | Ulvinen | |
| 6,454,174 B1 | 9/2002 | Sansone | |
| 6,473,739 B1 | 10/2002 | Showghi | |
| 6,484,182 B1 | 11/2002 | Dunphy | |
| 6,493,110 B1 | 12/2002 | Roberts | |
| 6,496,809 B1 | 12/2002 | Nakfoor | |
| 6,685,093 B2 | 2/2004 | Challa | |
| 6,775,539 B2 | 8/2004 | Deshpande | |
| 6,961,858 B2 | 11/2005 | Fransdonk | |
| 6,997,384 B2 | 2/2006 | Hara | |
| 7,017,806 B2 | 3/2006 | Peterson | |
| 7,020,635 B2 | 3/2006 | Hamilton | |
| 7,024,807 B2 | 4/2006 | Street | |
| 7,044,362 B2 | 5/2006 | Yu | |
| 7,080,049 B2 | 7/2006 | Truitt | |
| 7,090,128 B2 | 8/2006 | Farley | |
| 7,093,130 B1 | 8/2006 | Kobayashi | |
| 7,103,572 B1 | 9/2006 | Kawaguchi | |
| 7,107,462 B2 | 9/2006 | Fransdonk | |
| 7,134,087 B2 | 11/2006 | Bushold | |
| 7,150,045 B2 | 12/2006 | Koelle | |
| 7,158,939 B2 | 1/2007 | Goldstein | |
| 7,174,462 B2 | 2/2007 | Pering | |
| 7,191,221 B2 | 3/2007 | Schatz | |
| 7,263,506 B2 | 8/2007 | Lee | |
| 7,315,944 B2 | 1/2008 | Dutta | |
| 7,386,517 B1 | 6/2008 | Donner | |
| 7,392,226 B1 | 6/2008 | Sasaki | |
| 7,395,506 B2 | 7/2008 | Tan | |
| 7,493,261 B2 | 2/2009 | Chen | |
| 7,520,427 B2 | 4/2009 | Boyd | |
| 7,529,934 B2 | 5/2009 | Fujisawa | |
| 7,555,284 B2 | 6/2009 | Yan | |
| 7,567,910 B2 | 7/2009 | Hasegawa | |
| 7,587,502 B2 | 9/2009 | Crawford | |
| 7,617,975 B2 | 11/2009 | Wada | |
| 7,711,586 B2 | 5/2010 | Aggarwal | |
| 7,933,589 B1 | 4/2011 | Mamdani | |
| 7,967,211 B2 | 6/2011 | Challa | |
| 8,010,128 B2 | 8/2011 | Silverbrook | |
| 8,016,187 B2 | 9/2011 | Frantz | |
| 8,019,365 B2 | 9/2011 | Fisher | |
| 8,333,317 B2 | 12/2012 | Buer | |
| 8,370,180 B2 | 2/2013 | Scott | |
| 8,379,874 B1 | 2/2013 | Simon | |
| 8,457,354 B1 | 6/2013 | Kolar | |
| 8,473,342 B1 | 6/2013 | Roberts | |
| 8,494,967 B2 | 7/2013 | Bergdale | |
| 8,583,511 B2 | 11/2013 | Hendrickson | |
| 8,584,224 B1 | 11/2013 | Pei | |
| 8,788,836 B1 | 7/2014 | Hernacki | |
| 8,881,252 B2 | 11/2014 | Van Till | |
| 8,912,879 B2 | 12/2014 | Fyke | |
| 8,935,802 B1 | 1/2015 | Mattsson | |
| 9,037,388 B2 * | 5/2015 | McCrary | B60C 7/00 701/117 |
| 9,152,279 B2 | 10/2015 | Moberg | |
| 9,239,993 B2 | 1/2016 | Bergdale | |
| 9,557,183 B1 * | 1/2017 | Ross | G08G 1/096816 |
| 9,772,193 B1 * | 9/2017 | Mendelson | H04W 76/50 |
| 10,036,641 B1 * | 7/2018 | Iland | H04W 4/02 |
| 10,539,427 B2 * | 1/2020 | Fuchs | G01C 21/36 |
| 10,593,215 B2 * | 3/2020 | Villa | G08G 5/0043 |
| 2001/0005840 A1 | 6/2001 | Verkama | |
| 2001/0014870 A1 | 8/2001 | Saito | |
| 2001/0016825 A1 | 8/2001 | Pugliese | |
| 2001/0037174 A1 | 11/2001 | Dickerson | |
| 2001/0044324 A1 | 11/2001 | Carayiannis | |
| 2001/0051787 A1 | 12/2001 | Haller | |
| 2001/0052545 A1 | 12/2001 | Serebrennikov | |
| 2001/0054111 A1 | 12/2001 | Lee | |
| 2002/0010603 A1 | 1/2002 | Doi | |
| 2002/0016929 A1 | 2/2002 | Harashima | |
| 2002/0023027 A1 | 2/2002 | Simonds | |
| 2002/0040308 A1 | 4/2002 | Hasegawa | |
| 2002/0040346 A1 | 4/2002 | Kwan | |
| 2002/0060246 A1 | 5/2002 | Gobburu | |
| 2002/0065713 A1 | 5/2002 | Awada | |
| 2002/0065783 A1 | 5/2002 | Na | |
| 2002/0090930 A1 | 7/2002 | Fujiwara | |
| 2002/0094090 A1 | 7/2002 | Iino | |
| 2002/0126780 A1 | 9/2002 | Oshima | |
| 2002/0138346 A1 | 9/2002 | Kodaka | |
| 2002/0145505 A1 | 10/2002 | Sata | |
| 2002/0184539 A1 | 12/2002 | Fukuda | |
| 2002/0196274 A1 | 12/2002 | Comfort | |
| 2003/0036929 A1 | 2/2003 | Vaughan | |
| 2003/0066883 A1 | 4/2003 | Yu | |
| 2003/0069763 A1 | 4/2003 | Gathman | |
| 2003/0069827 A1 | 4/2003 | Gathman | |
| 2003/0093695 A1 | 5/2003 | Dutta | |
| 2003/0105641 A1 | 6/2003 | Lewis | |
| 2003/0105954 A1 | 6/2003 | Immonen | |
| 2003/0105969 A1 | 6/2003 | Matsui | |
| 2003/0154169 A1 | 8/2003 | Yanai | |
| 2003/0163787 A1 | 8/2003 | Hay | |
| 2003/0172037 A1 | 9/2003 | Jung | |
| 2003/0200184 A1 | 10/2003 | Dominguez | |
| 2003/0229790 A1 | 12/2003 | Russell | |
| 2003/0233276 A1 | 12/2003 | Pearlman | |
| 2004/0019564 A1 | 1/2004 | Goldthwaite | |
| 2004/0019792 A1 | 1/2004 | Funamoto | |
| 2004/0030081 A1 | 2/2004 | Hegi | |

(56) References Cited

U.S. PATENT DOCUMENTS

| | | |
|---|---|---|
| 2004/0030091 A1 | 2/2004 | McCullough |
| 2004/0030658 A1 | 2/2004 | Cruz |
| 2004/0039635 A1 | 2/2004 | Linde |
| 2004/0085351 A1 | 5/2004 | Tokkonen |
| 2004/0101158 A1 | 5/2004 | Butler |
| 2004/0111373 A1 | 6/2004 | Iga |
| 2004/0128509 A1 | 7/2004 | Gehrmann |
| 2004/0148253 A1 | 7/2004 | Shin |
| 2004/0169589 A1 | 9/2004 | Lea |
| 2004/0186884 A1 | 9/2004 | Dutordoir |
| 2004/0210476 A1 | 10/2004 | Blair |
| 2004/0224703 A1 | 11/2004 | Takaki |
| 2004/0250138 A1 | 12/2004 | Schneider |
| 2005/0059339 A1 | 3/2005 | Honda |
| 2005/0060554 A1 | 3/2005 | ODonoghue |
| 2005/0070257 A1 | 3/2005 | Saarinen |
| 2005/0108912 A1 | 5/2005 | Bekker |
| 2005/0109838 A1 | 5/2005 | Linlor |
| 2005/0111723 A1 | 5/2005 | Hannigan |
| 2005/0116030 A1 | 6/2005 | Wada |
| 2005/0137889 A1 | 6/2005 | Wheeler |
| 2005/0204140 A1 | 9/2005 | Maruyama |
| 2005/0212760 A1 | 9/2005 | Marvit |
| 2005/0240589 A1 | 10/2005 | Altenhofen |
| 2005/0246634 A1 | 11/2005 | Ortwein |
| 2005/0252964 A1 | 11/2005 | Takaki |
| 2005/0253817 A1 | 11/2005 | Rytivaara |
| 2005/0272473 A1 | 12/2005 | Sheena |
| 2005/0283444 A1 | 12/2005 | Ekberg |
| 2006/0120607 A1 | 6/2006 | Lev |
| 2006/0161446 A1 | 7/2006 | Fyfe |
| 2006/0174339 A1 | 8/2006 | Tao |
| 2006/0206724 A1 | 9/2006 | Schaufele |
| 2006/0206728 A1 | 9/2006 | Masuda |
| 2006/0206926 A1 | 9/2006 | Luo |
| 2006/0293929 A1 | 12/2006 | Wu |
| 2007/0012765 A1 | 1/2007 | Trinquet |
| 2007/0017979 A1 | 1/2007 | Wu |
| 2007/0022058 A1 | 1/2007 | Labrou |
| 2007/0032225 A1 | 2/2007 | Konicek |
| 2007/0136213 A1 | 6/2007 | Sansone |
| 2007/0150842 A1 | 6/2007 | Chaudhri |
| 2007/0156443 A1 | 7/2007 | Gurvey |
| 2007/0174467 A1* | 7/2007 | Ballou, Jr. ......... H04L 63/0838 709/227 |
| 2007/0192590 A1 | 8/2007 | Pomerantz |
| 2007/0215687 A1 | 9/2007 | Waltman |
| 2007/0260543 A1 | 11/2007 | Chappuis |
| 2007/0265891 A1 | 11/2007 | Guo |
| 2007/0271455 A1 | 11/2007 | Nakano |
| 2007/0273514 A1 | 11/2007 | Winand |
| 2007/0276944 A1 | 11/2007 | Samovar |
| 2007/0283049 A1 | 12/2007 | Rakowski |
| 2007/0288319 A1 | 12/2007 | Robinson |
| 2008/0007388 A1 | 1/2008 | Au |
| 2008/0071587 A1 | 3/2008 | Granucci |
| 2008/0071637 A1 | 3/2008 | Saarinen |
| 2008/0120127 A1 | 5/2008 | Stoffelsma |
| 2008/0120186 A1 | 5/2008 | Jokinen |
| 2008/0154623 A1 | 6/2008 | Derker |
| 2008/0191009 A1 | 8/2008 | Gressel |
| 2008/0191909 A1 | 8/2008 | Mak |
| 2008/0195257 A1* | 8/2008 | Rauch .................... G08G 1/127 701/1 |
| 2008/0201212 A1 | 8/2008 | Hammad |
| 2008/0201576 A1 | 8/2008 | Kitagawa |
| 2008/0201769 A1 | 8/2008 | Finn |
| 2008/0227518 A1 | 9/2008 | Wiltshire |
| 2008/0263077 A1 | 10/2008 | Boston |
| 2008/0288302 A1 | 11/2008 | Daouk |
| 2008/0308638 A1 | 12/2008 | Hussey |
| 2009/0055288 A1 | 2/2009 | Nassimi |
| 2009/0083184 A1 | 3/2009 | Eisen |
| 2009/0088077 A1 | 4/2009 | Brown |
| 2009/0125387 A1 | 5/2009 | Mak |
| 2009/0222900 A1 | 9/2009 | Benaloh |
| 2009/0284482 A1 | 11/2009 | Chin |
| 2010/0017872 A1 | 1/2010 | Goertz |
| 2010/0044444 A1 | 2/2010 | Jain |
| 2010/0082491 A1 | 4/2010 | Rosenblatt |
| 2010/0121766 A1 | 5/2010 | Sugaya |
| 2010/0201536 A1 | 8/2010 | Robertson |
| 2010/0211452 A1 | 8/2010 | DAngelo |
| 2010/0219234 A1 | 9/2010 | Forbes |
| 2010/0228563 A1 | 9/2010 | Walker, Jr. |
| 2010/0228576 A1 | 9/2010 | Marti |
| 2010/0253470 A1 | 10/2010 | Burke |
| 2010/0268649 A1 | 10/2010 | Roos |
| 2010/0274691 A1 | 10/2010 | Hammad |
| 2010/0279610 A1 | 11/2010 | Bjorhn |
| 2010/0306718 A1 | 12/2010 | Shim |
| 2010/0308959 A1 | 12/2010 | Schorn |
| 2010/0322485 A1 | 12/2010 | Riddiford |
| 2011/0001603 A1 | 1/2011 | Willis |
| 2011/0040585 A1 | 2/2011 | Roxburgh |
| 2011/0068165 A1 | 3/2011 | Dabosville |
| 2011/0078440 A1 | 3/2011 | Feng |
| 2011/0136472 A1 | 6/2011 | Rector |
| 2011/0153495 A1* | 6/2011 | Dixon .................... G06Q 20/10 705/39 |
| 2011/0163896 A1* | 7/2011 | Chinigo ................ G08B 17/00 340/945 |
| 2011/0208418 A1 | 8/2011 | Looney |
| 2011/0251910 A1 | 10/2011 | Dimmick |
| 2011/0283241 A1 | 11/2011 | Miller |
| 2011/0307381 A1 | 12/2011 | Kim |
| 2011/0311094 A1 | 12/2011 | Herzog |
| 2012/0006891 A1 | 1/2012 | Zhou |
| 2012/0030047 A1 | 2/2012 | Fuentes |
| 2012/0092190 A1 | 4/2012 | Stefik |
| 2012/0129503 A1 | 5/2012 | Lindeman |
| 2012/0133484 A1 | 5/2012 | Griffin |
| 2012/0136698 A1 | 5/2012 | Kent |
| 2012/0166298 A1 | 6/2012 | Smith |
| 2012/0245769 A1 | 9/2012 | Creissels |
| 2012/0330697 A1 | 12/2012 | Smith |
| 2013/0103200 A1 | 4/2013 | Tucker |
| 2013/0124236 A1 | 5/2013 | Chen |
| 2013/0194202 A1 | 8/2013 | Moberg |
| 2013/0204647 A1 | 8/2013 | Behun |
| 2013/0214906 A1 | 8/2013 | Wojak |
| 2013/0246301 A1* | 9/2013 | Radhakrishnan .. G06Q 30/0282 705/347 |
| 2013/0279757 A1 | 10/2013 | Kephart |
| 2013/0307990 A1 | 11/2013 | Wiles |
| 2014/0086125 A1 | 3/2014 | Polo |
| 2014/0100896 A1 | 4/2014 | Du |
| 2014/0156318 A1 | 6/2014 | Behun |
| 2014/0186050 A1 | 7/2014 | Oshima |
| 2014/0279558 A1 | 9/2014 | Kadi |
| 2015/0025921 A1 | 1/2015 | Smith |
| 2015/0084741 A1 | 3/2015 | Bergdale |
| 2015/0161564 A1* | 6/2015 | Sweeney ........ G06Q 10/063114 705/338 |
| 2015/0213443 A1 | 7/2015 | Geffon |
| 2015/0213660 A1 | 7/2015 | Bergdale |
| 2015/0317841 A1 | 11/2015 | Karsch |
| 2016/0042631 A1 | 2/2016 | Ho |
| 2016/0055605 A1 | 2/2016 | Kim |
| 2016/0071095 A1* | 3/2016 | Foerster ................ G06Q 20/20 705/65 |
| 2016/0093127 A1 | 3/2016 | Evans |
| 2016/0334235 A1* | 11/2016 | Gustafson .......... G01C 21/3423 |
| 2016/0358391 A1 | 12/2016 | Drako |
| 2017/0055157 A1 | 2/2017 | Bergdale |
| 2017/0372289 A1 | 12/2017 | Fitzsimmons |
| 2019/0066411 A1* | 2/2019 | Behroozina .......... G06Q 10/20 |
| 2019/0124619 A1* | 4/2019 | Arumugam .......... H04W 4/025 |

(56) References Cited

U.S. PATENT DOCUMENTS

2019/0271552 A1* 9/2019 Choi .................. G01C 21/3438
2020/0088532 A1* 3/2020 Hajj ..................... G08G 1/0125

FOREIGN PATENT DOCUMENTS

| | | |
|---|---|---|
| GB | 2390211 | 12/2003 |
| GB | 2417358 | 2/2006 |
| JP | H11145952 A | 5/1999 |
| JP | 2003187272 A | 7/2003 |
| RU | 94931 | 6/2010 |
| TW | 200825968 A | 6/2008 |
| WO | 2007139348 A1 | 12/2007 |
| WO | 2008113355 | 9/2008 |
| WO | 2009141614 | 11/2009 |
| WO | 2011044899 | 4/2011 |
| WO | 2014043810 | 3/2014 |
| WO | 2014189068 | 11/2014 |
| WO | 2016105322 | 6/2016 |

OTHER PUBLICATIONS

Scott Boyter, "Aeritas tried to fill void until 3G wireless is ready; Mobile boarding pass is just one application being tested", all pages, Dallaw Forth Worth TechBiz, Feb. 19, 2001.
Joanna Elachi, "Lufthansa Debuts Barcode Check-in And Boarding", all pages, CommWeb.com, May 25, 2001.
"Aeritas launches secure wireless check-in with barcode", all pages, m-Travel.com, Nov. 9, 2001.
"Aeritas Launches Wireless Check-in and Security Service", all pages, MBusiness Daily, Nov. 8, 2001.
"New Fast Track Wireless Check-In and Security Solution", all pages, aerias.com, retrieved Feb. 5, 2002.
Hussin, W.H.; Coulton, P; Edwards, R., "Mobile ticketing system employing TrustZone technology" Jul. 11-13, 2005.
Jong-Sik Moon; Sun-Ho Lee; Im-Yeong Lee; Sang-Gu Byeon, "Authentication Protocol Using Authorization Ticket in Mobile Network Service Environment" Aug. 11-13, 2010.
Stephanie Bell, "UK Rail Network to Launch Mobile Train-Ticketing Application" Cardline, Feb. 4, 2011.
Ko Fujimura, Yoshiaki Nakajima, Jun Sekine: "XML Ticket: Generalized Digital Ticket Definition Language" Proceedings of the 3rd Usenix Workshop on Electronic Commerce, Sep. 3, 1998.
Chun-Te Chen; Te Chung Lu, "A mobile ticket validation by VSS teach with timestamp" Mar. 28-31, 2004.
Improvement of urban passenger transport ticketing systems by deploying intelligent transport systems, 2006.
Machine English translation of JP2003-187272A from U.S. Appl. No. 13/901,243.
Search report from PCT/US18/56829 dated Mar. 7, 2019.
The Hindustan Times "Computerised Rail Reservation" New Delhi; Nov. 28, 2007 (Year: 2007).
Search Report from PCT/2018/031552 dated Oct. 3, 2018.
Search report from PCT/US17/56723 dated Jan. 2, 2018.
Search report from PCT/US16/45516 dated Oct. 24, 2016.
EDTX Case 2:16-cv-00543 Judgment dated as filed Feb. 7, 2019.
EDTX Case 2:16-cv-00543 Report and recommendation dated as filed Nov. 26, 2018.
US Court of Appeals for Federal Circuit Brief for Appellant filed Apr. 29, 2019 (Case No. 2019-1442).
US Court of Appeals for Federal Circuit Brief for Appellee filed Jun. 10, 2019 (Case No. 19-1442).
U.S. Court of Appeals for Federal Circuit Reply Brief for Appellant filed Jul. 1, 2019 (Case No. 2019-1442).

* cited by examiner

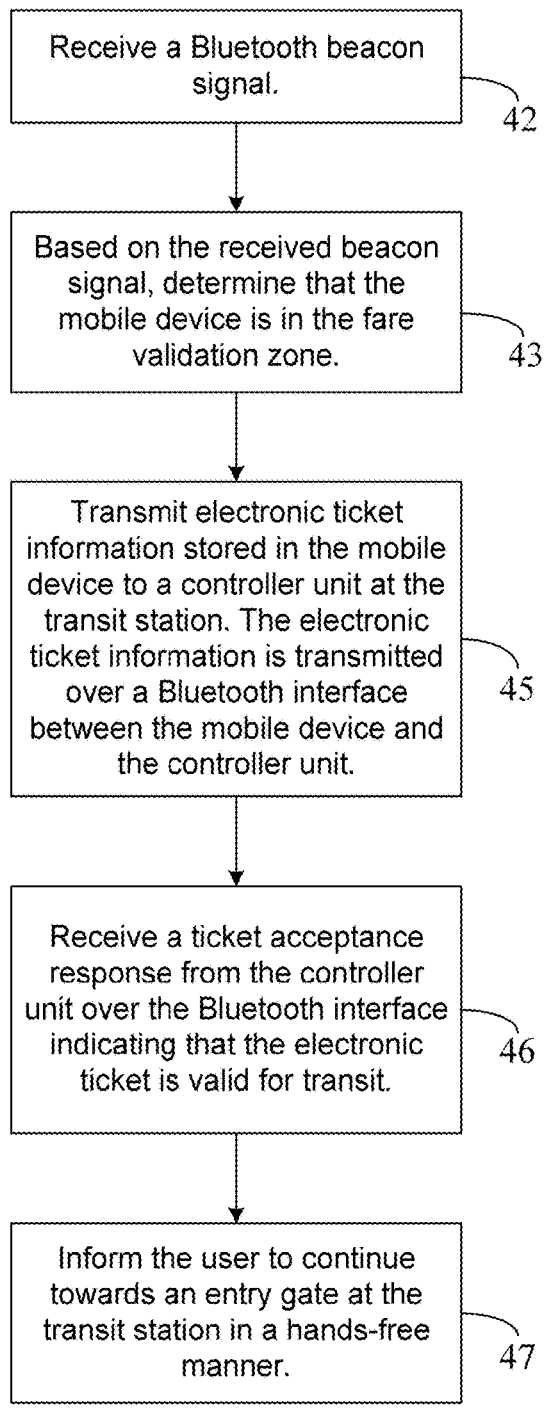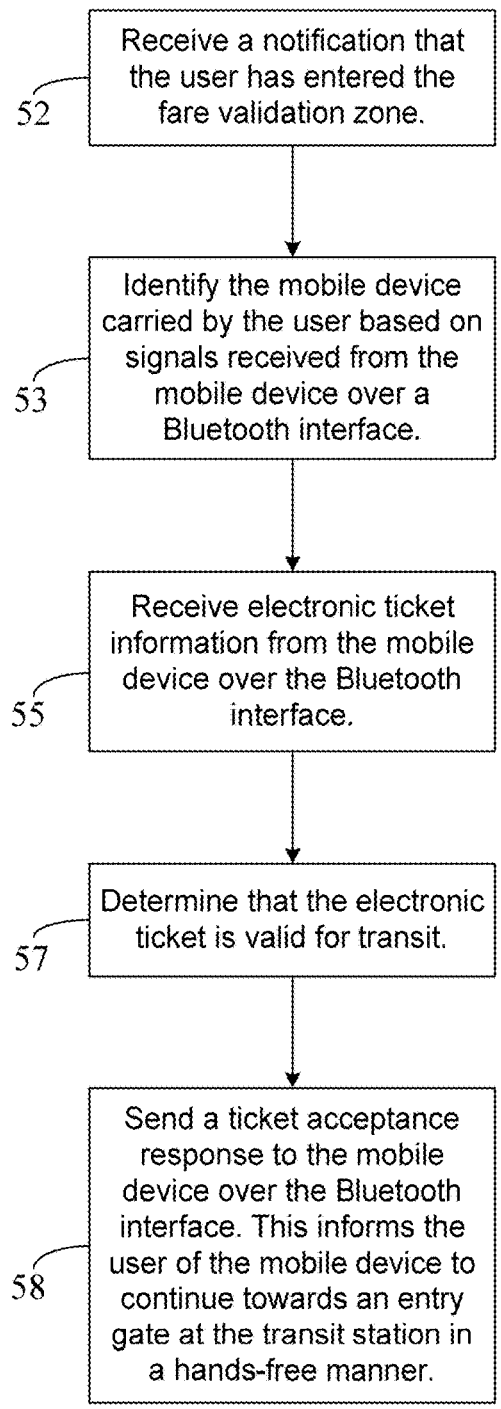
FIG. 3
FIG. 4

Mobile Device

110 — Determine that the mobile device is in proximity of a gateless entry location for a transit service.

112 — Transmit a plurality of Bluetooth advertisement packets to a gateway unit at a first transmission rate over a Bluetooth interface. Each advertisement packet contains data indicating that the mobile device is configured for gateless entry for the transit service.

114 — Communicate with the gateway unit receiving the plurality of Bluetooth advertisement packets to facilitate authentication of the mobile device.

116 — Upon authentication of the mobile device, transmit transit data to the gateway unit using a plurality of Bluetooth data packets at a second transmission rate over the Bluetooth interface. The transit data includes: a device-specific value to uniquely identify the mobile device and determine a location thereof, and a secure token to facilitate validation of an electronic ticket stored in the mobile device for the transit service.

118 — Inform the user to avail the transit service through the gateless entry location.

FIG. 9 (108)

Control Unit

122 — Authenticate the mobile device using Bluetooth-based messaging with the mobile device over a Bluetooth interface.

124 — Upon authentication of the mobile device, receive transit data from the mobile device over the Bluetooth interface. The transit data includes: a device-specific value to uniquely identify the mobile device and determine a location thereof, and a secure token to facilitate validation of an electronic ticket stored in the mobile device for the transit service.

126 — Based on the secure token, determine that the electronic ticket is valid for transit.

128 — Provide the device-specific value to a positioning unit to enable the positioning unit to uniquely identify the mobile device and determine the location thereof.

130 — Receive a timestamped location data for the mobile device from the positioning unit.

132 — Based on the timestamped location data, determine that the user is entering a gateless entry point for the transit service.

134 — Allow the user to avail the transit service through the gateless entry point.

FIG. 10 (120)

Control Unit

182 — Receive sensor data from a plurality of sensors in the transit system. The control unit is communicatively coupled with the sensors. Each sensor-specific portion of the sensor data includes at least one of the following: (i) a sensor-specific passenger data defining one or more attributes of a user availing a transit service in the transit system, (ii) a sensor-specific vehicle data defining one or more attributes of a transit vehicle associated with the transit service, and (iii) a sensor-specific station data defining one or more attributes of a transit station associated with the transit service.

184 — Combine received sensor-specific passenger data to generate a system-specific passenger data, received sensor-specific vehicle data to generate a system-specific vehicle data, and received sensor-specific station data to generate a system-specific station data.

186 — Analyze the system-specific passenger data, the system-specific vehicle data, and the system-specific station data.

188 — Perform at least one of the following based on the analysis of the system-specific passenger data, the system-specific vehicle data, and the system-specific station data: (i) facilitate management of passenger-handling capacity of at least one of the transit station and the transit vehicle, (ii) dynamically plan a trip for the user availing the transit service, (iii) facilitate detection of fraud for the transit service, and (iv) dynamically plan a route for the transit vehicle.

SENSOR FUSION FOR TRANSIT APPLICATIONS

CROSS-REFERENCE TO RELATED APPLICATIONS

This application is a continuation-in-part of and claims the priority benefit under 35 U.S.C. § 120 of the U.S. patent application Ser. No. 15/927,305 filed on Mar. 21, 2018, which is a continuation-in-part of and claims the priority benefit under 35 U.S.C. §120 of the U.S. patent application Ser. No. 15/692,503 filed Aug. 31, 2017 and is a continuation-in-part and claims the priority benefit under 35 U.S.C. § 120 of the U.S. patent application Ser. No. 15/228,232 filed on Aug. 4, 2016, which, in turn, claims the priority benefit under 35 U.S.C. § 119(e) of U.S. Provisional Application No. 62/206,196 filed on Aug. 17, 2015. The disclosures of all of these prior applications are incorporated herein by reference in their entireties.

TECHNICAL FIELD

The present disclosure generally relates to automated transit planning and management. More particularly, and not by way of limitation, particular embodiments of the present disclosure are directed to a system and method in which sensor fusion is used to accomplish automatic capacity management, trip planning, fraud detection, and vehicle routing in a transit system.

BACKGROUND

Many transit stations, such as train platforms or bus terminals, routinely employ automatic fare validation (or ticket validation) systems to improve user experience and increase the throughput of passengers through, for example, fare gates to and from the train platforms. Modern technical advances, such as smartcards, two-dimensional (2D) barcodes, and Near Field Communication (NFC) capable mobile devices, have reduced passenger ingress and egress time through fare gates. Smartcards can be either contact or contactless, and can provide personal identification, authentication, data storage, and application processing. NFC-enabled portable devices can be provided with apps, for example, to read electronic tags or make a transaction when connected to an NFC-compliant apparatus.

SUMMARY

Although the above-mentioned technical advances have reduced passenger ingress and egress times through fare gates, passenger throughput is still hampered by passengers having to search for their smartcards or getting out their mobile phones (for example, to establish an NFC contact).

It is therefore desirable to improve the process of automated fare validation and to also improve the passenger throughput through a fare gate at a transit station. It is further desirable to perform ticket validation "hands free" and, in a gateless environment, to facilitate gateless entry/exit for a transit service in an automated, hands-free manner. Furthermore, in an advanced transit system, it is also desirable to accomplish automatic capacity management of a transit station and/or a transit vehicle in the transit system, automatic trip planning for a passenger, automatic fraud detection in the transit system, and/or automatic vehicle routing in the transit system.

As a solution, particular embodiments of the present disclosure provide for a hands-free process of automated fare validation and gateless entry/exit. In particular embodiments, the Bluetooth technology may be used in conjunction with a user application on a mobile device to facilitate such hands-free operations. In one embodiment, the solution may comprise a mobile app for the passenger and an add-on box that interfaces to a compliant fare gate. Bluetooth beacons may be used to determine a passenger's proximity to the gate and camera-like devices may interface to the add-on box to determine whether a passenger (perhaps without a smartphone) has entered the fare gate. According to particular embodiments of the present disclosure, a user with a valid ticket may simply walk through the fare gate "hands free" without the need to search for a physical ticket or a smartcard or a mobile phone. This hassle-free approach may significantly improve the user experience and passenger throughput through fare gates. In another embodiment, positioning locators and camera(s) may be used to detect the movement of a user carrying the mobile device and to facilitate the user's entry into (or exit from) a transit service in a gateless environment for a truly hassle-free experience.

The Bluetooth Low Energy (BLE)-based automated fare validation system as per teachings of particular embodiments of the present disclosure may detect and provide feedback to the passenger, when the passenger enters into a "Paid Area" with a valid electronic ticket (which may be stored in the passenger's mobile device). A controller as per teachings of the present disclosure may also detect when a passenger, with a mobile ticket previously activated, exits from the Paid Area. Furthermore, in some embodiments, the system may detect, and provide external visual and audio alerts, when a passenger enters into the Paid Area without a valid permit for travel. The system may also detect, and provide external visual and audio alerts, when a passenger attempts to exit from the Paid Area without a valid permit for travel. Overall, passenger throughput into and out of the Paid Area may be increased, especially during peak periods, using the hands-free ticket validation and gateless entry approaches disclosed herein.

Various sensors in the system may collect and/or generate data points that can be analyzed to provide additional automated features in the transit system such as, for example: (i) automatic capacity management of a transit station and/or a transit vehicle to alert a transit operator of potential capacity issues in advance to enable the operator to handle the situation before the station or the vehicle reaches its capacity limit, (ii) automatic trip planning for a passenger to enable the passenger to dynamically plan the fastest route to a destination according to real time data and historical data trends, (iii) automatic fraud detection in the transit system to alert a fare inspector to a ticket fraud or other fraudulent activity at a specific transit station or on a specific transit vehicle, and (iv) automatic vehicle routing in the transit system to automatically (and dynamically) route autonomous transit vehicles to stations, notify transit vehicle drivers to stop at a particular station, and/or notify transit operators to route a vehicle to a particular station based on current and historical demand from passengers.

In one embodiment, the present disclosure is directed to a method in a control unit associated with a transit system. The method comprises: (i) receiving sensor data from a plurality of sensors in the transit system, wherein the control unit is communicatively coupled with the sensors, and wherein each sensor-specific portion of the sensor data includes at least one of the following: (a) a sensor-specific passenger data defining one or more attributes of a user availing a transit service in the transit system, (b) a sensor-specific vehicle data defining one or more attributes of a transit vehicle associated with the transit service, and (c) a sensor-specific station data defining one or more attributes of a transit station associated with the transit service; (ii) combining received sensor-specific passenger data to generate a system-specific passenger data, received sensor-specific vehicle data to generate a system-specific vehicle data, and received sensor-specific station data to generate a system-specific station data; (iii) analyzing the system-specific passenger data, the system-specific vehicle data, and the system-specific station data; and (iv) performing at least one of the following based on the analysis of the system-specific passenger data, the system-specific vehicle data, and the system-specific station data: (a) facilitating management of passenger-handling capacity of at least one of the transit station and the transit vehicle, (b) dynamically planning a trip for the user availing the transit service, (c) facilitating detection of fraud for the transit service, and (d) dynamically planning a route for the transit vehicle.

In another embodiment, the present disclosure is directed to a control unit associated with a transit system. The control unit comprises: (i) an interface unit; (ii) a memory for storing program instructions; and (iii) a processor coupled to the interface unit and to the memory. In the control unit, the interface unit is operable to receive sensor data from a plurality of sensors in the transit system, wherein the control unit is communicatively coupled with the sensors, and wherein each sensor-specific portion of the sensor data includes at least one of the following: (a) a sensor-specific passenger data defining one or more attributes of a user availing a transit service in the transit system, (b) a sensor-specific vehicle data defining one or more attributes of a transit vehicle associated with the transit service, and (c) a sensor-specific station data defining one or more attributes of a transit station associated with the transit service. In the control unit, the memory also stores the sensor data received by the interface unit. The processor in the control unit is operable to execute the program instructions, which, when executed by the processor, cause the control unit to: (i) combine received sensor-specific passenger data to generate a system-specific passenger data, received sensor-specific vehicle data to generate a system-specific vehicle data, and received sensor-specific station data to generate a system-specific station data; (ii) analyze the system-specific passenger data, the system-specific vehicle data, and the system-specific station data; and (iii) perform at least one of the following based on the analysis of the system-specific passenger data, the system-specific vehicle data, and the system-specific station data: (a) facilitate management of passenger-handling capacity of at least one of the transit station and the transit vehicle, (b) dynamically plan a trip for the user availing the transit service, (c) facilitate detection of fraud for the transit service, and (d) dynamically plan a route for the transit vehicle.

In a further embodiment, the present disclosure is directed to a transit system that comprises: (i) a plurality of sensors to provide sensor data; and (ii) a control unit that is communicatively coupled with the sensors. In the transit system, the control unit is adapted to implement a method comprising: (i) receiving the sensor data from the plurality of sensors, wherein each sensor-specific portion of the sensor data includes at least one of the following: (a) a sensor-specific passenger data defining one or more attributes of a user availing a transit service in the transit system, (b) a sensor-specific vehicle data defining one or more attributes of a transit vehicle associated with the transit service, and (c) a sensor-specific station data defining one or more attributes of a transit station associated with the transit service; (ii) combining received sensor-specific passenger data to generate a system-specific passenger data, received sensor-specific vehicle data to generate a system-specific vehicle data, and received sensor-specific station data to generate a system-specific station data; (iii) analyzing the system-specific passenger data, the system-specific vehicle data, and the system-specific station data; and (iv) performing at least one of the following based on the analysis of the system-specific passenger data, the system-specific vehicle data, and the system-specific station data: (a) facilitating management of passenger-handling capacity of at least one of the transit station and the transit vehicle, (b) dynamically planning a trip for the user availing the transit service, (c) facilitating detection of fraud for the transit service, and (d) dynamically planning a route for the transit vehicle.

The mobile device and other units in a transit system as per teachings of the present disclosure may perform various operational aspects briefly mentioned above and further discussed in more detail later below.

Thus, the Bluetooth-based fare validation methodology as per teachings of the present disclosure may improve the passenger throughput through a fare gate by allowing the passenger to simply walk through the fare gate "hands free" so long as they have a valid, active ticket on their mobile device. Furthermore, the Bluetooth-based gateless entry/exit facility may provide additional improvement in passenger throughput in a gateless transit environment where fare gates may be absent or non-operational. Support for various ancillary features, such as automatic capacity management, trip planning, fraud detection, and vehicle routing in a transit system may be provided through analysis of data from various sensors in the system to assist respective intended users like transit operators, transit passengers, fare inspectors, and vehicle operators.

BRIEF DESCRIPTION OF THE DRAWINGS

In the following section, the present disclosure will be described with reference to exemplary embodiments illustrated in the figures, in which:

FIG. 3 shows an exemplary flowchart illustrating a mobile device-based hands-free fare validation methodology according to one embodiment of the present disclosure;

FIG. 4 shows an exemplary flowchart illustrating a controller unit-based hands-free fare validation methodology according to one embodiment of the present disclosure;

FIG. 9 shows an exemplary flowchart illustrating a mobile device-based gateless entry methodology according to one embodiment of the present disclosure;

FIG. 10 shows an exemplary flowchart illustrating a control unit-based gateless entry methodology according to one embodiment of the present disclosure;

FIG. 13 is an exemplary flowchart illustrating a control unit-based methodology according to one embodiment of the present disclosure;

DETAILED DESCRIPTION

Figure 1:
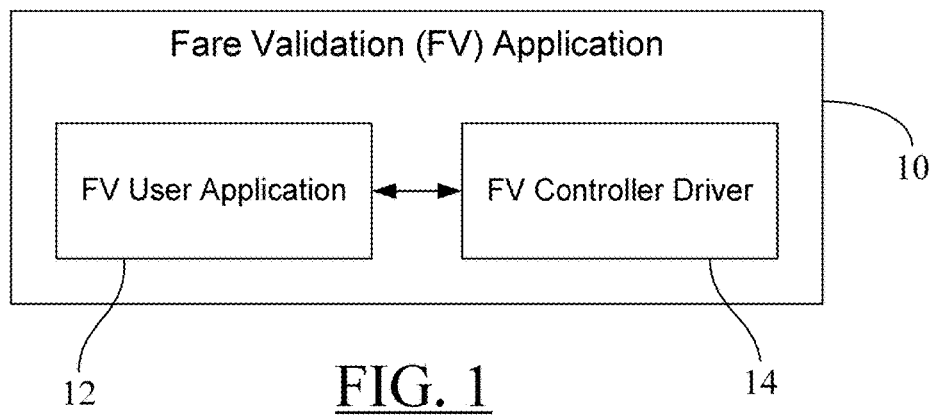
FIG. 1 illustrates constituent components of a Fare Validation (FV) application according to an exemplary embodiment of the present disclosure.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "hands-free," "hassle-free", etc.) may be occasionally interchangeably used with its non-hyphenated version (e.g., "hands free," "hassle free", etc.), and a capitalized entry (e.g., "Fare Validation Application," "Fare Gate," "Controller Unit," etc.) may be interchangeably used with its non-capitalized version (e.g., "fare validation application," "fare gate," "controller unit," etc.). Such occasional interchangeable uses shall not be considered inconsistent with each other.

It is noted at the outset that the terms "coupled," "operatively coupled," "connected", "connecting," "electrically connected," etc., are used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale.

The terms "first," "second," etc., as used herein, are used as labels for nouns that they precede, and do not imply any type of ordering (e.g., spatial, temporal, logical, etc.) unless explicitly defined as such. Furthermore, items or features appearing in different figures may be identified using the same reference numeral for ease of discussion. However, such identification does not imply that the commonly-referenced items/features are identical across all embodiments.

FIG. 1 illustrates constituent components of a Fare Validation (FV) application 10 according to an exemplary embodiment of the present disclosure. The FV application 10 may be a software module having various distributed data processing functionalities discussed later below with reference to FIGS. 2-12. Some portion of data processing or computations may be performed locally in a mobile device whereas some other portion of data processing may be performed on a controller unit. The FV application 10 according to one embodiment of the present disclosure may include an FV User Application (user app) component 12 and an FV Controller Driver component (controller driver) 14. The user app and controller driver components may be in bi-directional communication (preferably wireless, as discussed below with reference to FIG. 2) with each other, and may together provide the hands-free fare validation and gateless entry/exit functionalities as discussed later below. It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism.

It is noted here that the embodiments in FIGS. 2-8 relate to the BLE-based hands-free fare validation methodology, whereas the embodiments in FIGS. 9-12 relate to the BLE-based fare gate-agnostic entry/exit methodology applicable to transit systems that have fare gates or are completely/partially gateless. Thus, no discussion of gateless entry/exit aspect is provided in the context of description of FIGS. 2-8 below. Similarly, no discussion of the fare validation aspect is provided in the context of description of FIGS. 9-12. It is understood, however, that the fare validation approach discussed in FIGS. 2-8 remains applicable—albeit with suitable modifications, as needed—to the gateless (or gated) entry/exit methodologies discussed with reference to FIGS. 9-12. Furthermore, the configurations in the embodiments of FIGS. 9-12 allow for additional fraud detection for gateless systems. The additional embodiments in FIGS. 13-17 relate to different configurations in which relevant sensor data may be analyzed by a control unit to support ancillary applications in a transit system such as, for example, automatic capacity management to help transit operators, dynamic trip planning for transit passengers, automatic fraud detection alerts for fare inspectors, and dynamic vehicle routing assistance to vehicle operators. As discussed in more detail later below, the embodiments in FIGS. 13-17 may utilize data collected by sensors in the configurations of FIGS. 11-12 or obtained from data sources other than those shown in FIGS. 11-12.

Figure 2:
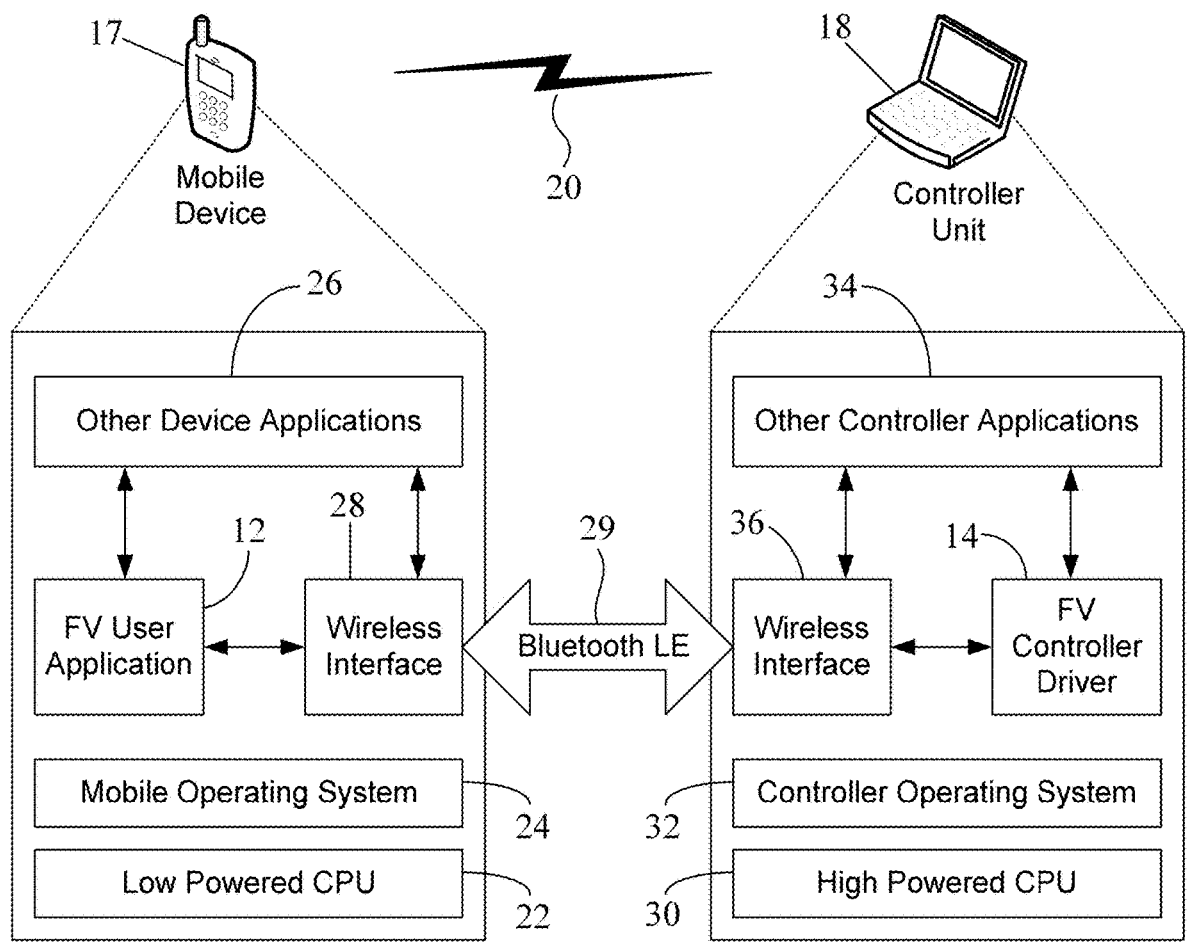
FIG. 2 depicts an exemplary system for implementing the FV application according to one embodiment of the present disclosure.

FIG. 2 depicts an exemplary system 16 for implementing the FV application 10 according to one embodiment of the present disclosure. The system 16 may include a mobile device 17 that is in wireless communication with a controller unit 18, as symbolically illustrated by a wireless link 20. As discussed later below, the wireless link 20 may be a Bluetooth-based communication interface. The FV user app 12 may reside in the mobile device 17, whereas the FV controller driver 14 may reside at the controller unit 18 as shown in FIG. 2. It is noted here that the terms "mobile device," "mobile handset," "wireless handset," and "User Equipment (UE)" may be used interchangeably hereinbelow to refer to a wireless communication device that is capable of voice and/or data communication. Some examples of such mobile handsets include cellular telephones or data transfer equipments, tablets, and smartphones (e.g., iPhone™, Android™, Blackberry™, etc.). In certain embodiments, such as, for example, the embodiments in FIGS. 9-12, a BLE tag may be considered a "mobile device" or "mobile handset" as mentioned later below. It is observed here that, for ease of discussion, the controller unit 18 is shown as a separate device or apparatus. However, the controller unit 18 may not have to be a separate computing unit (in hardware or software form) dedicated to carry out the fare validation functionality. In one embodiment, the functionality of the controller unit 18 may be implemented in an already-existing physical computing/data processing unit or (non-physical) server software (not shown) at a transit station. In another embodiment, the functionality of the controller unit 18 may be accomplished using multiple different units.

As shown in FIG. 2, the UE 17 may include, inside its housing (not shown), a relatively low-powered Central Processing Unit (CPU) 22 executing a mobile operating system (or mobile OS) 24 (e.g., Symbian™ OS, Palm™ OS, Windows Mobile™, Android™, Apple iOS™, etc.). Because of the battery-powered nature of mobile handsets, the CPU 22 may be designed to conserve battery power and, hence, may not be as powerful as a full-functional computer or server CPU. As further shown in FIG. 2, in addition to the user app 12, the UE 17 may also have one or more mobile applications 26 resident therein. These mobile applications 26 are software modules that may have been pre-packaged with the handset 17 or may have been downloaded by a user into the memory (not shown) of the UE 17. Some mobile applications 26 may be more user-interactive applications (e.g., a mobile game of chess to be played on the UE 17, a face recognition program to be executed by UE 17, etc.), whereas some other mobile applications may be significantly less user-interactive in nature (e.g., UE presence or location tracking applications, a ticketing application). The mobile applications 26 as well as the user app 12 may be executed by the processor 22 under the control of the mobile operating system 24. As also shown in FIG. 2, the UE 17 may further include a wireless interface unit 28 to facilitate UE's wireless communication with the controller unit 18 (discussed later) via a Bluetooth interface such as, for example, a Bluetooth LE (or Bluetooth) interface 29. In particular embodiments, the wireless interface unit 28 may also support other types of wireless connections such as, for example, a cellular network connection, a Wi-Fi connection, and the like. The applications 12, 26 may utilize the wireless interface 28 as needed.

It is noted here that the Bluetooth LE interface 29 is shown by way of an example only; the teachings of the present disclosure are not limited to a BLE interface alone. Thus, although the discussion below may frequently refer to a BLE interface, it is understood that such discussion remains applicable to other Bluetooth technologies as well, such as, for example, the Bluetooth technologies that comply with one or more Bluetooth Special Interest Group (SIG) standards. The hands-free fare validation solution as per teachings of the present disclosure may be implemented using a number of Bluetooth specifications, including BLE. Hence, the usage of the terms "BLE" or "Bluetooth LE" in the discussion below should be considered as a representative of (and inclusive of) the more general term "Bluetooth" or other non-BLE based Bluetooth technologies. Additionally, in certain embodiments, the Bluetooth-based proximity detection discussed below may be modified such that proximity may be detected using Bluetooth in conjunction with WiFi and/or cellular data connections, or some combination thereof. Thus, for example, a hybrid approach to proximity detection may use both WiFi and Bluetooth to detect where a person is at. The Bluetooth-based discussion below encompasses such variations and combinations, but each such hybrid approach is not discussed in detail for the sake of brevity.

In the embodiment of FIG. 2, the controller unit 18 is shown to include a relatively high powered CPU 30 executing an operating system 32 (e.g., Windows™, Mac™OSX, Linux, etc.). In addition to the controller driver 14, the controller unit 18 may also store in its memory (not shown) other controller-specific applications 34 such as, for example, an application that facilitates NFC or Ethernet-based communication with an entry gate system (discussed later with reference to FIG. 5), an application that facilitates communication with a "people counting" device (also discussed later), an application that interacts with a backend system, and the like. The controller 18 may wirelessly communicate with the UE 17 via its own wireless interface unit 36. The interface units 28, 36 may wirelessly transfer data or information between the mobile device 17 and the controller 18 using the Bluetooth interface 29 as shown. Thus, in operation, a UE-generated signal may be wirelessly sent (using the wireless interface 28) over the Bluetooth interface 29 to the controller unit 18 for further processing by its CPU 30. Any response or other signal from the controller unit 18 can be provided in the UE-recognized wireless format by the controller's wireless interface unit 36 and eventually delivered to UE's wireless interface 28 (and, hence, to the UE's processor 22 for further processing) via the Bluetooth interface 29. The resulting wireless "link" between the interfaces 28 and 36 is symbolically illustrated by the bi-directional arrow 29. In particular embodiments, the wireless interface unit 36 may also support other types of wireless connections such as, for example, a cellular network connection, a Wi-Fi connection, and the like. The applications 14, 34 may utilize the wireless interface 36 as needed. It is observed here that, in particular embodiments, the mobile device 17 and/or the controller unit 18 may be coupled to other networks (not shown) via a wired or wireless connection (whether circuit-switched or packet-switched). Such networks may be voice networks, data networks, or both, and may include, for example, a cellular network, the Internet, a Local Area Network (LAN), a Public Land Mobile Network (PLMN), and the like.

FIG. 3 shows an exemplary flowchart 40 illustrating a mobile device-based hands-free fare validation methodology according to one embodiment of the present disclosure. Various operational tasks shown in FIG. 3 may be performed by the mobile device 17 when the user app 12 (and other relevant program code) is executed by the CPU 22. Initially, the mobile device 17 may receive a Bluetooth beacon signal (block 42). As discussed later, specific Bluetooth beacon signals may be transmitted as per teachings of the present disclosure for locating the presence of a passenger in the fare validation zone (also referred to below as "fare gate trigger zone"). Thus, based on the received beacon signal, the mobile device 17 may determine that it is in the fare validation zone (block 43). In some embodiments, the mobile device can determine the proximity of a fare gate trigger zone based on geofence(s) and GPS data. At block 45, the mobile device 17 may transmit electronic ticket information stored in the mobile device (as discussed later below) to a controller unit, such as the controller unit 18, at the transit station. The electronic ticket information may be transmitted over a Bluetooth interface, such as the Bluetooth LE interface 29 between the mobile device 17 and the controller unit 18. At block 46, the mobile device 17 may receive a ticket acceptance response from the controller unit 18 over the Bluetooth interface 29 indicating that the electronic ticket is valid for transit. In response, at block 47, the mobile device 17 may inform the user/passenger—for example, via a visible and/or an audible notification—to continue towards an entry gate at the transit station in a hands-free manner. Thus, the ticket submission and ticket validation operations may be performed without user involvement; a passenger is not required to search for their smartcards or mobile phones to validate their tickets.

FIG. 4 shows an exemplary flowchart 50 illustrating a controller unit-based hands-free fare validation methodology according to one embodiment of the present disclosure. Various operational tasks shown in FIG. 4 may be performed by the controller unit 18 when the controller driver 14 (and other relevant program code) is executed by the CPU 30. Initially, at block 52, the controller unit 18 may receive a notification that the user has entered the fare validation zone. In one embodiment, such notification may be received from a "people counting" device such as, for example, a digital camera, connected to the controller unit 18 as discussed later with reference to FIG. 5. At block 53, the controller unit 18 may identify the mobile device carried by the user—such as the mobile device 17—based on the signals received from the mobile device over a Bluetooth interface, such as the Bluetooth LE interface 29. Upon identifying the mobile device 17 and establishing a Bluetooth communication link with it, the controller unit 18 may receive electronic ticket information from the mobile device 17 over the Bluetooth interface 29 (block 55). At block 57, the controller unit 18 may determine that the electronic ticket is valid for transit. As discussed later, in one embodiment, the controller unit 18 may send the electronic ticket information to an entry control gate at the transit station to check the validity of the ticket. If the submitted ticket is valid and active, the controller unit 18 may receive a confirmation message from the entry control gate. At block 58, the controller unit 18 may sent a ticket acceptance response to the mobile device 17 over the Bluetooth interface 29. This informs the user/passenger (carrying the mobile device 17) to continue towards an entry gate at the transit station in a hands-free manner. In other words, a passenger is not required to search for his/her smartcard or mobile phone to validate his/her ticket; the passenger can simply continue walking towards the entry gate because of the hands-free validation of the ticket through the interactions between the controller unit 18 and the passenger's mobile device 17.

Figure 5:
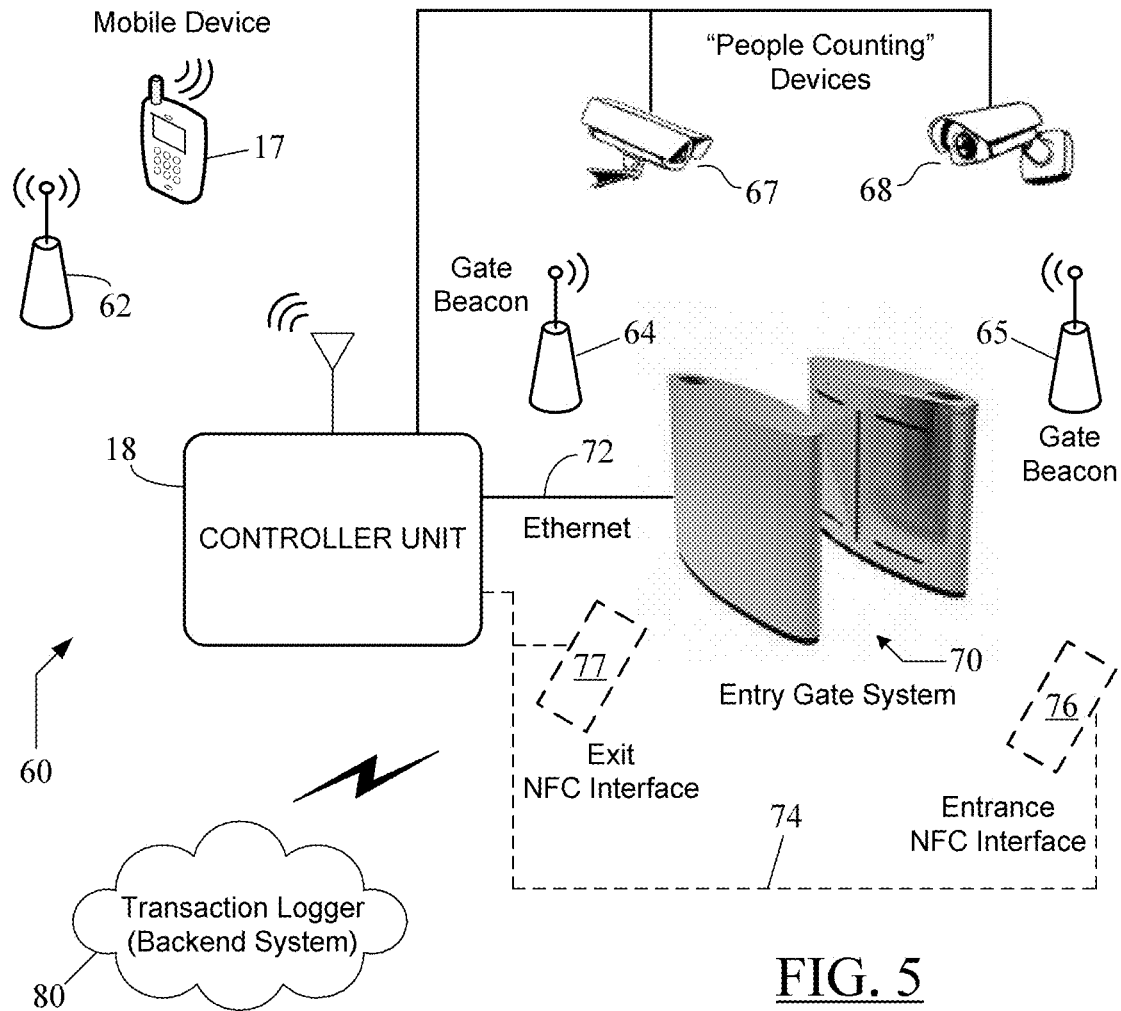
FIG. 5 shows an exemplary illustration of system components to implement the hands-free fare validation methodology at a transit station according to one embodiment of the present disclosure.

FIG. 5 shows an exemplary illustration of system components to implement the hands-free fare validation methodology at a transit station 60 according to one embodiment of the present disclosure. Prior to discussing the operational aspects of the system components in FIG. 5, a brief overview of exemplary hardware features of these components is provided.

In particular embodiments, the mobile device 17 may be an Apple® iPhone 4S, iPhone 6, or a newer model. In other embodiments, the mobile device 17 may be a Google® Nexus 4, Nexus 5, or a newer model. In any event, the user app 12 may be configured to run on a variety of mobile devices—Android-based, Apple iOS-based, or any other mobile operating system-based. In particular embodiments, the mobile device 17 may support downloadable applications and Bluetooth LE 4.2 or higher protocols (or other applicable Bluetooth protocols) for communications, including Bluetooth Beacon scanning. The mobile device 17 may include a User Interface (UI) to facilitate various tasks in support of the hands-free fare validation. Such tasks may include, for example, purchase of an electronic ticket by the user, selection of the desired ticket from a group of pre-purchased tickets, intimation of acceptance of the electronic ticket for transit, and the like.

In particular embodiments, the controller unit 18 may be a computer such as, for example, a laptop or a desktop computer, a mobile device, a tablet computer, a single-board computer, or a modular controller such as a Raspberry Pi™ or Arduino™ unit. The controller unit 18 may support some or all of the following capabilities: a Bluetooth (including BLE) based radio communication, wired or wireless connectivity, Universal Serial Bus (USB) connectivity, non-volatile storage such as flash or disk storage, volatile storage using Random Access Memory (RAM) modules, Bluetooth LE 4.0 or higher stack (or other applicable Bluetooth protocols), video or Liquid Crystal Display (LCD) display, NFC reader, and a data input device such as a keyboard. It is noted here that, in certain embodiments, there may be more than one controller unit 18 installed at the transit station 60, such as, for example, when multiple fare gates (discussed below) are present and "managed" by different controller units or when multiple wake-up beacons (discussed below) are associated with different controller units. Generally, the number of controller units or beacon transmitters (wake-up beacons or gate beacons) may be implementation-specific.

The transit station 60 may optionally employ one or more Wake-Up beacon transmitters 62 for launching and preparing the user app 12 on the mobile device 17 for proximity tracking. The number of wake-up beacons 62 may be based upon field conditions. In particular embodiments, the wake-up beacon 62 may provide Bluetooth LE (BLE) (or other type of Bluetooth) beacon signals using an omnidirectional antenna (not shown). The beacon signals transmitted by the transmitter 62 may be compatible with proprietary Bluetooth beacon standards such as, for example, the iBeacon standard for Apple® systems and similar Bluetooth beacon standards for Android™ systems. Thus, for iBeacon compatibility, for example, the wake-up beacon transmitter 62 may be capable of advertising a programmable 16-byte Universal Unique Identifier (UUID) along with a 2-byte Major Number and a 2-byte Minor Number. The UUID may be used to uniquely identify an object—for example, the beacon transmitter 62—across the internet. The 16-bit Major Number may further subdivide iBeacons that have the same UUID. The 16-bit Minor Number may further subdivide iBeacons within the same Major Number.

As noted above, a UUID is a unique number. With regard to BLE, each service may be represented by a UUID. The 16-bit standardized BLE UUIDs allow for 65536 unique services. BLE also supports 128 bit UUID numbers for custom services. A "service" can be almost anything such as, for example, a heart monitor, a proximity sensor, a temperature probe, and so on. Additional information about UUIDs for various "services" may be obtained at https://developer.bluetooth.org/gatt/services/Pages/ServiceHome.aspx. Although UUIDs are normally fixed, they may be dynamic in certain implementations.

The wake-up transmitter 62 may be considered a "Bluetooth Beacon" because it periodically transmits a fixed message—a Beacon Identifier (ID)—using Bluetooth or Bluetooth LE. In particular embodiments, a Bluetooth Beacon is usually incapable of receiving data. The Beacon ID may provide transmitter-specific identification information that the mobile operating system 24 may use to recognize the Bluetooth Beacon. For iBeacons, for example, the Beacon ID is the UUID along with the major and minor numbers. It is observed here that the Bluetooth LE (also referred to as "Bluetooth Smart") is a wireless communication protocol that permits short range (up to 30 meters) communications. Bluetooth LE functionality is found on many smartphones and tablets.

The beacons may be used for determining proximity of a mobile device to a particular location. Each beacons normally has a fixed ID, but, in certain implementations, a beacon can have a dynamic ID. With regard to Beacon IDs, the mobile device may read all of the beacon IDs transmitted in its vicinity. In certain embodiments, the beacon data (such as Beacon ID), signal strength of the received beacon, and a timestamp value (associated with the received beacon) may be forwarded—such as, for example, by the user app 12—over WiFi to another computer or host—such as, for example, the controller unit 18—that determines the location of the mobile device 17. Thus, in particular embodiments, the user app 12 in the mobile device 17 may "listen" to the beacons and then connect over WiFi to an application—such as, for example, the controller driver 14—that determines location. In some other embodiments, the user app 12 may connect to a different application to determine the location or may itself determine the location and send the location information to the controller driver 14. Major beacon formats are supported by iOS™, Android™, and other mobile operating systems.

Figure 6:
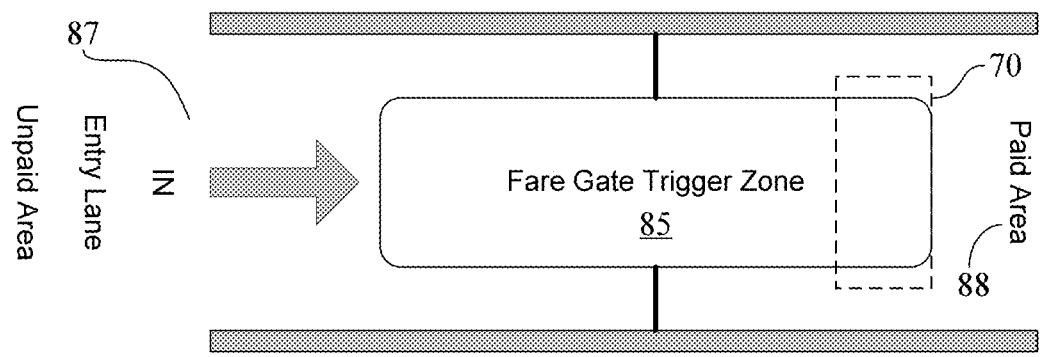
FIG. 6 is a simplified illustration of a fare validation zone (or a fare gate trigger zone) according to one embodiment of the present disclosure.

The transit station 60 may also employ two or more BLE (or other type of Bluetooth) Gate Beacons for locating a passenger in the Fare Gate Trigger Zone (also referred to as the "fare validation zone"). An exemplary fare gate trigger zone 85 is shown in FIG. 6 (discussed below). In FIG. 5, two Gate Beacons are shown using reference numerals "64" and "65". Based upon the field conditions or to improve accuracy, more gate beacons may be installed as well. Operationally, the gate beacons 64-65 are also Bluetooth Beacons and may be similar to the wake-up beacon 62, except that each gate beacon 64-65 may have a highly unidirectional external antenna (not shown) to specifically "track" the passengers who are present in the fare validation zone.

In one embodiment, all Bluetooth® communications between various entities in FIG. 5 may conform to the standards set forth in the Bluetooth® Core Specification 4.2.

The transit station 60 may have a number of "people counting" devices 67-68 to determine when a person has entered the fare validation zone. In one embodiment, the "people counting" devices may include stereoscopic digital Infrared (IR) cameras. In some embodiments, the cameras 67-68 may be wirelessly connected to the controller unit 18 to notify the controller 18 when a person has entered the fare validation zone. In other embodiments, there may be an Ethernet-based connectivity between the controller unit 18 and the "people counting" devices 67-68. Furthermore, to prevent "tailgating," the devices 67-68 may be configured to distinguish between one person and more than one person in the fare gate trigger zone.

An entry gate system 70 (also referred to herein as a "Fare Gate") may be deployed at the transit station 60 to function as an electronically-controlled access barrier. One fare gate is shown in FIG. 5 by way of an example. Many transit stations may have multiple such fare gates. In one embodiment, a fare gate may be a physical access barrier that is intended to permit only properly-ticketed passengers through into the "Paid Area," which may be a secured area that is designated for paying passengers. In one embodiment, the fare gate 70 may be directly connected to the controller unit 18 via an Ethernet interface 72. In some embodiments, a standard Power Over Ethernet (POE) switch (or hub) may be used to facilitate multiple Ethernet connections or field conditions. A standard RJ-45 connector may be used to provide the Ethernet-based network connectivity between the controller unit 18 and the fare gate 70. In certain embodiments, the fare gate may be a virtual barrier, such as, for example, in case of a bus where such a virtual barrier may be used in conjunction with a controller unit as per teachings of the present disclosure to afford hands-free entry to the passengers wishing to board the bus. In other words, the physical barrier-based illustration in FIG. 5 is exemplary only; the teachings of the present disclosure are not limited to a physical gate barrier being present, as discussed below with reference to the gateless entry/exit aspect in the embodiments of FIGS. 9-12.

On the other hand, in some embodiments, the controller unit 18 may use an NFC interface 74 to initiate a transaction with the fare gate 70. However, as noted before, an NFC interface may not support a fully hands-free transaction. An NFC interface may be primarily used where, for business or technical reasons, a fare gate that supports NFC cannot be easily modified to support direct connectivity with the controller unit 18 for completely hands-free fare validation. Thus, if the fare gate can be modified to support direct transaction initiation via another interface—such as, for example, an Ethernet based LAN—then the NFC interface may be eliminated. Hence, the NFC interface 74 is shown dotted in FIG. 5. It is observed that, in particular embodiments, there may be two NFC interfaces associated with the entry gate system 70—an NFC interface 76 at the entrance of the "Paid Area" and an NFC interface 77 at the exit from the "Paid Area." In one embodiment, the Radio Frequency (RF) protocol between the NFC interface 74 and the fare gate 70 may be ISO (International Standards Organization) 14443-2 compliant. More generally, the ISO 14443-2 standard defines the RF communications between RFID based devices such as contactless smartcards and another device (such as a fare gate).

On the hardware side, the fare gate 70 may include a fare gate controller (not shown), which may be a microcontroller with appropriate logic to act as a fare gate. In one embodiment, the fare gate 70 may include some of all of the following: memory to store the control program and associated data; an NFC reader/writer; other media readers (optional); an Ethernet network hub or switch; a local display (LCD or similar) for each side—entry and exit; speaker(s); and remote display capability. Furthermore, in certain embodiments, the fare gate 70 may have an "Enter" indicator on its entry side and a "Don't Enter" indicator on its exit side.

Although not shown in FIG. 5, the transit station 60 may also have one or more remote displays—for example, displays hanging over the fare gate entrance and exit. When passengers are moving quickly through a fare gate, these displays provide visual feedback to the users, such as, for example, a confirmation that their electronic ticket is valid and accepted and, hence, they should continue moving to the transit terminal or "Paid Area." In particular embodiments, these remote displays may serve as user interfaces to allow the fare gate to indicate both normal and exceptional operating conditions to passengers and station personnel. For example, the remote display may have the ability to display a message when there is a valid transaction and accompany the message with a "valid transaction" sound. Similarly, the fare gate-affiliated user interface may have the ability to display a message when there is an invalid transaction attempt (such as, for example, submission of an invalid or expired ticket) and accompany the message with an "invalid transaction" sound. In some embodiments, the remote displays may have the ability to indicate the direction in which the fare gate is operating. For example, an "Entry" gate may have a red indicator visible from the "Paid Area" side and a blue or green indicator may be visible from the "Unpaid Area" side. The "paid" and "unpaid" areas are shown in the exemplary illustration of FIG. 6.

In the embodiment of FIG. 5, a transaction logger or backend system 80 is shown to be in wireless communication with the entry gate system 70. In one embodiment, the backend system 80 may be a proprietary data processing system owned, operated, maintained, or controlled by the relevant transit authority or by the operator of the fare gate 70 at the transit station 60. Various transactions and events (discussed later) may be logged in the transaction logger 80, for example, for statistical analysis, record-keeping, and Operations and Maintenance (O&M) activity. In certain embodiments, the entry gate system 70 may communicate with the back-end system 80 using a wired connection.

In particular embodiments, the FV user app 12 installed in the mobile device 17 may support two modes of operation: (i) a Mobile Ticketing mode, and (ii) a Fare Gate Transaction mode. The system designer may determine whether the functionality offered by these modes is accessible from the same screen or requires selection of a menu item or clicking on an appropriate radio button from the choices presented on the display screen of the mobile device 17.

In the mobile ticketing mode, the user app 12 may allow the user of the mobile device 17 to select and purchase a wide range of ticket types to numerous destinations using a mobile ticketing application provided by, for example, the transit station operator or train/bus service operating company. The user app 12 may further allow the user to see which transport tickets are electronically stored on the user's mobile device 17. The user may initially have to deploy the mobile ticketing app on his/her mobile device 17 to avail of the electronic ticketing functionality. A user interface may be provided to enable the user to select and add a valid electronic ticket to the inventory of tickets stored on the device 17. The user may also pay for the selected ticket online and the transit service (for example, train service or bus service) operator may confirm the purchase with a unique code, digital coupon, or electronic ticket itself. In one embodiment, any of these forms of "receipt" of purchase may be later used by the mobile device 17 for hands-free fare validation. The user may enter the mobile ticketing mode via an appropriate menu selection. Once in the ticketing mode, the user may press a corresponding on-screen/off-screen button for adding a ticket and the displayed count of valid tickets increases by one. In certain embodiments, the user may need to setup an online account with the transit service operator for automatic billing and payment facility, as well as for recurring ticket purchases. For the sake of present discussion, additional details of ticket generation, purchase, and delivery are not relevant and, hence, such details are not provided.

In the fare gate transaction mode, the user app 12 may allow the user to "tender" and activate a valid electronic ticket (stored on the mobile device 17) by simply passing through the entry gate (fare gate) system 70. Thus, the fare gate transaction mode may facilitate hands-free fare validation. In one embodiment, if the user account information is stored in a remote Host Operator or Processing System (HOPS), such as, for example, the backend system 80 in FIG. 5, and if Internet-connectivity is available near the fare gate area, the user app 12 may retrieve such information from the remote host and make it available to the fare gate 70 through communication with the controller driver 14 in the controller unit 18. However, if online connection to the remote host is not possible, the user app 12 may still provide hands-free fare validation as discussed below.

In one embodiment, the user may activate the user app 12 on the user's mobile device 17 prior to or at the time of entering/approaching the transit station 60. The user app 12 may then configure the mobile device 17 to enable scanning for Bluetooth beacons transmitted by the wake-up beacon 62. The user app 12 may then identify those Bluetooth beacons that have a specific UUID or other recognizable Beacon ID to, for example, ascertain that the received beacon signal is from an authorized Bluetooth transmitter and, hence, to conclude that the user device 17 is in the proximity of the authorized transmitter and, hence, near the fare validation zone. In one embodiment, based on the identified beacon ID (received from the wake-up beacon 62), the user app 12 may activate the hands-free fare validation feature in the mobile device 17. In response to determining that the mobile device 17 is in or near the fare gate trigger zone (the fare validation zone), the user app 12 may configure the mobile device 17 to send binary data of a specified size to the FV controller driver 14 in the controller unit 18. The size of the transmitted data may be based on the Bluetooth LE (or other Bluetooth) protocol used to communicate with the controller driver 14. The binary data may be used to send requests to the controller driver 14 to perform specific operations such as, for example, electronic ticket validation with the fare gate 70. The user app 12 may also receive binary data of a specified size from the controller driver 14. Such data may include, for example, a ticket confirmation/acceptance message or an invalid ticket/rejection message. When a ticket is accepted by the fare gate, the user app 12 may update the ticket information stored on the mobile device 17 to indicate that the specified ticket has been used. The user app 12 may also send a log message to the controller driver 14, for example, to enable the driver 14 to keep a count of number of users with valid or invalid electronic tickets. More generally, the user app 12 may be able to open and close a Bluetooth (or BLE) communication session with the controller driver 14, as needed.

In one embodiment, the user app 12 may display a message or other visible notification on the mobile device 17 to inform the user that the user's electronic ticket has been accepted or rejected, as applicable. Instead of or in addition to such visible notification, the user app 12 may also provide an audible notification—such as, for example, play a valid transaction sound or an error sound—to the user through the mobile device 17. The error sound may be specifically associated with an error condition, such as, for example, an invalid/expired ticket or no electronic ticket stored in the mobile device 17.

In particular embodiments, the FV controller driver 14 installed in the controller unit 18 also may support two modes of operation: (i) a Transit Control mode, and (ii) a Maintenance mode. A system administrator or other transit service employee may be allowed to place the controller unit 18 in the appropriate mode of operation. In certain embodiments, the maintenance mode may be omitted.

In the transit control mode, the controller driver 14 may configure the controller unit 18 to initiate a ticket transaction with the fare gate 70, and obtain a transaction response from the fare gate. As part of the fare validation transaction, the controller driver 14 may be able to detect the entry of a passenger into the fare validation zone. In one embodiment, the driver 14 may also detect the exit of a passenger from the fare gate trigger zone. In one embodiment, such entry and exit may be determined based on information received from the "people counting" devices 67-68. Furthermore, the controller driver 14 may be able to identify the mobile device that has entered the fare gate trigger zone (and the device's proximity to the fare gate) based on the signals received from the mobile device over the Bluetooth interface 29 (FIG. 2). In response, the driver 14 may send binary data to the mobile device-based user app and also receive binary data from the user app—such as the user app 12 operational on the mobile device 17. As noted before, the binary data received from the mobile device 17 may include electronic ticket information, which the controller driver 14 may send to the fare gate system 70 for validation. Upon receiving a confirmation message from the entry gate system 70, the controller driver 14 may send a ticket acceptance response to the user app 12 over the Bluetooth interface 29, thereby informing the user of the mobile device 17 that the electronic ticket is valid for transit and the user may continue proceeding towards the entry gate 70 in a hands-free manner. On the other hand, if the submitted ticket is not accepted by the fare gate 70—for example, if the ticket is invalid or expired, the controller driver 14 may send a ticket rejection message to the user app 12 over the Bluetooth interface 29, thereby instructing the mobile device 17 to generate an alert for the user. In one embodiment, after validating or rejecting an electronic ticket, the controller driver 14 may close the existing communication session with the mobile device 17.

The controller driver 14 may be configured to store a log message for every transit control-related transaction it performs and the log data may be stored either locally in the controller unit 18 or remotely, for example, in the transaction logging system 80 (FIG. 5), subject to device storage constraints.

In the maintenance mode, the controller driver 14 may gather statistics to help improve the fare validation methodology or to aid administrators or service personnel from the transit company in their implementation of the fare validation approach. In the maintenance mode, the controller driver 14 may provide two sub-modes of operation: (i) Display Current Activity: This sub-mode allows display of the incoming data; and (ii) Display Statistics: This sub-mode allows display of statistics associated with the usage of the fare validation methodology as per particular embodiments of the present disclosure.

When a registered beacon is detected by the user app 12, it may share the Beacon ID and the mobile device's proximity information with the controller driver 14. In the Display Current Activity sub-mode, the controller driver 14 may display the Beacon ID and the proximity information. In one embodiment, the driver 14 may also log the Beacon information. In another embodiment, the driver 14 may disable such logging. Thus, when Beacon logging has been enabled and a registered beacon is detected, the Beacon ID and proximity information may be logged either locally or remotely, subject to device storage constraints.

To aid the transit service administrators, the controller driver 14 may keep statistics in any mode of operation. However, in particular embodiments, the statistics may be displayed only when in the Display Statistic sub-mode. The statistical information that may be displayed include, for example: (i) operational statistics, (ii) a count of the number of passengers entering through the fare gate into the "Paid Area" with a valid ticket while in the "Open Gate" mode (discussed later), (iii) a count of the number of passengers entering through the fare gate into the "Paid Area" with a valid ticket while in the "Closed Gate" mode (discussed later), (iv) a count of the number of passengers entering through the fare gate into the "Paid Area" without a valid ticket while in the "Open Gate" mode, (v) a count of the number of passengers entering through the fare gate into the "Paid Area" without a valid ticket while in the "Closed Gate" mode, (vi) a count of the number of passengers exiting through the fare gate into the "Unpaid Area" while in the "Open Gate" mode, and (vii) a count of the number of passengers exiting through the fare gate into the "Unpaid Area" while in the "Closed Gate" mode. All statistical counts may be reset to zero.

It is observed here that the fare gate 70 may be setup either has an "Entry" gate or an "Exit" gate. Thus, the maintenance personnel may need to indicate the "direction" of the fare gate (for example, an "Entry" gate or an "Exit" gate) to the controller driver 14. Furthermore, in certain embodiments, the maintenance personnel may also need to specify to the controller driver 14 whether the fare gate 70 is operating in the "Open Gate" mode or the "Closed Gate" mode.

FIG. 6 is a simplified illustration of a fare validation zone (also referred to herein as a "fare gate trigger zone") 85 according to one embodiment of the present disclosure. Broadly, the fare validation zone 85 may refer to the area within or near the fare gate 70 where the presence of the mobile device 17 indicates its user's intent to pay a fare and proceed to the actual transit terminal. By way of an illustration, the fare gate 70 is shown as a dotted block in FIG. 6. As shown in the exemplary illustration of FIG. 6, a user may approach the fare gate trigger zone 85 from an entry lane or "Unpaid Area" 87 at the transit station 60 (FIG. 5). An "unpaid area" may be an unsecured area of the transit station 60 where normal non-paying pedestrian traffic occurs. In contrast, when a user's electronic ticket submission is accepted by the fare gate system 70 as discussed before, the user may transition to a "Paid Area" 88 at the station 60. From the "paid area," the user may proceed to boarding the appropriate transit service (for example, a train or a bus).

The fare gate 70 may be operated in an "open gate" mode or in a "closed gate" mode. In the "open gate" mode, the fare gate 70 may be a barrier-less system. For example, during peak hours when the passenger volume warrants the presence of inspectors (or other service personnel) at the transit station 60, the fare gate (physical) barriers may be left open and the passengers may pass through the gates quickly in a single file. A remote sign for each fare gate may display a message, accompanied by an audible alert, informing the user and the inspectors should the user not have a valid or detectable ticket. However, during off-peak times when the availability of inspectors is decreased and the passenger volume does not hinder throughput, the fare gate barriers may be closed (or brought back in their place), thereby operating the fare gate 70 in the "closed gate" mode.

In certain embodiments, there may be four different transit situations: (1) A user enters the "paid area" 88 when the fare gate 70 is in the "open gate" mode, (2) a user enters the "paid area" 88 when the fare gate 70 is in the "closed gate" mode, (3) a user exits from the "paid area" 88 when the fare gate 70 is in the "open gate" mode, and (4) a user exits from the "paid area" 88 when the fare gate 70 is in the "closed gate" mode. Various operations discussed below with reference to these transit situations are exemplary in nature, and may be accomplished through interaction between the mobile device-based FV user app 12 and the controller unit-based FV controller driver 14, as well as the controller driver's further interaction with other devices/systems—such as, for example, the "people counting" devices, the entry gate system, and the like—at the transit station 60. In view of the earlier discussion of FIGS. 1-6, additional details of such device-to-device interactions or communication are not provided below.

(1) Entry in the "Open Gate" mode: Initially, the user with the mobile device 17 may approach the fare gate 70 that is open for entry (for example, "Entry OK" indicator lights are lit on the Unpaid Area side 87).

If the user has a valid ticket, the user may simply walk through the gate hands-free and the remote display (not shown) may show a message indicating that a valid ticket was tendered and a "Ticket Accepted" beep may be emitted from the fare gate's speakers (not shown). The user's mobile device 17 may also display a notification indicating that the ticket was tendered and accepted. The mobile device may also emit a "Ticket Accepted" beep and a corresponding vibration pattern. The user app 12 may decrease the count of valid tickets stored on the mobile device 17 by one.

If the user's mobile device does not have the FV User Application—like the User App 12 in FIG. 1—loaded, then, upon entering the Fare Gate Trigger Zone 85, the remote display may display a message informing the user to either purchase a ticket or use a traditional ticket. This may be accompanied by a loud "Invalid Entry Attempt" alert through the Fare Gate speakers.

On the other hand, if the user app is loaded on the user's mobile device, but there is no ticket or no valid ticket stored in the device, the remote display may show a "No Ticket Available" message and the Fare Gate speakers may emit the "No Ticket Available" alert sound. The user may also receive a notification on the mobile device indicating that no valid tickets were available, accompanied by the corresponding audible alert and vibration pattern.

In particular embodiments, altering of the user's cadence, such as, for example, pausing to let the person ahead go through the fare gate before proceeding, may be necessary in the Open Gate mode.

(2) Entry in the "Closed Gate" mode: Initially, the user with the mobile device 17 may approach the fare gate 70 that is open for entry (for example, "Entry OK" indicator lights are lit on the Unpaid Area side 87).

If the user has a valid ticket, as the user enters the Fare Gate Trigger Zone 85, the barrier (not shown) opens up and the user may simply walk through the gate hands-free. The remote display may show a message indicating that a valid ticket was tendered and a "Ticket Accepted" beep may be emitted from the Fare Gate's speakers. The user's mobile device 17 may display a notification indicating that the ticket was tendered and accepted. The mobile device may also emit a "Ticket Accepted" beep and a corresponding vibration pattern. The user app 12 may decrease the count of valid tickets stored on the mobile device 17 by one.

If the user's mobile device does not have the FV User Application—like the User App 12 in FIG. 1—loaded, then, upon entering the Fare Gate Trigger Zone 85, the remote display may show a message informing the user that the FV user app was not detected and that a traditional ticket should be used. In that case, the fare gate barrier may remain closed until a valid ticket (electronic or traditional) is presented.

On the other hand, if the user app is loaded on the user's mobile device, but there is no ticket or no valid ticket stored in the device, the remote display may show a "No Ticket Available" message and the Fare Gate speakers may emit the "No Ticket Available" alert sound. The user may also receive a notification on the mobile device indicating that no valid tickets were available, accompanied by the corresponding audible alert and vibration pattern.

(3) Exit in the "Open Gate" mode: Initially, the user with the mobile device 17 may approach the fare gate 70 that is open for exiting (for example, "Entry OK" indicator lights are lit on the Paid Area side 88).

If the user's mobile device has the FV user application loaded with a valid, active ticket, the user may simply walk through the fare gate and the remote display may show, for example, a "Thanks for Traveling with Us" message. The user's mobile device may also display a notification indicating that he or she has exited the system (or transit terminal). The mobile device may also emit an "Exiting" beep and a corresponding vibration pattern.

On the other hand, if the user's mobile device does not have the FV user app loaded (or has it loaded but without a valid, active ticket) and if the user enters the Fare Gate Trigger Zone, a message on the remote display may remind the user to use traditional media to "swipe out" for exit (if this is required by the transit service operator). This may be accompanied by a loud "Invalid Entry Attempt" alert through the Fare Gate's speakers. In some embodiments, such remote display and speaker based reminders/alerts also may be implemented in the "Open Gate" and "Closed Gate" entry modes (1) and (2), respectively, discussed above. In certain embodiments, this "Invalid Entry Attempt" processing may also occur if the user's mobile device is not turned on (whether turned off by the user or as a result of a dead battery).

(4) Exit in the "Closed Gate" mode: Initially, the user with the mobile device 17 may approach the fare gate 70 that is open for exiting (for example, "Entry OK" indicator lights are lit on the Paid Area side 88).

If the user's mobile device has the FV user application loaded, as the user enters the Fare Gate Trigger Zone, the gate's barrier may open and the user may walk through the gate to exit. The remote display may show a "Thanks for Traveling with Us" message. The user's mobile device may also display a notification indicating that he or she has exited the system (or transit terminal). The mobile device may also emit an "Exiting" beep and a corresponding vibration pattern.

On the other hand, if the user's mobile device does not have the FV user app loaded and if the user enters the Fare Gate Trigger Zone, a message on the remote display may remind the user to use traditional media to "swipe out" for exit (if this is required by the transit service operator). In particular embodiments, the fare gate's barrier may remain closed until a valid ticket (electronic or traditional) is presented. In some embodiments, this kind of processing may also occur if the user's mobile device is not turned on (whether turned off by the user or as a result of a dead battery).

It is noted that, typically, the fare gate 70 may be designated as either an "Entry" fare gate or an "Exit" fare gate. The entry or exit direction may be changed under the control of station personnel. For example, the gate 70 may be set in one direction in the morning as an "Entry" gate and as an "Exit" gate in the afternoon. However, if needed, the controller driver 14 may be configured to dynamically determine the direction of the gate based upon the direction of passenger movement. In certain embodiments, additional hardware (not shown), such as, for example, motion sensors or cameras, may be provided at the transit station 60 to assist the controller driver 14 in detection of such direction. Alternatively, the camera devices 67-68 may provide the needed input to the controller driver 14 to enable the detection of the direction of passenger movement.

In some embodiments, the controller driver 14 may operate in conjunction with suitable hardware to detect presence of more than one person at a time within the fare gate trigger zone 85. Furthermore, both the user app 12 and the controller driver 14 may be configured to support may different types of tickets based upon the class of service (for example, regular, senior citizen, student, transit company employee, and the like), the time period (for example, peak time, off-peak time), and seasonal versus "pay-as-you-go" tickets. In certain embodiments, the controller driver 14 may be configured to detect if the same mobile device is used to tender tickets for more than one passenger. Such a situation may arise, for example, when a ticketed passenger pre-purchases more than one ticket and pays for a non-ticketed passenger by passing back the mobile device to the non-ticketed passenger after the ticketed passenger's ticket is validated.

Figure 7:
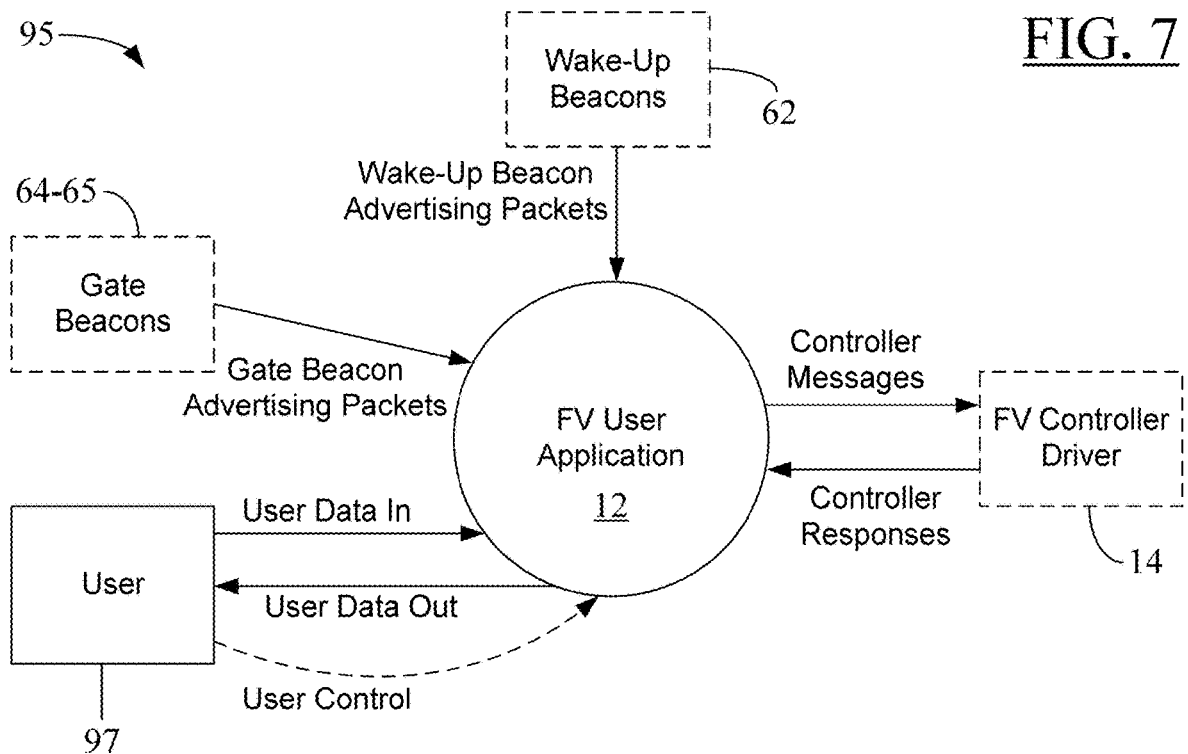
FIG. 7 is an exemplary context diagram for the FV user application in FIG. 1 according to particular embodiments of the present disclosure.
Figure 8:
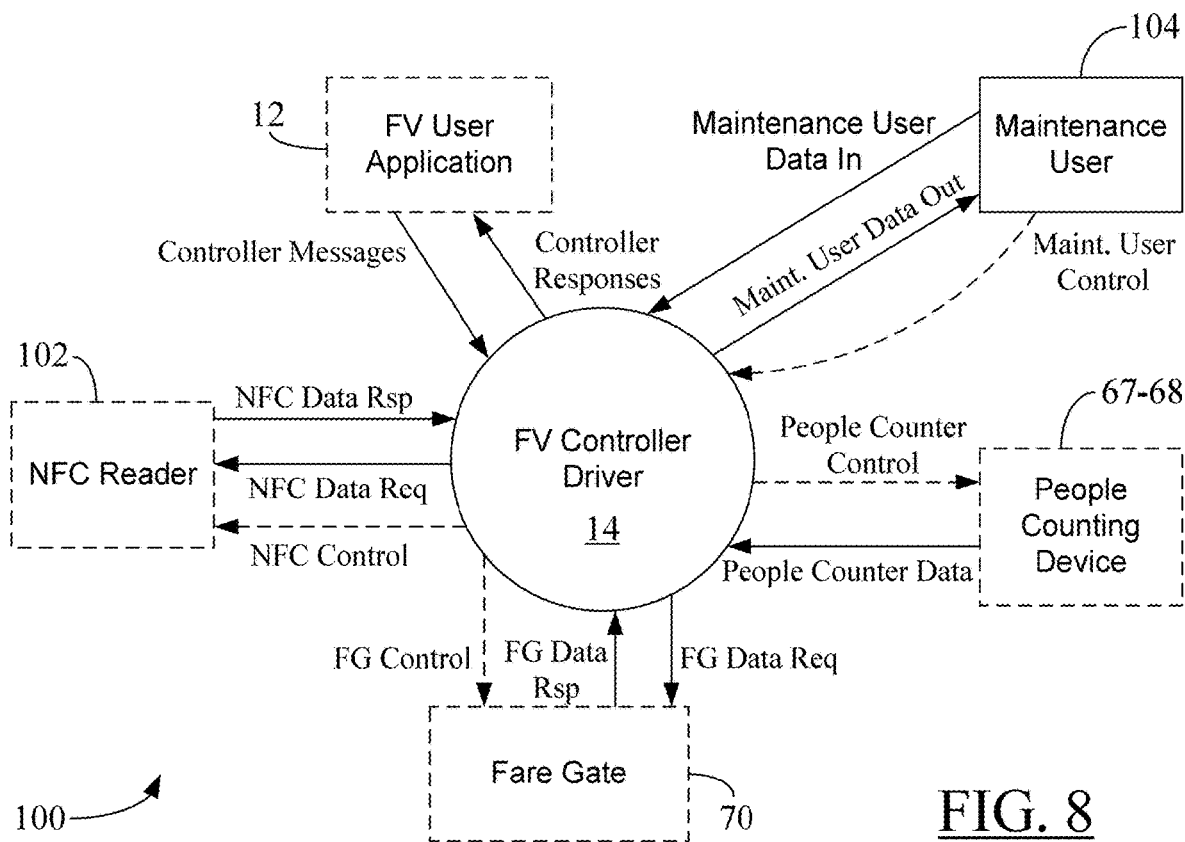
FIG. 8 shows an exemplary context diagram for the FV controller driver in FIG. 1 according to particular embodiments of the present disclosure.

FIG. 7 is an exemplary context diagram 95 for the FV user application 12 in FIG. 1 according to particular embodiments of the present disclosure. FIG. 8 shows an exemplary context diagram 100 for the FV controller driver 14 in FIG. 1 according to particular embodiments of the present disclosure. The context diagram 95 illustrates exemplary external and internal interfaces specific to the FV user app 12. Similar interfaces specific to the controller driver 14 are shown in the context diagram 100 of FIG. 8. For ease of discussion, FIGS. 7-8 are discussed together and the entities common between FIGS. 5 and 7-8 are identified using the same reference numerals. Furthermore, because of the earlier detailed discussion of various operational aspects of the FV user app 12 and the FV controller driver 14, only a brief description of the data and control flows shown in FIGS. 7-8 is provided. In the embodiments of FIGS. 7-8, solid arrows depict data flows and dashed arrows depict control flows. Furthermore, in FIGS. 7-8, blocks with solid lines—such as the blocks 97-98—depict external interfaces, whereas blocks with dashed lines—such as the blocks 62 and 70—depict internal sub-system interfaces.

Referring now to FIGS. 7-8, the "Controller Messages" are the messages sent between the use app 12 and the controller driver 14. These messages may typically contain commands or data which will inform the controller driver 14 how close the mobile device 17 is to the fare gate 70. The "Controller Responses" are responses sent by the controller driver 14 to the user app 12. The "Gate Beacon Advertising Packets" in FIG. 7 refer to information sent from the gate beacon(s) 64-65. This information may be used to detect the proximity of the mobile device 17 with the fare gate 70. On the other hand, the "Wake-Up Beacon Advertising Packets" in FIG. 7 refer to information sent from the wake-up beacon(s) 62. This information may be used to get the user app 12 into a ready state for entering through a fare gate—such as the fare gate 70—that is enabled for hands-free fare validation as per teachings of the present disclosure. In FIG. 7, the term "User Data In" refers to the data that a user 97 running the FV user app 12 (on the user's mobile device 17) enters through a user interface provided by the user app 12. On the other hand, the term "User Data Out" refers to the data that is displayed via the user interface to the user 97 running the FV user app 12. The term "User Control" refers to the control information sent from the mobile device 17 running the FV user app 12.

Referring now to FIG. 8, the "People Counter Data" are the data sent to the FV controller driver 14 by the people-counting devices 67-68 to aid in determining the number of people in the fare gate trigger zone 85. The "People Counter Control" is the control information for the people-counting device. This control information may include commands to enable or disable the sending of the "People Counter Data." The "FG Data Req" is a fare gate data request and includes the data sent to the fare gate 70 from the controller driver 14, typically during the processing of a transaction, such as, for example, a ticket validation transaction. The "FG Data Rsp" is a fare gate data response and includes the data returned from the fare gate 70 during the transaction processing or upon a command from the controller driver 14. The "FG Control" is the fare gate control information.

If a fare gate communicates with the controller driver 14 via an NFC interface, such as, for example, the NFC interface 74 shown in FIG. 5, then there may be an NFC reader/writer 102 present at the fare gate. The NFC reader/writer 102 may communicate with the controller driver 14 via the NFC interface 74. In certain embodiments, there may be individual NFC readers/writers for the entrance NFC interface 76 and the exit NFC interface 77 in FIG. 5. The "NFC Data Req" are data requests sent to the NFC reader/writer 102, the "NFC Data Rsp" are responses received from the NFC reader/writer 102, and the "NFC Control" is the control information associated with the NFC reader/writer 102 to facilitate various NFC-based transactions. In some embodiments, in addition to the NFC reader 102, there may be a barcode scanner (not shown) and a magnetic stripe reader (not shown) in communication with the controller driver 14 via a suitable interface.

If the controller driver 14 supports the earlier-discussed maintenance mode, a maintenance user 104—such as, for example, a service person or employee of the transit station 60 or a transit company—may interact with the system running the controller driver 14 to perform maintenance tasks. The controller unit 18 in FIG. 2 is an example of such a system. The system may provide a user interface to support maintenance-related content displays. In that regard, the "Maintenance User Data In" is the data that the maintenance user 104 enters through the user interface when in the maintenance mode, the "Maint. User Data Out" is the data that is displayed to the maintenance user 104 when in the maintenance mode, and the "Maint. User Control" is the control information sent to the controller driver 14 when in the maintenance mode.

Prior to discussing the embodiments in FIGS. 9-12, it is noted here that a BLE tag may be considered a "mobile device" or "mobile handset" usable in the embodiments of FIGS. 9-12, as mentioned earlier. In the context of FIGS. 9-12, a BLE tag may operate in a manner similar to a mobile device such as a UE or a cell phone. For example, the BLE tag may transmit BLE advertisement packets to a BLE gateway, advertise a unique ID and/or a secure token to the device locators, and perform other actions similar to a "typical" mobile device (such as a cell phone, smartphone, or UE) to facilitate the gateless entry/exit discussed with reference to FIGS. 9-12. Thus, although the discussion of FIGS. 9-12 primarily focuses on the mobile device 17 being a "typical" UE, smartphone, or tablet, such discussion remains equally applicable when the mobile device 17 is a BLE tag. Furthermore, as noted before, the discussion of FIGS. 9-12 is fare gate-agnostic. In other words, the methodologies discussed with reference to FIGS. 9-12 apply to a gateless entry/exit location as well as a gated entry/exit location. Thus, although the discussion of FIGS. 9-12 primarily focuses on the gateless entry/exit aspect, it is understood that such discussion remains applicable—albeit with suitable modifications, as needed—to the gated entry/exit aspect as well. However, for the sake of brevity, the discussion of FIGS. 9-12 is not repeated to cover the gated entry/exit aspects.

FIG. 9 shows an exemplary flowchart 108 illustrating a mobile device-based gateless entry methodology according to one embodiment of the present disclosure. Various operational tasks shown in FIG. 9 may be performed by the mobile device 17 when the user app 12 (and other relevant program code) is executed by the CPU 22. It is noted that, the FV user app 12 may be suitably configured to provide the gateless entry/exit functionality discussed in the context of the embodiments in FIGS. 9-12. Depending on the desired application, the user app 12 may be configured to support gateless entry/exit with or without the hands-free fare validation functionality. The operational tasks shown in FIG. 9 may be performed by a mobile device to facilitate gateless entry for a transit service—like a bus service, a ferry service, a train service, and so on—when a user carrying the mobile device approaches a transit facility for the transit service. As discussed later, the transit facility may be a transit station or a transit vehicle itself.

Initially, at block 110, the mobile device 17 may determine that it is in proximity of a gateless entry location for a transit service. As discussed in more detail later, in the context of the embodiments in FIGS. 9-12, the term "gateless entry location" may be used instead of the earlier-mentioned "fare gate trigger zone" (or "fare validation zone") to emphasize the gateless entry/exit aspect instead of the fare validation aspect. However, in particular embodiments, these terms may be synonymous and may be interchangeably used. At block 112, the mobile device 17 may transmit a plurality of Bluetooth advertisement packets to a gateway unit over a Bluetooth interface, such as the Bluetooth LE interface. As discussed later, the gateway unit may be at a stationary location, such as a transit station, or may be operated in a mobile environment, such as inside a transit vehicle. The advertisement packets may be transmitted at a first transmission rate and each packet may contain data indicating that the mobile device is configured for gateless entry for the transit service. The mobile device 17 also may communicate with the gateway unit receiving the plurality of Bluetooth advertisement packets to facilitate authentication of the mobile device (block 114). In one embodiment, the gateway unit itself may authenticate the mobile device. In other embodiments, two or more system units may jointly operate to authenticate the mobile device.

As noted at block 116, upon authentication, the mobile device 17 may transmit transit data to the gateway unit using a plurality of Bluetooth data packets over the Bluetooth interface, such as the BLE interface. The data packets may be transmitted at a second transmission rate, which, in some embodiments, may be higher than the first transmission rate mentioned at block 112. In other embodiments, the first and the second transmission rates may be the same. In one embodiment, the transit data may include: (i) a device-specific value to uniquely identify the mobile device and determine the location thereof, and (ii) a secure token to facilitate validation of an electronic ticket stored in the mobile device for the transit service. As discussed later, the device-specific value and the secure token may be processed by the relevant processing entities to authorize the user-carrying the mobile device to proceed to the "paid area" in a gateless entry environment. Subsequently, at block 118, the mobile device 17 may inform the user to avail the transit service through the gateless entry location. An alert (audible, visible, or audiovisual) or "OK for transit" or a similar message may be displayed on the mobile device (or played as an audio clip) to inform the user to continue proceeding into the transit vehicle or a designated boarding area (or "paid area") for the transit service in a gateless entry environment.

FIG. 10 shows an exemplary flowchart 120 illustrating a control unit-based gateless entry methodology according to one embodiment of the present disclosure. In particular embodiments, the controller unit 18 itself may operate as the control unit. In that case, various operational tasks shown in FIG. 10 may be performed by the controller unit 18 when the controller driver 14 (and other relevant program code) is executed by the CPU 30. In other embodiments, the controller unit 18 may operate in conjunction with other units (as discussed later with reference to the exemplary embodiments in FIGS. 11-12) to provide the functionality of the control unit in FIG. 10. In that case, the controller driver 14 may be suitably configured to accomplish the gateless entry functionality in a distributed manner. The operational tasks shown in FIG. 10 may be performed by a control unit to facilitate gateless entry for a transit service—like a bus service, a ferry service, a train service, and so on—when a user carrying a mobile device, such as the mobile device 17, approaches a transit facility for the transit service. As discussed later, the transit facility may be a transit station or a transit vehicle itself.

Initially, at block 122, the control unit may authenticate the mobile device using Bluetooth-based messaging with the mobile device over a Bluetooth interface, such as a BLE interface. Upon authentication of the mobile device, the control unit may receive transit data from the mobile device over the Bluetooth interface (block 124). In one embodiment, the transit data may include: (i) a device-specific value to uniquely identify the mobile device and determine the location thereof, and (ii) a secure token to facilitate validation of an electronic ticket stored in the mobile device for the transit service. Based on the secure token, the control unit may determine that the electronic ticket is valid for transit (block 126). As discussed later, in one embodiment, the control unit may access a database containing a record of purchased tickets to validate the electronic ticket associated with the secure token received from the mobile device 17. At block 128, the control unit may provide the device-specific value (received at block 124) to a positioning unit to enable the positioning unit to uniquely identify the mobile device 17 and determine the location of the mobile device 17. Thereafter, at block 130, the control unit may receive a timestamped location data for the mobile device 17 from the positioning unit. Based on the timestamped location data, the control unit may determine that the user (of the mobile device 17) is entering a gateless entry point for the transit service (block 132). Based on the earlier validation of the user's electronic ticket (at block 126), the control unit may allow the user to avail the transit service through the gateless entry point, as noted at block 134. In one embodiment, the control unit may actuate one or more indicators prompting the user to avail the transit service through the gateless entry location. The indicators may include one or more audible indicators, one or more visible signs/indicators, or both. This informs the user (carrying the mobile device 17) to continue proceeding into the transit vehicle or a designated boarding/paid area for the transit service in a gateless entry environment.

Figure 11:
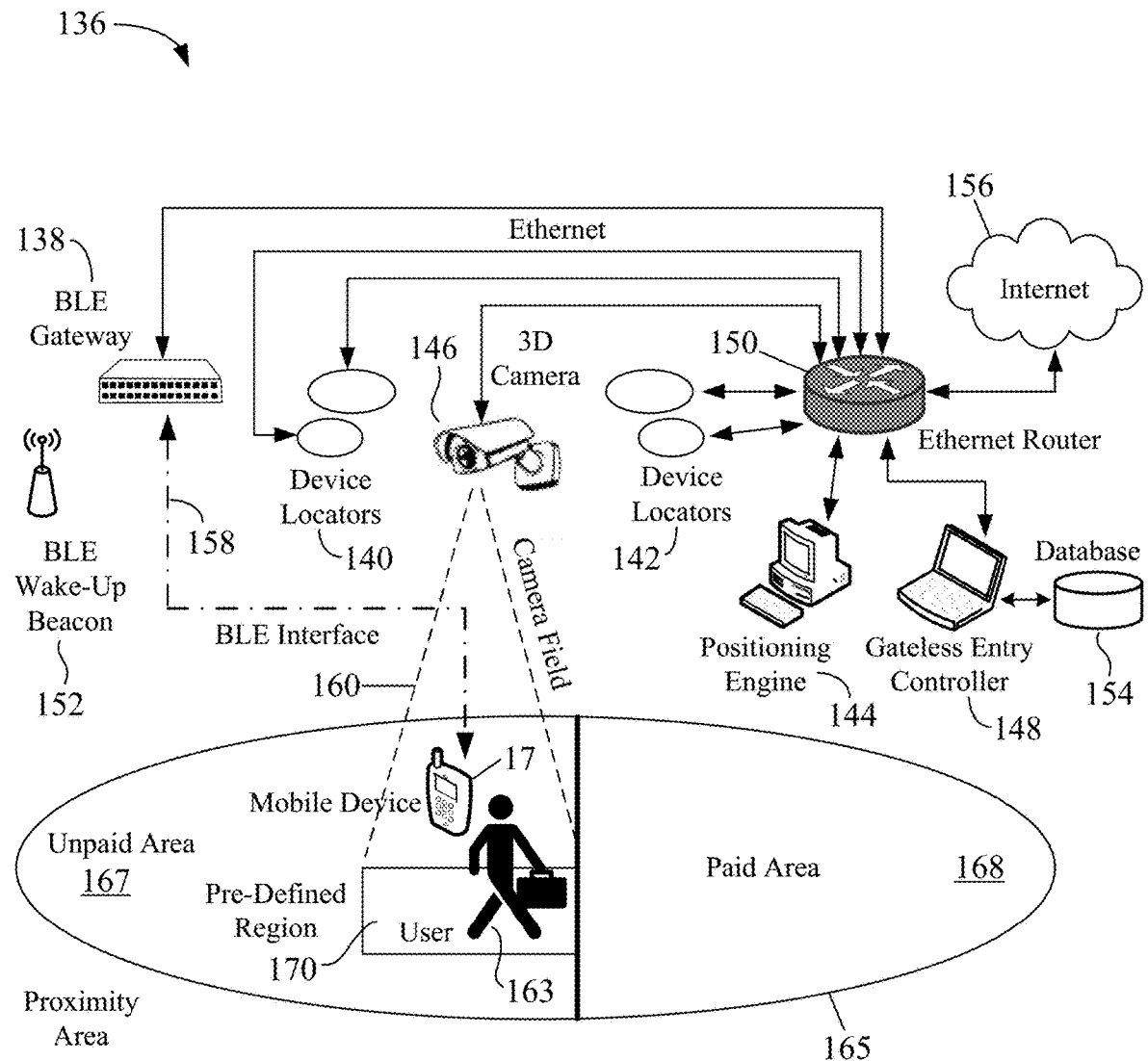
FIG. 11 shows an exemplary illustration of system components to implement a walk-in-walk-out configuration of gated or gateless entry/exit at a transit station according to one embodiment of the present disclosure.
Figure 12:
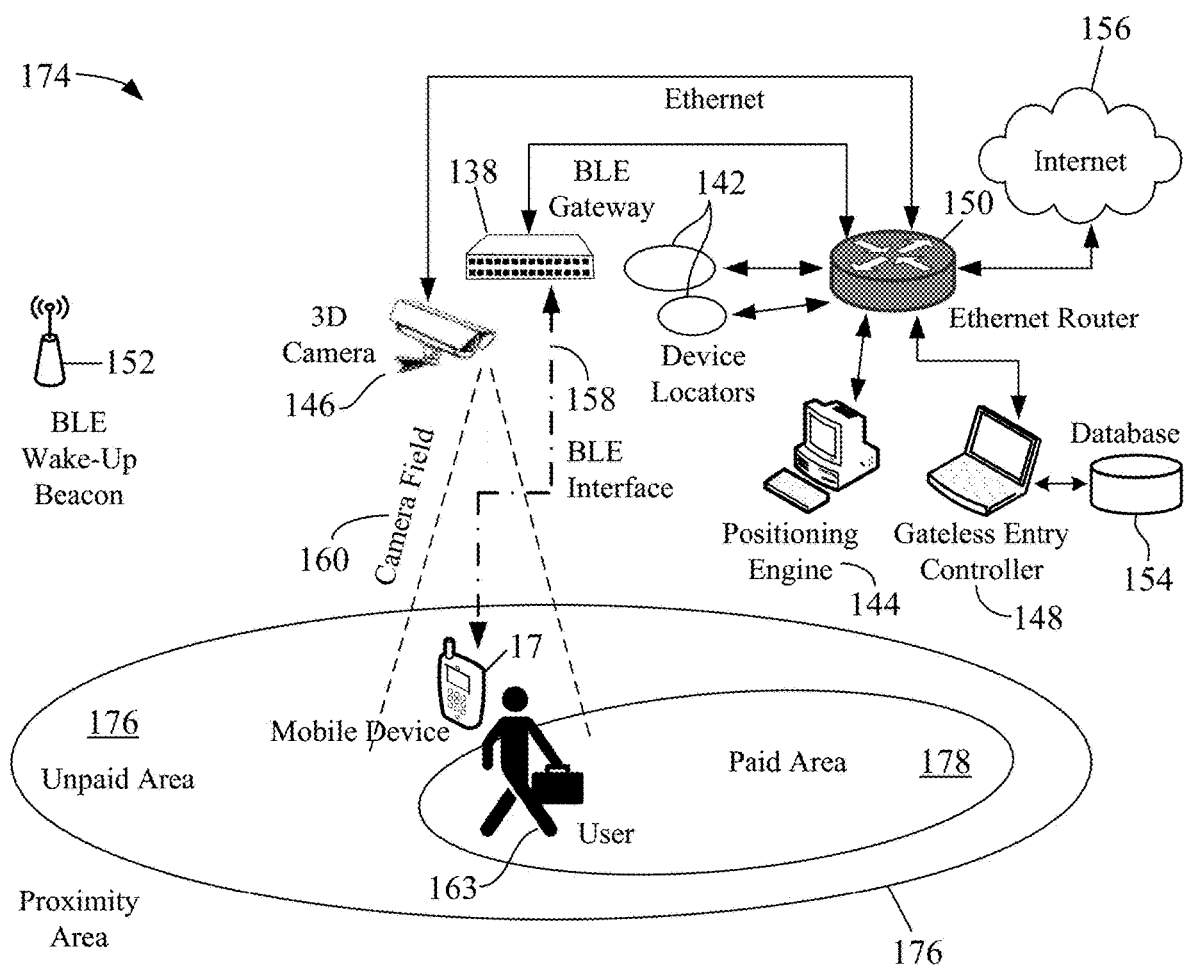
FIG. 12 shows an exemplary illustration of system components to implement a be-in-be-out configuration of gated or gateless entry/exit in a transit vehicle according to one embodiment of the present disclosure.

FIG. 11 shows an exemplary illustration 136 of system components to implement a walk-in-walk-out configuration of gated or gateless entry/exit at a transit station (not shown) according to one embodiment of the present disclosure. On the other hand, FIG. 12 shows an exemplary illustration 174 of system components to implement a be-in-be-out configuration of gated or gateless entry/exit in a transit vehicle (not shown) according to one embodiment of the present disclosure. Although the configurations in FIGS. 11 and 12 are implemented in different environments—stationary (FIG. 11) vs. mobile (FIG. 12), they are substantially similar in the sense that they employ essentially the same type of system components, albeit in different environments, and also provide substantially similar functionality to facilitate gateless entry as per teachings of the present disclosure. Therefore, for ease of discussion, the system components common between the embodiments in FIGS. 11-12 are identified using the same reference numerals. It is understood, however, that, such common reference does not imply that the implementations in FIGS. 11-12 are identical or interchangeable. Rather, as mentioned before, these two implementations are distinct and devised for different operating environments—stationary (FIG. 11) vs. mobile (FIG. 12).

Referring now to FIG. 11, the system components in the operating configuration 136 may primarily include a Bluetooth gateway (such as a BLE gateway) 138; a positioning unit comprising a first set of device locators 140, a second set of device locators 142, and a positioning engine 144; at least one camera such as a three-dimensional (3D) camera 146; a gateless entry controller 148; and a router such as an Ethernet router 150. In particular embodiments, the operating configuration 136 also may optionally include at least one BLE (or other type of Bluetooth) wake-up beacon 152 and a database 154. In one embodiment, the router 150 may be connected to or operatively/communicatively coupled to the system components 138, 140, 142, 144, 146, and 148 via respective wired connections, as shown by unbroken, bi-directional arrows in FIG. 11. In particular embodiments, some or all of these wired connections may be Ethernet connections. The router 150 also may be connected to the Internet 156 or a similar packet-switched (or IP) network through a wired connection, such as an Ethernet connection. The entry controller 148 may be coupled to or operatively connected to the database 154 through a respective wired connection, such as an Ethernet connection. As discussed in more detail later, the BLE gateway 138 may communicate with the mobile device 17 using a wireless connection, such as a BLE interface, as indicated by a broken (dashed), bi-directional arrow 158 in FIG. 11. Although not shown in FIG. 11, in certain embodiments, the wake-up beacon 152 and/or the controller 148 also may communicate with the mobile device 17 using a wireless connection, such as a BLE connection.

The system components in the operating configuration 174 of FIG. 12 are similarly identified, but not individually listed/mentioned here for the sake of brevity. Based on a comparison of FIGS. 11 and 12, it is observed that the positioning unit in case of FIG. 12 may not include the first set of device locators 140 because they may not be needed in a transit vehicle-based implementation in certain embodiments. In other words, less number of device locators may suffice for a transit vehicle-based implementation. Furthermore, it is noted that the number and placement of components in FIGS. 11-12 are for illustration only. In different embodiments, multiple devices of the same type—for example, multiple 3D cameras—may be needed depending on the desired coverage and physical geometry of the area to be covered for gateless entry operations.

Prior to discussing the hardware features and operational aspects of the system components in FIGS. 11-12, a brief overview of the distinctions between a "walk-in-walk-out" (WiWo) configuration of FIG. 11 and a "be-in-be-out" (BiBo) configuration of FIG. 12 is provided. The WiWo configuration may be implemented in a stationary location—such as, for example, a train station, a bus stop, a ferry dock, and so on—where a traditional "check-in-check-out" (CiCo) configuration is applicable. In a traditional CiCo configuration, a user may be required to perform an action—such as, for example, swipe fare media, present a barcode to a barcode reader, tap a contactless card, and the like—at least once to enter a paid area that allows boarding a transit vehicle, and the user also may be required to perform an action to exit the paid area when leaving the transit vehicle. In contrast, the WiWo configuration may be used without fare gates because the controller driver 14 in the gateless entry controller 148 could track multiple users across a large area. In a gateless WiWo system, the coverage area may need to have sufficient device locators—such as the locators 140, 142—as well as full 3D camera coverage.

In contrast to a WiWo system, the BiBo configuration may be implemented in a mobile environment such as, for example, in trains, buses, ferries, or other transit vehicles. A BiBo system may be part of a gateless environment and installed in a transit vehicle. In a BiBo system like the one in the embodiment of FIG. 12, the device locators 142 and the BLE gateway 138 may be mounted physically inside the transit vehicle, whereas the BLE wake-up beacon 152 can be at the transit station or in the transit vehicle. The inside area of the transit vehicle may need a sufficient number of device locators 142 for proper coverage. As discussed later, in a BiBo configuration, the boundaries of the "paid area" may be the perimeter of the transit vehicle. The 3D camera(s) 146 may be mounted at the entry/exit points of the transit vehicle with the camera field-of-view covering the width of the passageway. The WiWo and BiBo arrangements shown in FIGS. 11-12, respectively, may be suitably modified in particular use cases to accomplish the gateless entry/exit functionality in a given implementation environment—stationary vs. mobile—without departing from the teachings of the present disclosure.

Generally, in the WiWo configuration, a user may walk into and/or leave a pre-designated "paid area" in a gateless environment without performing any action. The validation of the user's ticket may be performed autonomously in the background without any manual interaction required by the user. Similarly, in the BiBo configuration for gateless entry, the user may simply walk into a "paid area" without performing any action. In a BiBo system, a user's presence in the paid area may be constantly monitored until the user exits the paid area. Like the WiWo case, the BiBo system also may perform the validation of the user's ticket autonomously in the background without any manual interaction by the user.

Referring again to FIGS. 11-12, a brief description of the exemplary hardware features of the system components shown therein is provided. In particular embodiments, the BLE wake-up beacon 152 may be functionally similar to the wake-up beacon 62 in FIG. 5 and, hence, additional discussion of the hardware features of the wake-up beacon 152 is not provided. Briefly, the wake-up beacon 152 may be a connectionless (wireless) BLE beacon that advertises data to indicate to a mobile device with the user app 12, such as the mobile device 17, that the user 163 of the mobile device is approaching a hands-free ticketing platform that has automatic fare validation and gateless entry/exit. Similarly, the 3D camera(s) 146 may be functionally substantially similar to one or more of the "people counting devices" 67-68 and, hence, the hardware features of the 3D camera(s) 146 are not discussed in further details here. In some embodiments, however, the 3D camera 146 may be an infrared camera that uses time-of-flight (TOF) technology to detect and track objects in the camera's field of view 160.

As mentioned before, in some embodiments, the controller 148 may operate as a "control unit" discussed with reference to the flowchart 120 in FIG. 10. However, in the embodiments of FIGS. 11-12, the BLE gateway 138 and the entry controller 148 may collectively operate as a "control unit" of FIG. 10 to accomplish the gateless entry/exit functionality as per teachings of the present disclosure. In one embodiment, the controller unit 148 may be functionally similar to the earlier-discussed controller unit 18 in FIGS. 2 and 5, except that the controller unit 148 may include a modified version of the controller driver 14 to accomplish the gateless entry/exit functionality associated with the embodiments in FIGS. 9-12 in addition to the hands-free fare validation functionality offered by the earlier-discussed controller unit 18. In certain embodiments, the gateway 138 may operate as a "client" whereas the entry controller 148 may operate as a "server" in a client-server configuration. The gateway 138 may communicate with the controller driver 14 to authenticate the mobile device 17, receive a secure token from the mobile device 17, and set mobile device advertisement transmission rate (discussed later). The gateway 138 may be a BLE gateway operable to wirelessly communicate with the mobile device 17 through a BLE interface, as indicated by the broken arrow 158 in FIGS. 11-12. In particular embodiments, the controller driver application 14 may enable the gateless entry controller 148 to communicate with appropriate entities—for example, via the Ethernet router 150—shown in FIGS. 11-12 to collect the following data: (i) mobile device positioning data from the positioning engine 144, (ii) person location data from the 3D camera 146, and (iii) authentication data from the BLE gateway 138. The controller driver application 14 may further enable the gateless entry controller 148 to use the collected data to validate that a user, such as the user 163 in FIGS. 11-12, has a valid ticket on the user's mobile device 17 and also to determine which user is attempting ingress into a paid area. Thus, automatic fare validation and gateless entry (or exit, as applicable) aspects may be supported through the controller driver application 14 running on the entry controller 148.

In the embodiments of FIGS. 11-12, the database 154 may store various types of digital content using a relational model of data organization. The relational database 154 may be developed, maintained and/or managed by a software system known as a Relational Database Management System (RDBMS). The RDBMS may maintain the database 154 as a field-searchable database (DB) containing a plurality of different data fields that can be searched by the controller 148—under operative control of the controller driver 14—using a query-response scheme based on, for example, the Structured Query Language (SQL). Some examples of an RDBMS include an Oracle® server, a Microsoft® SQL server, a MySQL (open source) system, and IBM® DB2 system, and so on. In particular embodiments, potential database fields may include some or all of the following: (i) a data field for unique transit vehicle/station identifier, (ii) a data field for transit vehicle stop/route information including station name and Global Positioning System (GPS) location, (iii) a data field for configuration information for each transit vehicle-based BLE gateway, (iv) a data field for the controller driver 14 configuration information, and (v) a data field for 3D camera configuration information. These database fields are exemplary only. In other embodiments, depending on the implementation of the gateless entry/exit system, the data fields may be more than, less than, or different from those listed above.

There may be a plurality of device locators 140, 142 utilized as part of a gateless entry/exit environment. The device locators 140, 142 may be placed at various locations throughout the transit station (for example, a train station or a bus stop) or transit vehicle (for example, a bus or a train) where the gateless entry/exit facility is provided. Each device locator 140, 142 may be a BLE receiver configured to "listen" for BLE advertisements (discussed below) from a mobile device, such as the mobile device 17, and send the Received Signal Strength Indicator (RSSI) and phase data to the positioning engine 144 to enable the positioning engine 144 to determine the position of the mobile device 17. The locators 140, 142 may not themselves connect or communicate with the mobile device 17, but may rather passively "listen" for BLE advertisements from the mobile device. In other words, unlike the BLE gateway 138, the locators 140, 142 may not establish a two-way communication channel with the mobile device 17. In one embodiment, the positioning engine 144 may be a computer such as, for example, a laptop or a desktop computer, a mobile device, a tablet computer, a single-board computer, or a modular controller such as a Raspberry Pi™ or Arduino™ unit. The positioning engine 144 may operate on a software that collects data from the device locators 140, 142, analyzes the collected data, and then determines the position of a mobile device, such as the mobile device 17, in a user-defined site map. In that regard, the positioning engine 144 may be communicatively coupled to the device locators 140, 142 through, for example, the Ethernet router 150. The user-defined site map may be generated in software and may be a map of the relevant site—such as, for example, a transit station or a transit vehicle where the gateless entry/exit system is implemented—that defines different regions within the map to pinpoint the location or position of a mobile device-carrying user, such as the user 163 in FIGS. 11-12. The combination of device locators 140, 142 and the positioning engine 144 may function as a BLE-based real-time locating system with high accuracy positioning. In one embodiment, the device locators 140, 142, and the positioning engine 144 (and its operating software) may be the products of Quuppa, LLC (quuppa.com) of Arlington, VA, having headquarters in Espoo, Finland.

In particular embodiments, the Ethernet router 150 may be a router capable of routing Transmission Control Protocol/Internet Protocol (TCP/IP) data or User Datagram Protocol (UDP) data over multiple Ethernet connections. The router 150 may or may not have Wi-Fi capabilities. It is noted here that in the embodiments of FIGS. 11-12, a fare gate, like the fare gate 70 in FIG. 5, may be optional. However, fare gate(s) also may be provided in some embodiments along with gateless entry/exit, as per desired implementation. As discussed earlier with reference to FIG. 5, a fare gate may be any physical mechanism used to prevent an unauthorized user from entering a paid area.

It is noted that, in one embodiment, all Bluetooth® communications between various entities in FIGS. 11-12 may conform to the standards set forth in the Bluetooth® Core Specification 4.2.

In FIG. 11, a proximity area 165 is shown to be "divided" into an unpaid area 167 and a paid area 168. In the embodiment of FIG. 11, the paid and unpaid areas are shown to be non-overlapping. However, these areas may be overlapping in some embodiments as shown, for example, in FIG. 12. A "proximity area" may be an area defined by geo-location or by the proximity to a BLE wakeup beacon that covers the path a user would need to take to a paid area in a gateless (or gated) entry/exit system. In the context of the embodiments in FIGS. 9-12, an "unpaid area" may be an area where a user may not have yet paid for transit fare or the user's pre-purchased electronic ticket has not been verified yet. Similarly, in the context of the embodiments in FIGS. 9-12, a "paid area" may refer to an area where only users who have paid the transit fare or who have valid electronic tickets are allowed to be. Generally, a "paid area" may represent a portion of the transit facility (for example, a transit station or a transit vehicle) allocated mainly for the authorized users of the transit service. A pre-defined region 170 is also shown in FIG. 11 referring to an area covered by the 3D camera's field of view 160 and located directly in the path for the user 163 to enter the paid area 168. In the gateless entry configuration 174 of FIG. 12, the proximity area 176 itself may be the unpaid area—as indicated by the usage of the same reference numeral "176" for both, whereas the paid area 178 may be a portion of (or subset of) the proximity area 176, as shown. As mentioned before, the gateless entry configuration 174 of FIG. 12 may be primarily implemented inside a transit vehicle such that the boundaries of the paid area 178 may be the perimeter of the transit vehicle whereas the unpaid area 176 may be the area surrounding the entry and exit points of the transit vehicle. Therefore, there may be an overlap between the paid area 178 and the unpaid area 176, as shown. On the other hand, the gateless entry configuration 136 of FIG. 11 may be primarily implemented at a stationary location such as a transit station. Therefore, the unpaid area 167 (farther from a transit vehicle) may be distinct (non-overlapping) from the paid area 168 (closer to the transit vehicle), as shown.

In the embodiments of FIGS. 11-12, the respective "proximity area" 165, 176 may be considered a "gateless entry location" through which a user may avail a transit service—such as, for example, a bus service, a train service, a ferry service, and the like—or enter/exit a transit vehicle in a gateless manner. As noted before, the term "gateless entry location" may be analogized with the earlier-mentioned "fare gate trigger zone" (or "fare validation zone"). However, in the embodiments of FIGS. 9-12, the term "gateless entry location" is used instead of the earlier term "fare gate trigger zone" to emphasize the gateless entry/exit aspect instead of the fare validation aspect (even though fare validation also may be performed in the embodiments of FIGS. 9-12). However, in other embodiments (such as, for example, in transit locations having gated and/or gateless entry options), these terms may be used synonymously or interchangeably. It is noted here that the mobile device's 17 presence in a gateless entry location (165 or 176) may indicate its user's 163 intent to pay a fare and proceed to the actual transit terminal or transit vehicle.

Because of substantial similarity in the hardware configurations of the embodiments in FIGS. 11-12, these embodiments are jointly addressed in the below-described operational details of gateless entry/exit. In other words, the discussion below applies to both of the embodiments in FIGS. 11-12, unless specified otherwise. The following operations illustrate how gateless entry/exit may be accomplished in particular embodiments as per teachings of the present disclosure. The operations below are numbered for ease of discussion only; the numbering does not necessarily reflect any specific order of performance or execution of described tasks.

1. Initially, the user 163 may enter the relevant proximity area 165, 176 with possession of the mobile device 17.
2. The device-based user app 12 may be triggered to run in the background by either the mobile device's 17 detection of a BLE wake-up beacon signal from the beacon transmitter 152 and/or sensing of the transit service's geo-location through the mobile device's GPS (not shown). The relevant aspects of BLE wake-up beacon transmission/reception are already discussed before with reference to discussion of FIG. 5. Thus, based on the received Bluetooth beacon signal, the user app 12 in the mobile device 17 may determine that the mobile device 17 is in the proximity of a gateless entry location 165 or 176. Alternatively (or additionally), the user app 12 may evaluate geo-location data from the mobile device's 17 GPS receiver (not shown) to determine that the mobile device is in the proximity of the gateless entry location 165 or 176.
3. Upon being triggered, the user app 12 may command the mobile device 17 to transmit BLE advertisement packets over a BLE interface, such as the interface 158. Each advertisement packet may contain data indicating that the mobile device 17 contains the user app 12 and is configured for gateless entry/exit for the relevant transit service. In case of a gated entry location such as a fare gate, each advertisement packet may contain data indicating that the mobile device is configured for gated entry/exit for the transit service. In some embodiments, the transmission rate of these advertisement packets may be slower in order to conserve battery. It is noted here that, if the mobile device 17 operates on an iOS™ operating system, in some embodiments, the BLE gateway 138 may be required to advertise data packets and/or be discoverable to the mobile device 17 before authenticating the mobile device 17 (discussed below). However, the iOS mobile device may still need to advertise BLE packets to enable the device locators 140 and/or 142 to determine its position (discussed below).

In other words, in case of iOS-based mobile devices, the BLE gateway 138 may need to command the iOS mobile device—via the BLE interface 158—to start transmitting BLE advertisement packets instead of just commanding it to increase the transmission rate of BLE packets (discussed below). These iOS™ device-related additional steps may be optional in case of an Android™-based mobile device.

4. The BLE gateway 138 may detect one or more of the BLE advertisement packets and initiate a connection with the mobile device 17 over the BLE interface 158.
5. Once connection has been established between the mobile device 17 and the gateway unit 138, the BLE gateway 138 may authenticate the mobile device 17 using Bluetooth-based messaging with the mobile device 17 over the BLE interface 158. Such messaging may include a scheme such as "challenge-response" in which the user app 12 may communicate with the gateway unit 138 to facilitate authentication of the mobile device 17. The authentication may be performed by the gateway unit 138 alone or through communication with the controller driver 14 in the entry controller 148 or with any other unit(s) (not shown). In certain embodiments, a mobile device may need to be authenticated to make sure that the mobile device attempting to utilize a transit service is indeed an authorized mobile device and is not otherwise prohibited from availing the transit service.
6. If the mobile device 17 is authenticated, the BLE gateway 138 may command—via the BLE interface 158—the mobile device 17 to now increase the transmission rate of the BLE advertisement packets and, within those packets, transmit a device-specific value that uniquely identifies the mobile device 17 and facilitates determination of its location, for example, collectively by the device locators 140 and/or 142 and the positioning engine 144. In some embodiments, the BLE gateway 138 may not require increased transmission rate. In that case, the mobile device 17 may transmit the new BLE packets at the same transmission rate as the BLE packets mentioned under sub-paragraph (3) above.
7. If the mobile device is authenticated, the user app 12 also may transmit a secure token over the BLE interface 158 to the BLE gateway 138. The secure token may facilitate validation of an electronic ticket stored in the mobile device for the transit service. Hence, upon receipt of the secure token, the BLE gateway 138 may communicate the token to the database 154 through the controller unit 148. In one embodiment, the database 154 may contain a record of purchased tickets to enable the controller unit 148 to determine if the user's 163 ticket (associated with the secure token) is valid or not. The controller unit 148 may send the secure token to the database 154, which may search its records and return a confirmation message to the controller unit 148 indicating that the secure token represents a valid ticket. The validation decision may be stored in the controller unit 148 (by the controller driver 14) for the access decision at a later time.
8. In one embodiment, the manufacturer/provider of the device locators 140, 142 and the positioning engine 144 may be the same. In that case, the device-specific value mentioned above may include a manufacturing value and unique manufacturer data/keys provided by that manufacturer for the mobile device 17. This device-specific value (containing unique manufacturer keys) may have been pre-stored in the mobile device 17 (for example, by the user app 12). The gateway 138 may provide the device-specific value to the positioning engine 144 over the Ethernet to enable the positioning engine 144 to uniquely identify the mobile device 17 from among a plurality of mobile devices in the proximity area 165 or 176 and to also determine/confirm its location.
9. It is noted here that, in FIG. 11, the device locators 140 and 142 are shown separated by the camera 146 simply for the sake of illustration. In particular embodiments, all of the device locators 140 and 142 may be placed in a spread-out cluster without any intervening device/unit. Based on BLE signaling from the mobile device 17, one or more of the device locators 140 and/or 142 may detect the mobile device 17 (without actively connecting or communicating with the device 17, as noted earlier). For example, the device locators 140 and/or 142 may passively "listen" to the BLE advertisement packets mentioned in sub-paragraph (6) above to determine the location of the mobile device 17. As also mentioned in sub-paragraph (6) above, in some embodiments, the BLE gateway 138 may instruct the mobile device 17 to increase the post-authentication transmission of BLE packets. Such increased rate of transmission may provide as much data as possible to the locators 140, 142 within a short period of time, thereby expediting the determination of location of the mobile device 17. Depending on the position of the locators 140, 142 and the mobile device 17, the mobile device-detecting locators may use angle-of-arrival or triangulation to determine the precise location of the mobile device 17. The location information of the mobile device 17 may be conveyed to the positioning engine 144 for further processing.
10. The positioning engine 144 may receive the mobile device location information from the device-detecting locators 140, 142, and analyze that information in view of the unique manufacturer keys received from the BLE gateway 138 as part of the device-specific value mentioned before. As a result, the positioning engine 144 may affirmatively identify the mobile device 17 and associate it with the location data received from the device locators 140, 142. The positioning engine 144 may generate a two-dimensional (2D) version of the location data indicating a respective x-y position of the mobile device within the proximity area 165 or 176. The positioning engine 144 may timestamp the 2D location data for each unique mobile device, such as the device 17, and send the timestamped location data to the controller unit 148 (and, hence, to the controller driver 14) via the Ethernet router 150. The controller driver 14 may collect this location data as an x-y position with a timestamp and may optionally smooth the received data using techniques such as Kalman filtering and cubic splines. In some embodiments, the positioning engine 144 also may provide a three-dimensional (3D) version of location data in terms of x-y-z (height) coordinates. In certain embodiments, the controller driver 14 may be configured to collect and use such 3D location data instead of the 2D location data.
11. When the user 163 enters the pre-determined region 170 (FIG. 11) or a similar coverage location within the proximity area 176 (FIG. 12) with the mobile phone 17 in possession, the 3D time-of-flight camera 146 may detect the person 163 as an object in the camera's field of view 160. The camera 146 may generate a 2D version of the location of this "object" indicating the x-y position of the user 163 within the pre-defined region 170 (or a similar coverage location within the proximity area 176). The camera 146 may then communicate the presence and position of this "object" to the controller driver 14 by sending a timestamped version of the 2D "object" location data to the entry controller 148. The controller driver 14 may collect this location data as an x-y position with a timestamp and may optionally smooth the received data using techniques such as Kalman filtering and cubic splines. In some embodiments, the camera 146 also may provide a three-dimensional (3D) version of location data in terms of x-y-z (height) coordinates. In certain embodiments, the controller driver 14 may be configured to collect and use such 3D location data instead of the 2D location data.

12. The user 163 may then exit the camera field 160 (and, hence, the pre-defined region 170 or a similar coverage location within the proximity area 176), at which point the controller driver 14 in the controller unit 148 may compare the device-specific timestamped location data from the positioning engine 144 with the device-specific timestamped location data from the 3D camera 146 to determine if the user 163 is attempting to ingress into the paid area 168 (or 178). In case of multiple users proceeding towards the paid area, such comparison of device-specific timestamped location data (for each mobile device) from two different sources may allow the controller unit 148 to determine which user is attempting ingress into the paid area. The validity of the electronic ticket on the user's mobile device 17 will have already been determined (as discussed before) prior to any decision based on this data comparison.

13. If there is a fare gate, like the fare gate 70 in FIG. 5, the controller driver 14 in the controller unit 148 may send the appropriate command to the gate to either open if the user's ticket is valid or remain closed if the user's ticket is invalid. In one embodiment, when the gate opens, the user can enter a "paid area" to avail the transit service.

14. As mentioned before, the gateless entry facility may be provided without a fare gate or along with it (as an additional alternative). In a gateless entry/exit environment, audible and/or visible indicators may be provided in the paid area 168, 178 to guide the user 163. If there are indicators (not shown), the controller driver 14 may command the indicators to actuate in a manner that corresponds to the access decision—that is, whether the user should be allowed to avail the transit service through a gateless entry point or not. For example, if the user has a valid ticket and the controller unit 148 has authorized the user to avail the transit service, one or more Light Emitting Diode (LED) lights may be turned on illuminating the gateless entry point, a speaker may be actuated to emit a specific sound or instructions, a flashing arrow sign pointing towards the gateless entry may be actuated, and so on. The user can continue walking into a transit vehicle or a pre-designated boarding area for the transit service in a gateless manner. This hassle-free approach may significantly improve the user experience and passenger throughput, especially during peak periods.

15. As mentioned before, in one embodiment, the controller unit 148 may transmit its access decision—gateless entry granted or denied—to the mobile device 17 via a BLE message to the mobile device 17 to present a notification to the user 163 of the status of the relevant transit ticket. In particular embodiments, the controller unit 148 may occasionally communicate with the mobile device 17 via a Bluetooth interface, as discussed before with reference to FIG. 5. The access decision may include a ticket acceptance response indicating that the electronic ticket associated with the secure token received from the mobile device 17 is valid for transit. The user app 12 may present the received information as an audible and/or visible notification on the mobile device 17.

The embodiments in FIGS. 9-12 illustrate exemplary approaches to facilitating gateless entry/exit for a transit service. As discussed, various system components—such as, for example, the BLE gateway 138, the device locators 140, 142, the 3D camera 146, the entry controller 148, and the like—may operate in a coordinated manner to determine the validity of an electronic ticket stored in the user's mobile device 17 and to track the movement of the user 163 to determine the user's position vis-a-vis a pre-designated "paid area" in the system to facilitate the user's entry/exit into/out of a gateless transit point. It is noted here that although the gateless entry aspect predominates in the above discussion of FIGS. 9-12, the teachings of the present disclosure can be suitably applied—with relevant modifications, as needed—to manage gateless exit locations as well as gated entry/exit locations (for example, locations having fare gates).

FIG. 13 is an exemplary flowchart 180 illustrating a control unit-based methodology according to one embodiment of the present disclosure. In particular embodiments, the controller unit 18 in FIG. 2 itself may operate as the control unit. In that case, various operational tasks shown in FIG. 13 may be performed by the controller unit 18 when the controller driver 14 (and other relevant program code) is executed by the CPU 30 and the functionality of a relevant server in the corresponding one or more of the embodiments in FIGS. 14-17 is implemented as part of the operation of the controller unit 18. In other embodiments, the controller unit 18 may operate in conjunction with other units (as discussed later with reference to the exemplary embodiments in FIGS. 14-17) to collectively provide the functionality of the control unit in FIG. 13. In that case, the controller driver 14 may be suitably configured to accomplish the relevant functionality in a distributed manner. As mentioned before, in some embodiments, the controller unit 148 in FIGS. 11-12 may represent the controller unit 18. In that case, the controller unit 148 may function as the control unit mentioned in FIG. 13. In other embodiments, the combination of the controller unit 148 and the BLE gateway 138 may be considered as the control unit in FIG. 13. In some embodiments, a server—such as, for example, the server 204 in FIG. 14 or the server 225 in FIG. 15—may function as the control unit mentioned in FIG. 13. Additional operational configurations may be devised to implement the functionality of the control unit discussed with reference to FIG. 13. The tasks shown in FIG. 13 may be performed by a control unit associated with a transit system to provide support for a number of applications/features in the transit system such as, for example, automatic capacity management to help transit operators, dynamic trip planning for transit passengers, automatic fraud detection alerts for fare inspectors, and dynamic vehicle routing assistance to vehicle operators. Each of these applications is discussed in more detail later with reference to the corresponding one of the FIGS. 14-17.

Initially, at block 182, the control unit may receive sensor data from a plurality of sensors—like 3D cameras, GPS sensors, proximity beacons, and so on—in the transit system. As noted at block 182, the control unit may be communicatively coupled with the sensors. In particular embodiments, each sensor-specific portion of the sensor data may include at least one of the following: (i) a sensor-specific passenger data defining one or more attributes of a user availing a transit service in the transit system, (ii) a sensor-specific vehicle data defining one or more attributes of a transit vehicle associated with the transit service, and (iii) a sensor-specific station data defining one or more attributes of a transit station associated with the transit service.

At block 184, the control unit may combine all of the received sensor-specific passenger data to generate a system-specific passenger data, the received sensor-specific vehicle data to generate a system-specific vehicle data, and the received sensor-specific station data to generate a system-specific station data. Thereafter, at block 186, the control unit may analyze the system-specific passenger data, the system-specific vehicle data, and the system-specific station data. Subsequently, at block 188, the control unit may perform at least one of the following based on the analysis of the system-specific passenger data, the system-specific vehicle data, and the system-specific station data at block 186: (i) facilitate management of passenger-handling capacity of the transit station or the transit vehicle or both, (ii) dynamically plan a trip for the user availing the transit service, for example, to optimize the user's travel time, (iii) facilitate detection of fraud for the transit service, for example, to assist fare inspectors to flag fraud at specific stations and on specific vehicles, and (iv) dynamically plan a route for the transit vehicle, for example, to optimize passenger transit time and maximize passenger throughput.

The following three tables list exemplary data points (or sensor data) that can be collected by various sensors (or devices) used in the data analysis applications in FIGS. 14-17 (described later). The data points given below are generic data points and are exemplary in nature. The data analysis applications in the embodiments of FIGS. 14-17 are not limited to these data points nor do they require the use of these specific data points. It is understood that each application—such as, for example, the capacity management application or the fraud detection application—may not require use of all the below-mentioned data points, or use of the same data points all the time. Rather, each application may use an application-specific subset of these data points, as applicable. Similarly, each sensor may not collect all of these sensor data. Rather, each sensor may sense or collect only a sensor-specific portion of the sensor data relevant to the application for which the sensor is utilized. Each table below represents data "attributes" of a specific "entity". The "attributes" may include, for example, the name assigned to an entity-specific data point, the data type of the data point, and the data source(s) of the data point. The data source may represent the "sensor" or "device" collecting corresponding data point. The "comment" field in the tables below provides a brief explanation of what the corresponding data point name refers to. In some embodiments, attributes other than those or in addition to those listed below may be considered. An "entity" may be a transit passenger (in Table-1 below), a transit vehicle (in Table-2 below), or a transit station (in Table-3 below). A transit passenger may be a transit user who is availing a transit service—such as, for example, a bus service, a train service, or a ferry service—in the transit system. The user may be currently riding a transit vehicle or will ride a transit vehicle in the near future. In the tables below and in the discussion of the embodiments in FIGS. 14-17, the terms "passenger" and "user" may be used interchangeably. A transit vehicle (such as a bus or a train), on the other hand, is a vehicle that is associated with a specific transit service and that makes stops at stations in a transit system. A transit station is a location at which a transit vehicle makes regular stops. It is understood that a transit system may include a number of transit vehicles, transit stations, data sensors, and other system components to successfully operate the transit network for passenger mobility. In some embodiments, the transit system may support mobility or transport of non-passenger items as well, such as specific goods or packages.

TABLE 1

Passenger Attributes

| Name | Comment | Data Type | Data Source(s) |
| --- | --- | --- | --- |
| ID | Unique indicator (or identifier) of the transit user | Integer | Transit Operator System |
| Location | The geographic coordinates of the user | Floating Point | Mobile Device based GPS sensor or app, or other GPS source |
| ArrivalTime | Estimated Time of Arrival (ETA) of the passenger to a station | Time | Mobile Device based Application |
| InProximity | Is the user in proximity to a station? | Boolean | Mobile Device based BLE Beacon Monitoring |
| DepStation | Station from which the passenger will board a transit vehicle | String (of characters) | Mobile Device based Application |
| InStation | Is the user in the station? | Boolean | Gateless Entry System |
| InVehicle | Is the user in the vehicle? | Boolean | Gateless Entry System |
| ArrStation | Station at which the passenger will disembark the transit vehicle | String (of characters) | Mobile Device based Application |

TABLE 2

Vehicle Attributes

| Name | Comment | Data Type | Data Source(s) |
| --- | --- | --- | --- |
| ID | Unique indicator (or identifier) of the transit vehicle | Integer | Transit Operator System |
| Capacity | Maximum number of passengers the vehicle can hold at one time | Integer | Transit Operator System |
| Stations | Stations at which the vehicle stops along its route | List of Strings (of characters) | Transit Operator System |
| ArrStations | ETA of the vehicle at each station in its route | List of Times | CAD/AVL unit |
| Location | The geographical coordinates of the vehicle | Floating Point | CAD/AVL unit |
| Population | Current Number of passengers on the vehicle | Integer | Gateless Entry System or 3D camera, and/or BLE beacons |
| AtCapacity | Is the vehicle at capacity? | Boolean | Gateless Entry System or 3D camera, and/or Mobile Device based BLE Beacon Monitoring |

TABLE 2-continued

Vehicle Attributes

| Name | Comment | Data Type | Data Source(s) |
|---|---|---|---|
| FraudDetected | Is a flag set to indicate detection of fare fraud? | Boolean | Gateless Entry System or 3D camera, and/or Mobile Device based BLE Beacon Monitoring and Ticketing Backend |

TABLE 3

Station Attributes

| Name | Comment | Data Type | Data Source(s) |
|---|---|---|---|
| ID | Unique indicator (or identifier) of the transit station | Integer | Transit Operator System |
| Capacity | Maximum number of passengers the station can hold at one time | Integer | Transit Operator System |
| Population | The number of passengers currently in the station | Integer | Gateless Entry System or 3D camera |
| PassengersArriving | Number of passengers on the way to the station | Integer | Mobile Device based GPS sensor or app |
| Fraud Detected | Is a flag set to indicate detection of fare fraud? | Boolean | Gateless Entry System or 3D camera, and Ticketing Backend |

Figure 14:
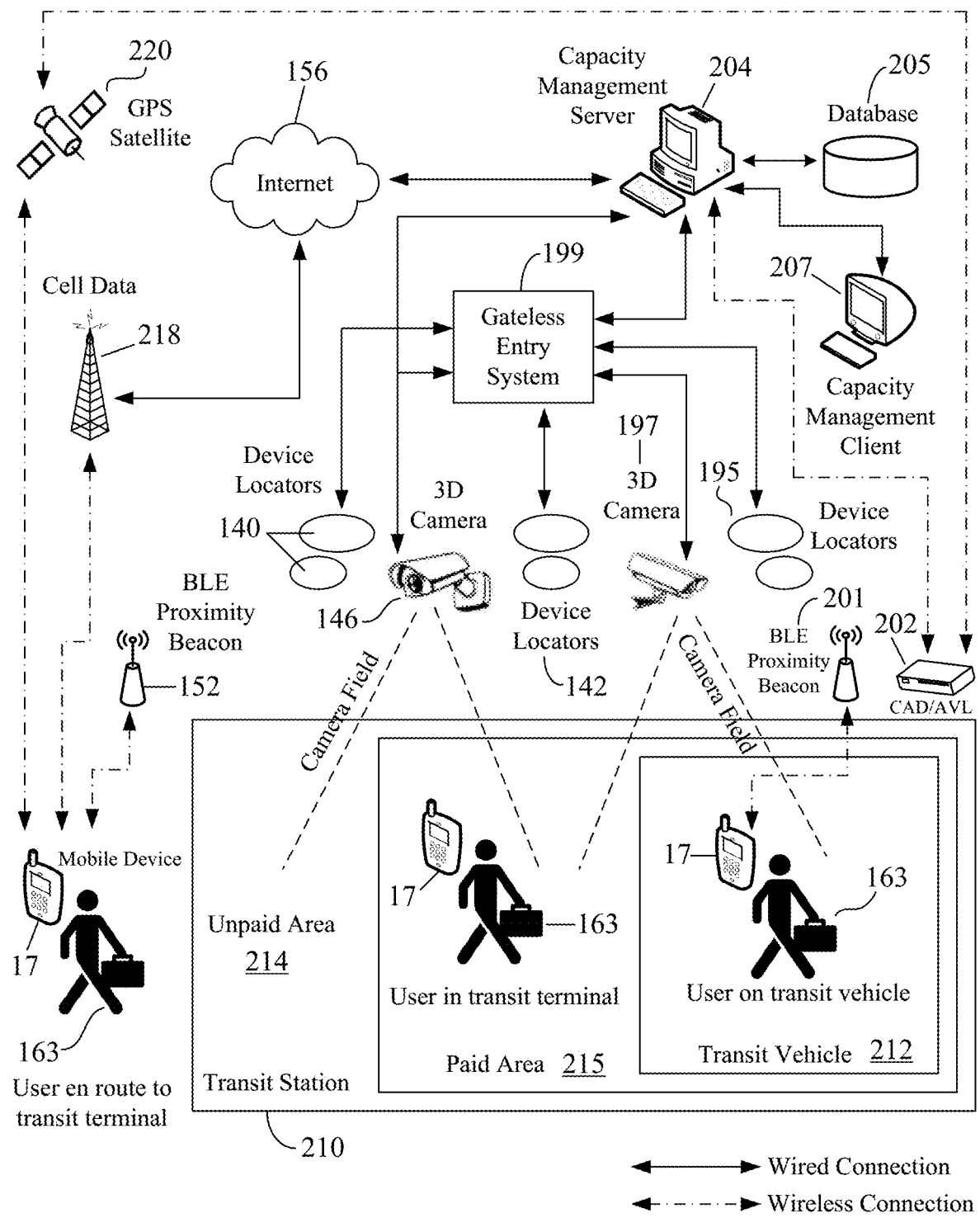
FIG. 14 shows an exemplary illustration of system components to implement the automatic capacity management application for a transit operator according to one embodiment of the present disclosure.
Figure 15:
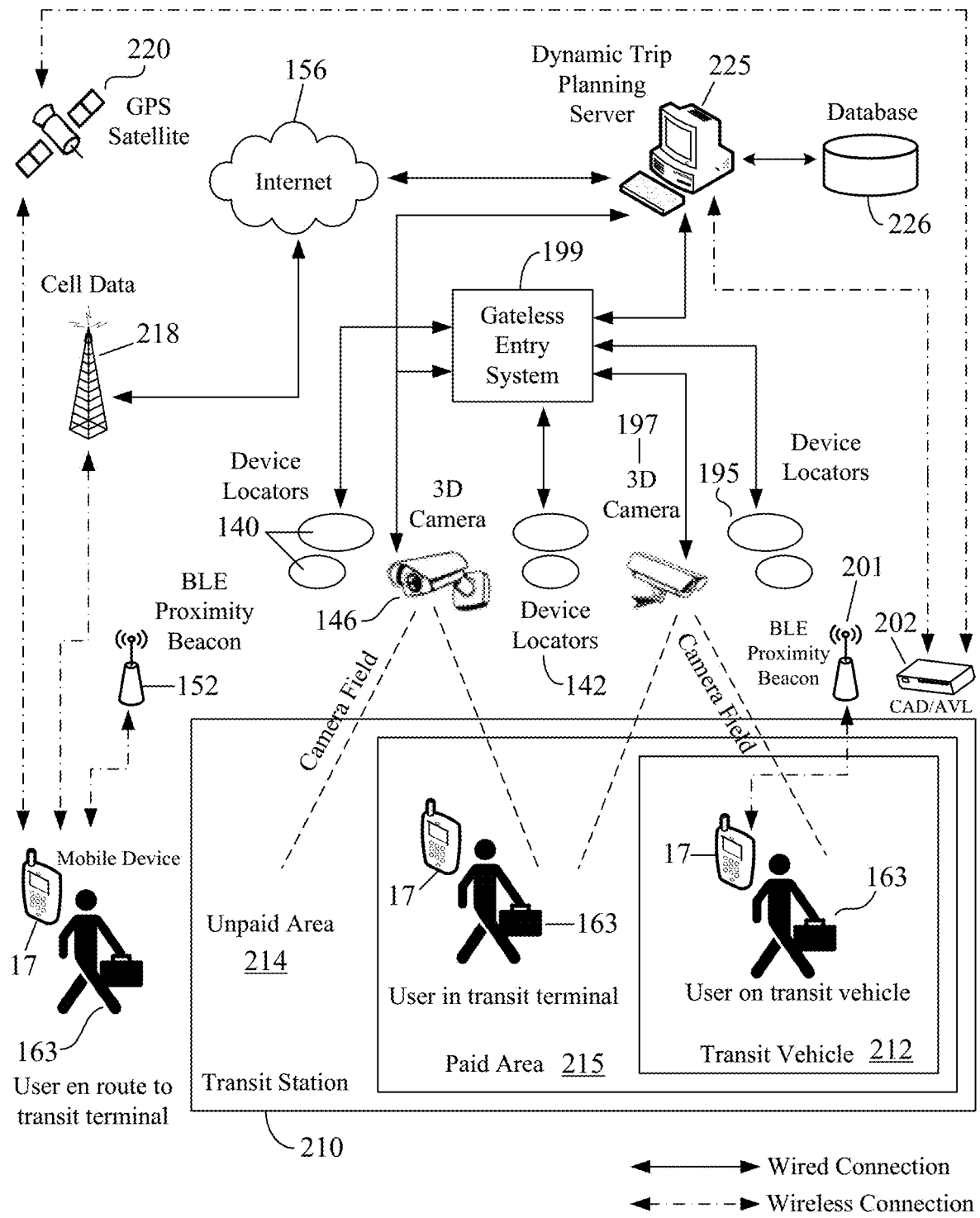
FIG. 15 shows an exemplary illustration of system components to implement the dynamic trip planning application for a transit passenger according to one embodiment of the present disclosure.
Figure 16:
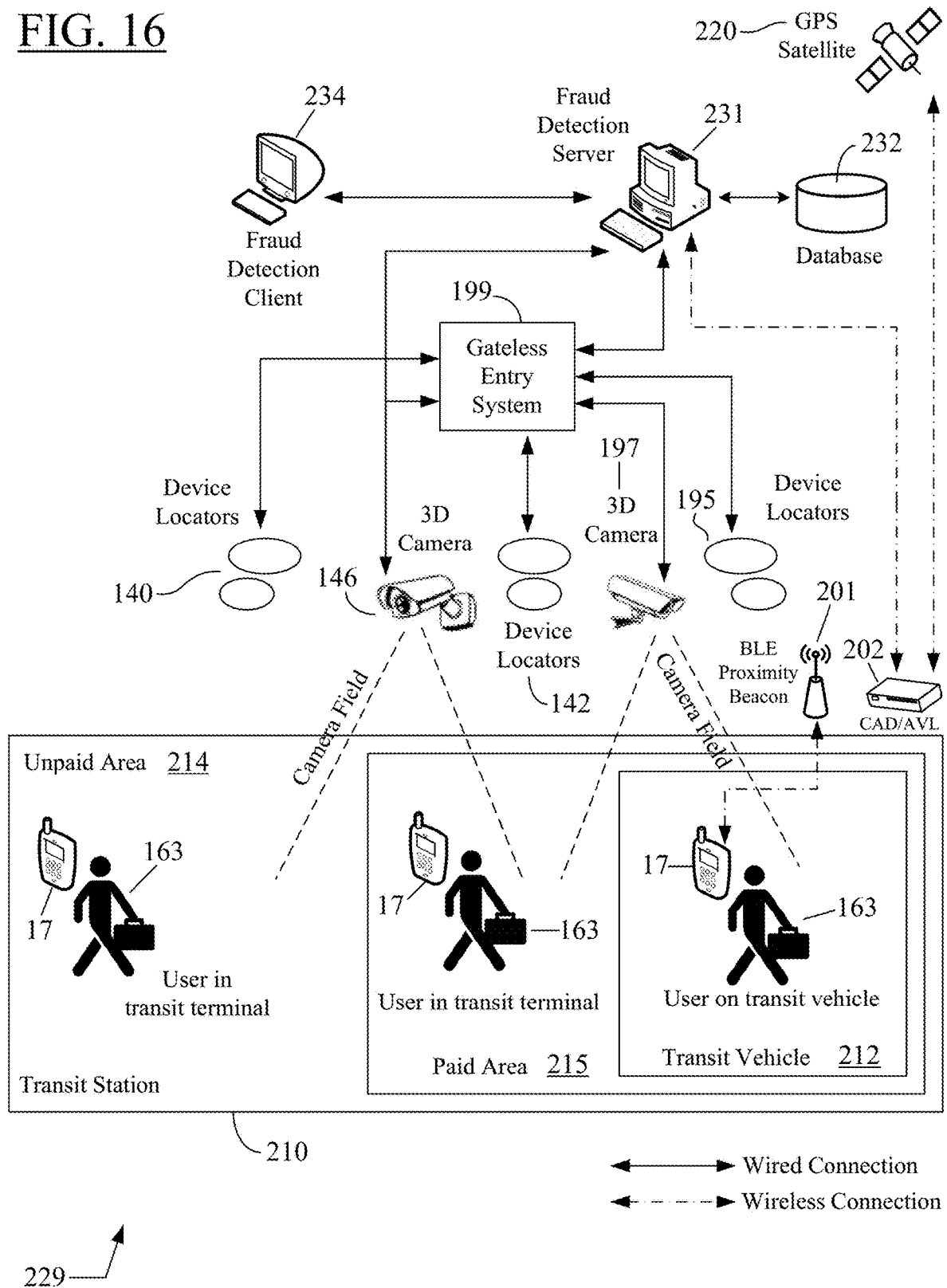
FIG. 16 shows an exemplary illustration of system components to implement the automatic fraud detection application for a fare inspector according to one embodiment of the present disclosure.

FIG. 14 shows an exemplary illustration 192 of system components to implement the automatic capacity management application for a transit operator according to one embodiment of the present disclosure. On the other hand, FIG. 15 shows an exemplary illustration 223 of system components to implement the dynamic trip planning application for a transit passenger according to one embodiment of the present disclosure. Furthermore, FIG. 16 shows an exemplary illustration 229 of system components to implement the automatic fraud detection application for a fare inspector according to one embodiment of the present disclosure. Finally, FIG. 17 shows an exemplary illustration 237 of system components to implement the dynamic vehicle routing application for a vehicle operator according to one embodiment of the present disclosure.

It is noted here that the configurations in the embodiments of FIGS. 14-17 may be used in a transit system having gateless and/or gated entry/exit. Although the configurations in FIGS. 14-17 implement different applications, many system components (including sensors and other non-sensor components) are essentially the same in these configurations as well as in the configurations in FIGS. 11-12, and also provide substantially similar functionality in data collection, transfer, routing, and processing, as applicable. Therefore, for ease of discussion, the system components and other relevant entities common among the embodiments in FIGS. 11-12 and 14-17 are identified using the same reference numerals. Similarly, the transit station- and transit vehicle-related locations in FIGS. 14-17 are also identified using the same reference numerals for ease of discussion. It is understood, however, that such common reference does not imply that the implementations in these figures are identical or that the commonly-designated components/entities are necessary in each implementation. Rather, the implementations in FIGS. 11-12 and 14-17 are distinct and devised for different applications in a transit system. For example, the gateless entry/exit aspect discussed in the embodiments of FIGS. 11-12 may or may not be employed in the embodiments of FIGS. 14-17. Thus, although a block 199 labeled "Gateless Entry System" is shown in FIGS. 14-17 as a source of data collection and input, such system may not be present in some embodiments; the data sources in FIGS. 14-17 can originate from, but are not limited to, a system like the gateless entry system 199. Furthermore, although certain types of data collection may be common among the embodiments in FIGS. 14-17, the application-specific data analysis may be distinct in each of the embodiments of FIG. 14-17, as may be evident from the discussion below.

Referring now to FIG. 14, the system components in a transit system in the operating configuration 192 may include the BLE wake-up beacon 152, the first set of device locators 140, the second set of device locators 142, a third set of device locators 195, the first 3D camera 146, a second 3D camera 197, a gateless entry system 199, a BLE proximity beacon 201, a Computer-Aided Dispatch/Automatic Vehicle Location (CAD/AVL) unit 202 (discussed later), a capacity management server 204 and an associated database 205, and a capacity management client 207. It is noted that the 3D cameras 146, 197 in FIGS. 14-17 are shown by way of examples only. In some embodiments, one or more of these cameras may be replaced by an object detection camera or sensor with/without the 3D imaging functionality. In FIGS. 14-17, a transit station is symbolically illustrated by a block with reference numeral "210" and a transit vehicle at the transit station 210 is symbolically illustrated using a block with reference numeral "212." An "unpaid area" 214 and a "paid area" 215 within the transit station 210 are also symbolically illustrated in FIGS. 14-17 for ease of reference. The same reference numeral "163" is used in FIGS. 11-12 and 14-17 to refer to the user carrying the mobile device 17. In the embodiments of FIGS. 14-17, the user 163 is considered to be availing the transit service—such as, for example, a bus service, a train service, a ferry service, and the like—at the transit station 210. It is noted here that, in FIGS. 14-17, a cell phone transceiver 218—such as a cell phone tower or a Radio Base Station (RBS), a GPS satellite 220, and/or the Internet 156 (also shown in FIGS. 11-12) are shown only for the sake of completeness of the drawings and ease of reference. It is understood that, in some embodiments, these infrastructure elements for mass communication may not be considered a part of the transit system under discussion even though they may facilitate data transmission/reception to/from some system components in FIGS. 14-17. It is noted that, in some embodiments, the mobile device 17 may communicate with the gateless entry system 199 via a BLE interface similar to the interface 158 in FIGS. 11-12. However, for the simplicity of the drawings, such BLE interface is not shown in any of the FIGS. 14-17.

Figure 17:
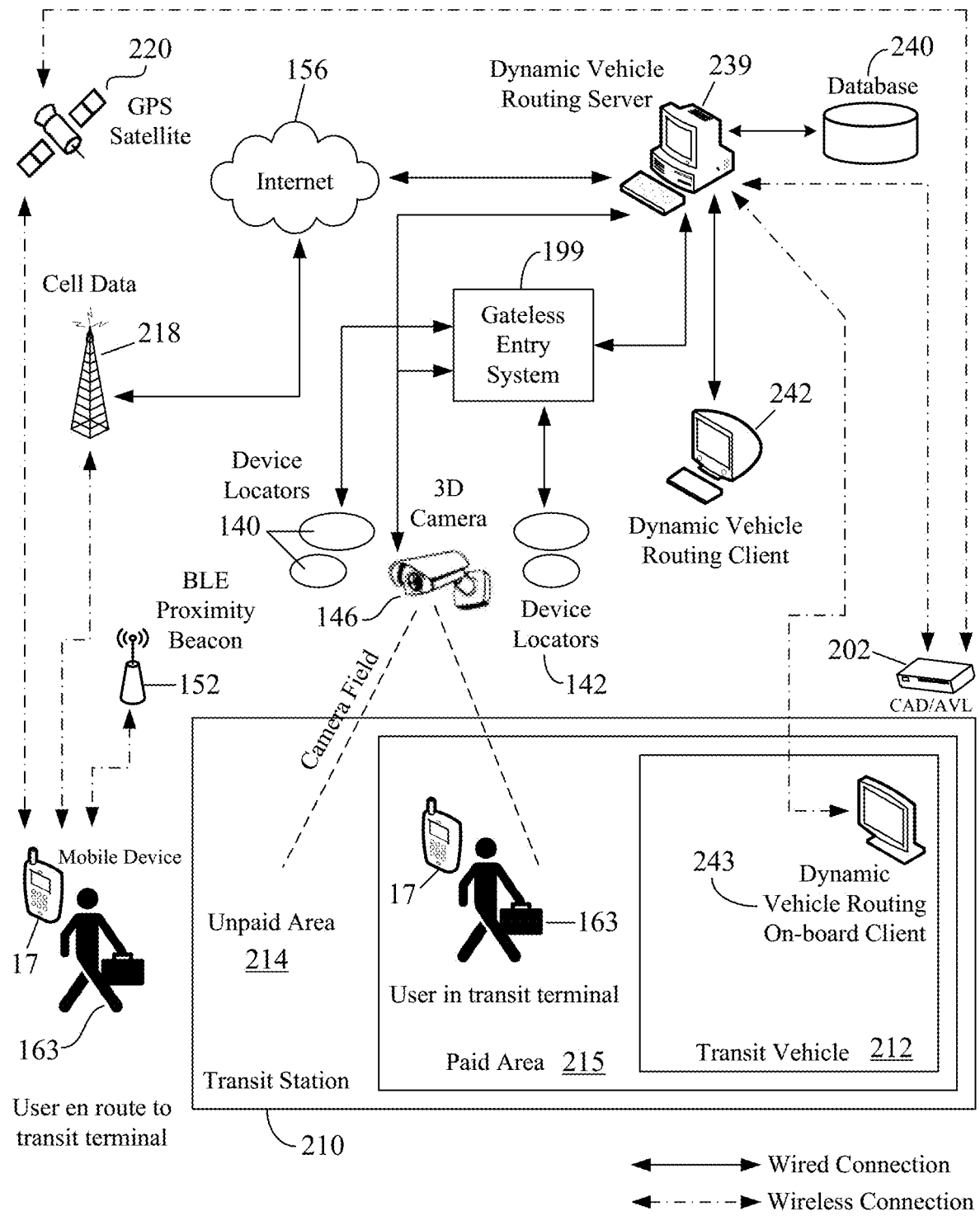
FIG. 17 shows an exemplary illustration of system components to implement the dynamic vehicle routing application for a vehicle operator according to one embodiment of the present disclosure.

As in FIGS. 11-12, a wired connection between two system components in FIGS. 14-17 is shown by an unbroken, bi-directional arrow, and a wireless connection is indicated by a broken (dashed), bi-directional arrow. For example, in FIG. 14, the mobile device 17 is shown to have a wireless connection with the BLE wake-up beacon 152, the cell tower 218, and the GPS satellite 220. Similarly, the CAD/AVL unit 202 is shown to have a wireless connection with the capacity management server 204 and the GPS satellite 220. On the other hand, some exemplary wired connections include the connections between the gateless entry system 199 and the capacity management server 204, the connections between the gateless entry system 199 and the 3D cameras 146, 197, and the device locators 140, 142, 195, and so on. Some or all of the wired connections shown in FIG. 14 may be Ethernet connections. Similar wired and wireless connections are shown in FIGS. 15-17. It is noted, however, that each wired and wireless connection in FIGS. 14-17 is not individually identified with a corresponding reference numeral merely for the sake of simplicity of the drawings. Furthermore, the wired and wireless connections shown in FIGS. 14-17 are exemplary in nature; a wired connection may be changed to a wireless one in some embodiments, and vice versa. Additionally, the lines for wired and wireless connections do not imply that a guaranteed connection between the respective communicating entities is always formed or maintained. Rather, the lines are shown merely to illustrate that at least some information is communicated between the respective system components. It is understood that, in some communication protocols, a connection implies bi-directional communication with acknowledgements between the communicating entities.

The system components in FIGS. 15-17 that are common with FIG. 14 are similarly identified, but not individually listed/mentioned here for the sake of brevity. Furthermore, it is noted that the number and placement of components in FIGS. 14-17 are for illustration only. In different embodiments, multiple devices of the same type—for example, multiple 3D cameras, multiple BLE beacons, multiple device locators, and so on—may be needed depending on the desired coverage and physical geometry of the area to be covered. Briefly, in contrast to FIG. 14, the operating configuration 223 in FIG. 15 may include a dynamic trip planning server 225 and its associated database 226; the operating configuration 229 in FIG. 16 may include a fraud detection server 231 and its associated database 232, and a fraud detection client 234; and the operating configuration 237 in FIG. 17 may include a dynamic vehicle routing server 239 and its associated database 240, a dynamic vehicle routing client 242, and an on-board dynamic vehicle routing client 243 placed on the transit vehicle 212, as illustrated.

In the context of FIGS. 14-17, it is noted that the device locators 140 and 142, the 3D camera 146, and the BLE wake-up beacon 152 are already discussed earlier with reference to the embodiments of FIGS. 11-12. Hence, discussion of the hardware features of these components is not repeated here for the sake of brevity. The additional device locators 195 shown in the embodiments of FIGS. 14-16 may be placed in or near the transit vehicle 212 and may be functionally similar to the other device locators 140, 142, and, hence, additional discussion of the hardware features of the device locators 195 is not provided. Similarly, the additional 3D camera 197 may be functionally substantially similar to the "people counting device" 67-68 (in FIG. 5) or the 3D camera 146 and, hence, additional discussion of the hardware features of the 3D camera 197 is not provided. In particular embodiments, the 3D camera 197 may have a field of view that covers a portion of the paid area 215 as well as the transit vehicle 212 as shown, by way of an example, in FIGS. 14-16. Furthermore, the BLE proximity beacon 201 may be functionally similar to one or more of the gate beacons 64-65 in FIG. 5 and, hence, additional discussion of the hardware features of the proximity beacon 201 is not provided. In particular embodiments, the proximity beacon 201 may be placed near the paid area 215 to "track" the passengers entering or exiting the transit vehicle 212.

Furthermore, the overlapping configuration of the unpaid area 214 and the paid area 215 in the embodiments of FIGS. 14-16 may be analogized with the earlier-discussed similar configuration of the unpaid area 176 and the paid area 178 in the embodiment of FIG. 12. Hence, the unpaid area 214 and the paid area 215 of the transit station 210 are not discussed in further detail here. It is observed, however, that the unpaid area 214 and the paid area 215 may be non-overlapping in some embodiments (not shown), like the unpaid area 167 and the paid area 168 in the embodiment of FIG. 11.

In the embodiments of FIGS. 14-17, the CAD/AVL unit 202 may be a system that is commonly integrated on a transit vehicle—such as the transit vehicle 212—and configured to send information about the vehicle's location, thereby allowing for the dispatch of other vehicles, field service technicians, or emergency services. Simply for ease of illustration, the CAD/AVL unit 202 is shown external to the transit vehicle 212 in FIGS. 14-17. However, it is understood that the CAD/AVL unit 202 may be mounted/placed inside the transit vehicle 212 in particular embodiments. To facilitate tracking of the location of the vehicle 212, the CAD/AVL unit 202 may be communicatively coupled with a location-tracking entity such as the GPS satellite 220, as illustrated in FIGS. 14-17. In particular embodiments, the location of the transit vehicle 212 may be provided to an appropriate server—such as, for example, the capacity management server 204 in FIG. 14 or the vehicle routing server 239 in FIG. 17—by the CAD/AVL unit 202 through a corresponding wireless connection with the server.

It is noted that, in the embodiments of FIGS. 14-17, all Bluetooth® communications between various entities may conform to the standards set forth in the Bluetooth® Core Specification 4.2. Such Bluetooth® communications may include, for example, the BLE interfaces between the mobile device 17 and the BLE beacons 152, 201; the BLE interfaces (not shown) between the mobile device 17 and the device locators 140, 142, 195; and the BLE interface (not shown) between the mobile device 17 and the gateless entry system 199 (discussed below). On the other hand, additional wireless connections in the embodiments of FIGS. 14-17 may be based on other wireless technologies or protocols. For example, the wireless connection between the mobile device 17 and the cellular tower 218 may be a cellular network connection; the wireless connection between the mobile device 17 and the GPS satellite 220 may be a cellular network-based connection or a direct satellite link-based connection; and the wireless connection between the CAD/AVL unit 202 and a server—like the server 204 or the server 239—may be a Wi-Fi connection. Other types of wireless technologies or protocols also may be used in suitable operating configurations to provide the desired wireless connectivity between various relevant entities in the embodiments of FIGS. 14-17.

In the embodiments of FIGS. 14-17, the gateless entry system 199 may either include a number of system components shown in FIGS. 11-12 or provide the functionalities of these components to support a gateless entry/exit environment at the transit station 210. These components may include, for example, the gateless entry controller 148 and associated database 154, the BLE gateway 138, the positioning engine 144, and, optionally, the Ethernet router 150. In other embodiments, the BLE gateway 138, the entry controller 148, and the positioning engine 144 may collectively operate as a single controller unit comprising the gateless system 199. Alternatively, the gateless entry system 199 may simply include the gateless entry controller 148 with or without the added functionalities of one or more other units such as the BLE gateway 138 and the positioning engine 144. Although not shown in FIGS. 14-17, the gateless entry system 199 may be operatively connected with the Internet 156 or other appropriate communication network in some embodiments. If fare gates—like the fare gate 70 in FIG. 5—are present at the transit station 210, the entry system 199 may support a gated entry/exit environment in a manner similar to that discussed before in the context of the embodiments in FIGS. 11-12. In some embodiments, the gateless entry system 199 may be absent altogether.

As discussed before in the context of the exemplary Tables 1-3 above, there may be many different devices functioning as "sensors" in the embodiments of FIGS. 14-17 to provide sensor-specific data—such as sensor-specific passenger data (Table-1 above), sensor-specific vehicle data (Table-2 above), and sensor-specific station data (Table-3 above)—to relevant servers to enable the servers to generate transit system-specific data through combination of the respective sensor-specific data. The system-specific data may include system-specific passenger data, system-specific vehicle data, and system-specific station data. For example, in the embodiment of FIG. 14, the sensors such as the 3D cameras 146 and 197, the gateless entry system 199, the CAD/AVL unit 202, and the BLE beacons 152 and 201 may provide appropriate sensor-specific data to the capacity management server 204 to enable the server 204 to generate corresponding system-specific data and analyze the system-specific data to facilitate management of passenger-handling capacity of the transit station 210 and/or the transit vehicle 212 as discussed in more detail later below. Similarly, the servers 225, 231, and 239 in the embodiments of FIGS. 15-17, respectively, may receive sensor-specific data from relevant sensors in the system and analyze the received data to support corresponding applications (like dynamic trip-planning, fraud detection, and dynamic route planning), as discussed below.

Figure 19:
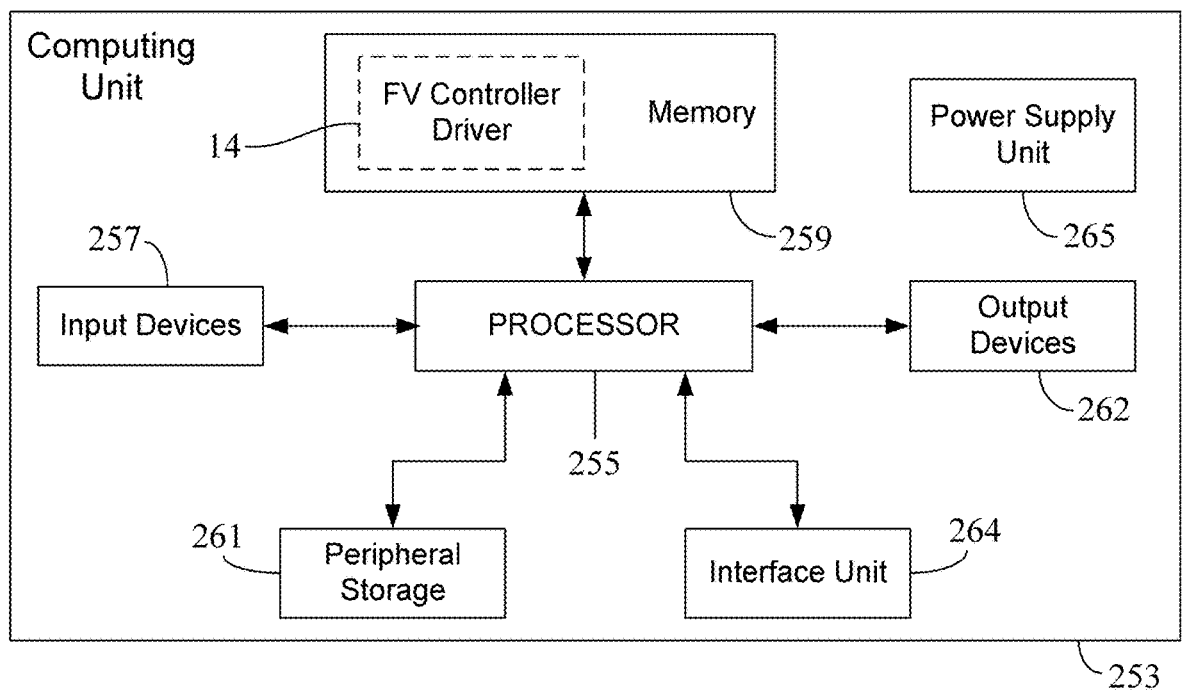
FIG. 19 depicts a block diagram of an exemplary computing unit according to one embodiment of the present disclosure.

Generally, the relevant server in the embodiments of FIGS. 14-17 may operate as the "control unit" discussed with reference to the flowchart 180 in FIG. 13. For example, in the embodiment of FIG. 14, the capacity management server 204 may be the "control unit"; in the embodiment of FIG. 15, the trip planning server 225 may be the "control unit"; and so on. In certain embodiments, a server may operate with a corresponding "client" in a client-server configuration. For example, in the embodiment of FIG. 14, the capacity management server 204 may operate in conjunction with the capacity management client 207; in the embodiment of FIG. 16, the fraud detection server 231 may operate with its corresponding client 234; and so on. As noted before, in some embodiments, the controller 148 (which may be a part of the gateless entry system 199 in FIGS. 14-17) itself may operate as a "control unit". In that case, the controller 148 may incorporate the functionality of the relevant server in FIGS. 14-17 and may include a modified version of the controller driver 14 to enable it to accomplish the corresponding data collection and analysis tasks associated with the relevant server. In some embodiments, the controller unit 148 may additionally incorporate functionalities of one or more other units constituting the system 199—such as, for example, the BLE gateway 138 and the positioning engine 144 shown in FIGS. 11-12. In some embodiments, the "control unit" mentioned in FIG. 13 may be configured to perform all of the applications discussed in the context of FIGS. 14-17. In that case, the same control unit may be used across all of the configurations in FIGS. 14-17. In particular embodiments, a suitably-modified controller driver application 14 running on the controller unit 148 may enable the controller unit 148 to function as such a common "control unit" that can support each of the four applications in the configurations of FIGS. 14-17. The foregoing are merely examples of how various units in a transit system may be used—either alone or in combination with other units in the system—to implement the functionality of the "control unit" in FIG. 13 as per teachings of the present disclosure. In some embodiments, the functionality of a "control unit" may be implemented in a manner different from the examples mentioned above. FIG. 19 (discussed later) illustrates architectural details of an exemplary control unit as per teachings of the present disclosure.

In the embodiments of FIGS. 14-17, the databases 205, 226, 232, and 240, respectively, may store various types of digital content using a relational model of data organization. These relational databases 205, 226, 232, and 240 may be developed, maintained and/or managed by the earlier-mentioned RDBMS software system. The RDBMS may maintain a database as a field-searchable database (DB) containing a plurality of different data fields that can be searched by the corresponding server or relevant control unit (which, in some embodiments, may be under operative control of the controller driver 14) using a query-response scheme based on, for example, the Structured Query Language (SQL). In particular embodiments, potential database fields may include, for example, the "name", "comment", "data type," and "data source(s)" fields shown in the earlier-given Tables 1-3 to define passenger attributes, vehicle attributes, and station attributes, respectively. These database fields are exemplary only. In other embodiments, depending on the implementation of a particular application for a transit system, the data fields may be more than, less than, or different from those listed in Tables 1-3.

The application-specific operational aspects for each of the embodiments in FIGS. 14-17 are now described below. It is noted that the following discussion of operations explains how the related application—such as, for example, the capacity management application in FIG. 14 or the fraud detection application in FIG. 16—may be accomplished in particular embodiments as per teachings of the present disclosure. The operations below may be numbered for ease of discussion only; the numbering does not necessarily reflect any specific order of performance or execution of described tasks.

Capacity Management

The operating configuration 192 of FIG. 14 may be used to accomplish capacity management. In one embodiment, the centralized capacity management server 204 may utilize various sensors or system components shown in FIG. 14 for collecting and analyzing relevant data through sensor fusion. In particular embodiments, the capacity management client 207 may be used by transit operators to plan transit services at appropriate times based on the server's 204 analysis of real time data and historical data trends. The following methodology may be implemented in the transit system of FIG. 14 to facilitate management of passenger-handling capacity of the transit station 210 and/or the transit vehicle 212. Although the capacity management server 204 is treated as a "control unit" in the discussion of FIG. 14 below, it is understood that the tasks performed by the server 204 may be performed by any other "control unit" discussed earlier.

1. Initially, the passenger 163 may select the desired destination on his/her mobile device 17. In one embodiment, a GPS and mapping application—such as, for example, a publicly-available routing/travel-planning application or the FV user app 12 (FIG. 2)—on the mobile device 17 may select the best route using public transit. The route may include information about the boarding station, the type of transit service, and the disembarking station.
2. The mobile device 17 may transmit the device-carrying passenger's GPS location, name or other identifying information of the boarding station, and estimated time of arrival (ETA) at the boarding station to a back-end server in the transit system, such as, for example, the capacity management server 204 in the embodiment of FIG. 14. As mentioned before, the mobile device 17 may be equipped with a location-tracking application that may obtain the device's GPS coordinates via the GPS satellite 220 or through the assistance from the cell tower 218.
3. The capacity management server 204 may add the passenger's transit information received from the mobile device 17 with a unique passenger ID to a passenger entity table (such as the Table-1 above) in the capacity management database 205. Each entry in the passenger table may be related either to a passenger en route to a transit station (such as the transit station 210 in FIG. 14) or to a passenger at the station 210, or to a passenger on a transit vehicle (such as the transit vehicle 212 in FIG. 14).
4. The capacity management server 204 may increment the number of passengers en route to the station 210 in the corresponding station table (such as the Table-3 above), along with each passenger's ETA.
5. The transit vehicle—such as the transit vehicle 212—associated with the passenger's desired service may periodically transmit its location (via the CAD/AVL unit 202) and expected time of arrival at the station 210 to the server 204. The server 204 may communicate with the database 205 to add this information to the vehicle table (such as the Table-2 above) as well as the station table for each station on the vehicle's route. As mentioned earlier, these vehicle and station tables may be stored in the database 205.
6. When the passenger 163 enters the proximity of the station 210, the mobile device 17 (or, in some embodiments, the user app 12 on the mobile device 17) may be triggered due to the passenger's proximity to the station 210. As discussed earlier, such triggering may be based on either geographic (or GPS) region monitoring or BLE proximity beacon monitoring. Upon triggering, the mobile device 17 (or the user app 12 on the mobile device 17) may transmit a notification to the capacity management server 204, for example, via the combination of the cell tower 218 and the Internet 156.
7. The capacity management server 204 may update the passenger's 163 entry in the passenger table (such as the Table-1 above) in the database 205 to indicate that the passenger 163 is in proximity of the station 210.
8. The passenger 163 may enter the paid area 215 of the station 210 or the transit vehicle 212 either by means of a traditional fare (such as, for example, using a payment token or receipt, swiping a magnetic strip card or a smartcard, and the like) or using the earlier-discussed hands-free ticket validation approach. The paid area 215 may be gated or gateless. In one embodiment, if the passenger 163 enters the paid area 215 under a hands-free configuration (such as, for example, one of the hands-free configurations shown in the embodiments of FIGS. 11-12), the entry controller 148 in the gateless entry system 199 may send a notification to the capacity management server 204 that the passenger 163 is in the station 210. On the other hand, if the passenger 163 uses the traditional fare media, the 3D camera 146 may detect the passenger's entry into the paid area 215 and notify the capacity management server 204 that the passenger has entered the station 210.
9. As noted in the preceding paragraph, the capacity management server 204 may receive the notification that a passenger—such as the passenger 163—has entered the station 210. In one embodiment, if the passenger uses the gateless entry configuration of any of the FIGS. 11-12 or the hands-free approach discussed earlier with reference to FIGS. 5-6, the server 204 may update the passenger's entry in the passenger table—such as, for example, the "InStation" field in Table-1 above—in the database 205 to indicate that the passenger 163 is in the station 210. Regardless of the method of entry, the server 204 also may increment the station population field in the station table in the database 205 by the number of passengers entering the paid area 215 of the station 210.
10. When the transit vehicle 212 arrives at the station 210, the number of passengers disembarking from the vehicle 212 may be counted using the gateless entry system 199 or the 3D camera 197 or both. This number may be sent to the capacity management server 204. Similarly, using the system 199 or the 3D camera 197 or both, the number of passengers boarding the vehicle 212 also may be counted and sent to the capacity management server 204.
11. The capacity management server 204 may receive the number of passengers disembarking from the vehicle 212 and may subtract that number from the "population" field in the vehicle table stored in the database 205. As noted above, the capacity management server 204 also may receive the number of passengers boarding the vehicle 212. In response, the server 204 may add the number of vehicle-boarding passengers to the vehicle population field in the vehicle table (such as the Table-2 above) in the database 205 and may subtract the same number from the station population field in the station table (such as the Table-3 above) in the database 205.

As discussed above, the capacity management server 204 may receive data from various sources/sensors in the transit system, combine and store the received data in corresponding tables in the database 205, continually update appropriate fields in the data tables with most recent data, and then analyze the system-wide data in the updated data fields to provide useful information to transit operators. For example, as part of its data analysis, the capacity management server 204 may compare the most-recent value of the "population" field in the station table for the transit station 210 with a transit operator-specified capacity value/threshold for the station 210 and, based on the comparison, may report to the capacity management client 207 whether the station 210 is currently at capacity. Similarly, the server 204 may compare the estimated arrival times of passengers with the estimated arrival times of vehicles at the station 210 to report to the client 207 that the station 210 will be at capacity within a specified time interval or at/around a certain time in the near future.

The client 207 can flag (or identify) the station 210 that is currently at capacity. This feature may allow (or alert) a transit operator to route more vehicles to the station 210, close the station to incoming passengers due to safety concerns, and/or send a notification to the passengers en route to the station 210 that the station is at capacity. Similarly, the client 207 may also flag the station 210 that will be at capacity in the near future. This feature may allow the transit operator to route more vehicles to the station, close the station to incoming passengers due to safety concerns, and/or send a notification to the passengers en route that the station is at capacity.

In particular embodiments, the server 204 may also compare the most-recent value of the "population" field in the vehicle table for the transit vehicle 212 with a transit operator-specified capacity value/threshold for the vehicle 212 and, based on the comparison, may report to the capacity management client 207 whether the vehicle 212 is currently at capacity. Similarly, the server 204 may compare the estimated demand for a transit service provided through the transit station 210 with the estimated arrival times of vehicles (serving the station 210) at various stops along their route to the transit station 210. Based on this comparison, the server 204 may report to the client 207 that the vehicle 212 will be at capacity upon reaching the station 210 or soon thereafter.

The client 207 can flag (or identify) the vehicle 212 that is currently at capacity. This feature may allow (or alert) a transit operator to add more vehicles to the service (associated with the vehicle 212), and/or send a notification to the passengers intending to use the service that the vehicle 212 is at capacity. Similarly, the client 207 may also flag the vehicle 212 that will be at capacity in the near future. This feature may allow the transit operator to add more vehicles to the station to compensate for the unavailability of the vehicle 212 due to capacity issues, and/or send a notification to the passengers en route to the station 210 that a specific vehicle—here, the vehicle 212—will be at capacity.

In certain embodiments, the transit operator may send a text message or a specific visible or audible alert to the passenger's mobile device to provide the above-mentioned notification. Furthermore, in some embodiments, the operator or an authorized representative of the operator may periodically access the client 207 for the most up-to-date status alerts about capacity issues in the transit system. The access may be remote, such as, for example, via the Internet. Alternatively, the client system 207 may be programmed or set up to provide automatic alerts—audible or visible or both—to the transit operator or its service personnel when a capacity issue arises with a transit station or a transit vehicle in the operator's transit network.

Dynamic Trip Planning for Passengers

The operating configuration 223 of FIG. 15 may be used to accomplish dynamic trip planning for passengers. In one embodiment, the centralized dynamic trip planning server 225 may utilize various sensors or system components shown in FIG. 15 for collecting and analyzing relevant data through sensor fusion. In particular embodiments, a dynamic trip planning application may be used by transit passengers to plan the fastest route to a destination based on the server's 225 analysis of real time data and historical data trends. In one embodiment, the trip-planning application may be a stand-alone application. In another embodiment, the functionality (or program code) of the trip-planning application may be implemented as part of the FV user app 12 (FIG. 2). The following methodology may be implemented in the transit system of FIG. 15 to facilitate dynamic trip planning. Although the trip-planning server 225 is treated as a "control unit" in the discussion of FIG. 15 below, it is understood that the tasks performed by the server 225 may be performed by any other "control unit" discussed earlier.

1. Initially, the passenger 163 may select the desired destination on his/her mobile device 17. In one embodiment, a GPS and mapping application—such as, for example, a publicly-available routing/travel-planning application or the FV user app 12 (FIG. 2)—on the mobile device 17 may select the best route using public transit. The route may include information about the boarding station, the type of transit service, and the disembarking station.

2. The mobile device 17 may transmit the device-carrying passenger's GPS location, name or other identifying information of the boarding station, and estimated time of arrival (ETA) at the boarding station to a back-end server in the transit system, such as, for example, the dynamic trip planning server 225 in the embodiment of FIG. 15. As mentioned before, the mobile device 17 may be equipped with a location-tracking application that may obtain the device's GPS coordinates via the GPS satellite 220 or through the assistance from the cell tower 218.

3. The trip-planning server 225 may add the passenger's transit information received from the mobile device 17 with a unique passenger ID to a passenger entity table (such as the Table-1 above) in the dynamic trip-planning database 226.

4. The trip-planning database 226 may contain all the relevant data needed for dynamic trip planning, such as, for example, the current population of the passenger-selected boarding station, the expected population of the boarding station by the ETA of the passenger, vehicle ETA at the boarding station, current vehicle population, and so on. These data may be stored in relevant tables (such as Tables 1 through 3 discussed before) and collected through methods similar to those discussed before under the "capacity management" section with reference to discussion of FIG. 14.

5. The dynamic trip-planning server 225 may analyze the data (stored in the database 226) relevant to the passenger's 163 proposed trip and determine if it will be faster and less congested for the passenger 163 to travel to a nearby station and/or use a different transit service. For example, a passenger may select a route using service "A" with a station that is only a 5-minute walk away from the passenger's current location. Based on the analysis of relevant trip-related data for the passenger, the trip-planning server 225 may determine that the station for service "A" in passenger's route is at capacity and a vehicle is not due to arrive at that station for the next 15 minutes. However, the server 225 also may determine that there is another station that is 10-minute walk away from the passenger's current location and that uses transit service "B", which will get the passenger as close to his/her destination as service "A" would. As a result, the dynamic trip-planning server 225 may notify this alternative travel option to the passenger through the passenger's mobile device (for example, as a text message) and offer the route to service "B". In another example, if the passenger's originally-selected station also provides service "B" and another vehicle (supporting service "B") will be available at the station before the arrival of the vehicle for service "A" and will get the passenger as close to his/her destination as the vehicle for service "A", then the server 225 may notify the passenger with this alternative vehicle choice at the passenger-selected station and also may offer the route to service "B" to enable the passenger to dynamically plan his/her itinerary.

Fraud Detection for Fare Inspectors

The operating configuration 229 of FIG. 16 may be used to accomplish fraud detection in a transit system. In one embodiment, the centralized fraud detection server 231 may utilize various sensors or system components shown in FIG. 16 for collecting and analyzing relevant data through sensor fusion. In particular embodiments, the fraud detection client 234 may be used by fare inspectors to flag fraud at specific stations and on specific vehicles based on the server's 231 analysis of real time data and historical data trends. The following methodology may be implemented in the transit system of FIG. 16 to facilitate fraud detection. Although the fraud detection server 231 is treated as a "control unit" in the discussion of FIG. 16 below, it is understood that the tasks performed by the server 231 may be performed by any other "control unit" discussed earlier.

1. Initially, the passenger 163 may enter the paid area 215 of the station 210 or the transit vehicle 212. The gateless entry system 199 or a 3D camera—such as, for example, the 3D camera 146—may detect the passenger's entry into the paid area and transmit this information to the fraud detection server 231.
2. The passenger 163 may enter the paid area 215 or the transit vehicle 212 either by means of a traditional fare (such as, for example, using a payment token or receipt, swiping a magnetic strip card or a smartcard, and the like) or using the earlier-discussed hands-free ticket validation approach. The paid area 215 may be gated or gateless. In one embodiment, if the passenger 163 enters the paid area 215 under a hands-free configuration (such as, for example, one of the hands-free configurations shown in the embodiments of FIGS. 11-12), the entry controller 148 in the gateless entry system 199 may detect that the passenger 163 has entered the paid area 215 and send a notification to the fraud detection server 231 that the passenger 163 is in the paid area 215 of the station 210 or on the transit vehicle 212, as applicable. The entry controller 148 also may send relevant passenger information such as, for example, a unique passenger ID, to the fraud detection server 231 to enable the server 231 to store the passenger's information in a passenger entity table (such as the Table-1 above) in the database 232. On the other hand, if the passenger 163 uses the traditional fare media, the 3D camera 146 (or other existing ticketing backend) may detect the passenger's entry into the paid area 215 and notify the fraud detection server 231 that the passenger has entered the paid area 215.
3. As noted in the preceding paragraph, the fraud detection server 231 may receive the notification that a passenger—such as the passenger 163—has entered the paid area 215 or the transit vehicle 212. Consequently, the server 231 may increment the corresponding "population" field in the vehicle table (such as the Table-2 above) stored in the database 232 for the transit vehicle 212 or the station "population" field in the station table (such as the Table-3 above) stored in the database 232 for the transit station 210.
4. As noted before, the fraud detection server 231 may receive a notification that the passenger 163 has entered the paid area 215 (or the transit vehicle 212) and may update the corresponding passenger information in a passenger entity table (such as the Table-1 above) in the database 232. In some embodiments, the server 231 also may update the number of paid passengers in either the station 210 or the vehicle 212 in appropriate data tables stored in the fraud detection database 232.
5. The fraud detection server 231 may compare the number of passengers detected in the paid area 215 or on the transit vehicle 212 (as reported, for example, by the gateless entry system 199 and/or the 3D camera(s) 146, 197) with the number of passengers who are reported to have actually paid the fare. As part of this comparison, the server 231 may consult appropriate data tables in the database 232 containing the relevant passenger counts. If more passengers were detected to have entered the paid area 215 (or the transit vehicle 212) than the number of paid passengers (who have actually paid the fare), the fraud detection server 231 may flag that a fraud has been detected at the corresponding station (for example, the station 210 in FIG. 16) or on the corresponding vehicle (for example, the vehicle 212 in FIG. 16). The "fraud detected" flag in the relevant station table or vehicle table, as applicable, in the database 232 also may be set by the server 231. Furthermore, in some embodiments, the fraud detection server 231 may report the detected fraud to the fraud detection client 234 through which the fare inspectors may be notified of the fraud at a particular station and/or vehicle. For example, in some embodiments, the fare inspectors may periodically access the client 234 for the most up-to-date status alerts about fraud issues in the transit system. The access may be remote, such as, for example, via the Internet. Alternatively, the client system 234 may be programmed or set up to provide automatic alerts—audible or visible or both—to the fraud inspectors or other service personnel when a fraud is detected at a transit station or a transit vehicle in the operator's transit network.
6. For fraud on vehicles, a CAD/AVL system—such as the system 202 in FIG. 16—on a vehicle may allow the fraud detection server 231 to determine the location of the vehicle so that fare inspectors can be dispatched to that location.

Dynamic Transit Vehicle Routing

The operating configuration 237 of FIG. 17 may be used to accomplish dynamic vehicle routing for transit vehicles in a transit system. In one embodiment, the centralized dynamic vehicle routing server 239 may utilize various sensors or system components shown in FIG. 17 for collecting and analyzing relevant data through sensor fusion. In particular embodiments, the dynamic vehicle routing client 242 may be used to automatically route autonomous transit vehicles to stations, notify transit vehicle drivers to stop at a particular station, and/or notify transit operators to route a vehicle to a particular station based on the server's 239 analysis of current and historical demand from passengers. The following methodology may be implemented in the transit system of FIG. 17 to facilitate dynamic vehicle routing. Although the dynamic vehicle routing server 239 is treated as a "control unit" in the discussion of FIG. 17 below, it is understood that the tasks performed by the server 239 may be performed by any other "control unit" discussed earlier.

1. Initially, the passenger 163 may select the desired destination on his/her mobile device 17. In one embodiment, a GPS and mapping application—such as, for example, a publicly-available routing/travel-planning application or the FV user app 12 (FIG. 2)—on the mobile device 17 may select the best route using public transit. The route may include information about the boarding station, the type of transit service, and the disembarking station.

2. The mobile device 17 may transmit the device-carrying passenger's GPS location, name or other identifying information of the boarding station, and estimated time of arrival (ETA) at the boarding station to a back-end server in the transit system, such as, for example, the vehicle routing server 239 in the embodiment of FIG. 17. As mentioned before, the mobile device 17 may be equipped with a location-tracking application that may obtain the device's GPS coordinates via the GPS satellite 220 or through the assistance from the cell tower 218.

3. The vehicle routing server 239 may add the passenger's transit information received from the mobile device 17 with a unique passenger ID to a passenger entity table (such as the Table-1 above) in the vehicle routing database 240. Each entry in the passenger table may be related either to a passenger en route to a transit station (such as the transit station 210 in FIG. 17) or to a passenger at the station 210, or to a passenger on a transit vehicle (such as the transit vehicle 212 in FIG. 17).

4. The vehicle routing server 239 may increment the number of passengers en route to the station 210 in the corresponding station table (such as the Table-3 above), along with each passenger's ETA.

5. When the passenger 163 enters the proximity of the station 210, the mobile device 17 (or, in some embodiments, the user app 12 on the mobile device 17) may be triggered due to the passenger's proximity to the station 210. As discussed earlier, such triggering may be based on either geographic (or GPS) region monitoring or BLE proximity beacon monitoring. Upon triggering, the mobile device 17 (or the user app 12 on the mobile device 17) may transmit a notification to the vehicle routing server 239, for example, via the combination of the cell tower 218 and the Internet 156.

6. The vehicle routing server 239 may update the station table (such as the Table-3 above) in the database 240 to indicate that another passenger (here, the passenger 163) is in proximity of the station 210.

7. The passenger 163 may enter the paid area 215 of the station 210 or the transit vehicle 212 either by means of a traditional fare (such as, for example, using a payment token or receipt, swiping a magnetic strip card or a smartcard, and the like) or using the earlier-discussed hands-free ticket validation approach. The paid area 215 may be gated or gateless. In one embodiment, if the passenger 163 enters the paid area 215 under a hands-free configuration (such as, for example, one of the hands-free configurations shown in the embodiments of FIGS. 11-12), the entry controller 148 in the gateless entry system 199 may send a notification to the vehicle routing server 239 that the passenger 163 is in the station 210. On the other hand, if the passenger 163 uses the traditional fare media, the 3D camera 146 may detect the passenger's entry into the paid area 215 and notify the vehicle routing server 239 that the passenger has entered the station 210.

8. As noted in the preceding paragraph, the vehicle routing server 239 may receive the notification that a passenger—such as the passenger 163—has entered the station 210. Regardless of the method of entry, the server 239 may increment the station population field in the station table in the database 240 by the number of passengers entering the paid area 215 of the station 210.

9. In particular embodiments, the transit vehicles in the transit system—such as the transit vehicle 212 in FIG. 17—may periodically transmit their locations to the dynamic vehicle routing server 239. A CAD/AVL system—such as the system 202 in FIG. 17—on a vehicle may provide the vehicle's current location to the server 239, which may then add this vehicle location information to the vehicle table (such as the Table-2 above) in the dynamic vehicle routing database 240.

10. The vehicle routing server 239 may analyze the number of passengers in the unpaid area 214 of the station 210, the number of passengers in the paid area 215 of the station 210, the number of passengers on their way to the station 210, and the nearest vehicle to the station 210. If the analysis shows that the demand is above a certain threshold and the nearest transit vehicle is in a reasonable vicinity to the station 210, then the dynamic routing server 239 may decide that the transit vehicle should be routed to the station 210 to meet the increased demand, even if the transit vehicle may not have been originally assigned to the station 210.

11. In one embodiment, a transit dispatcher may be notified of the routing server's 239 decision (mentioned in the preceding paragraph) through the centralized dynamic vehicle routing client 242. In turn, the dispatcher may take appropriate action to route the server-recommended vehicle to the station 210 that is experiencing a heavy demand for a particular transit service. If there is an on-board dynamic vehicle routing client, such as the client 243 in the transit vehicle 212 in FIG. 17, the transit vehicle driver may be notified of the routing server's 239 decision through a message display or audio-visual alert on the on-board client 243. In response, the driver may drive the vehicle to the station 210. If the vehicle is autonomous, the dynamic vehicle routing server 239 may command the autonomous vehicle to change its current route and drive to the station 210.

Thus, as discussed above, the vehicle routing server 239 may receive data from various sources/sensors in the transit system, combine and store the received data in corresponding tables in the database 240, continually update appropriate fields in the data tables with most recent data, and then analyze the system-wide data in the updated data fields to dynamically provide routing decisions for transit vehicles. For example, a transit bus may be driving along its route to station "A". However, the dynamic vehicle routing server 239 may receive information from various sensors in the system that there are no passengers waiting at station "A", but there are ten (10) passengers waiting at station "B" for the same transit service as that provided by the transit bus. Station "B" may be one block over from station "A", and it may cost the transit bus about 5 minutes of additional driving time on the route to station "B". Using pre-configured parameters set by the transit operator, the dynamic vehicle routing server 239 may decide that the bus should deviate from its planned route (to station "A)" and, instead, pick up the passengers at station "B". As a result, the routing server 239 may send a notification to an on-board client in the bus that displays a message to the bus driver to re-route and drive the bus to station "B".

As another example, an autonomously-driven transit bus may be parked within one (1) mile of station "A". The dynamic vehicle routing server 239 may detect that a passenger is on his/her way to the station "A" and it will take the passenger about 10 minutes to reach station "A". Using pre-configured parameters set by the transit operator, the dynamic vehicle routing server 239 may decide that the autonomous bus should pick up the passenger at station "A" in 10 minutes. The server 239 may then send a command to the autonomous bus to drive to station "A" and be at the station in 10 minutes. The autonomous bus may calculate its ETA based on live traffic data and determine that it will take 5 minutes to arrive at station "A". The bus may start driving to station "A" six (6) minutes before the passenger's ETA at station "A" in order to provide a margin for unexpected traffic and give the passenger time to cancel his/her planned trip. The autonomous bus arrives at station "A" one (1) minute before the passenger arrives and waits there for the passenger. When the passenger arrives at station "A", the bus is already parked there, allowing the passenger to board the bus. This is an example of how the vehicle routing server 239 can manage the transit routes of autonomous vehicles as well.

Figure 18:
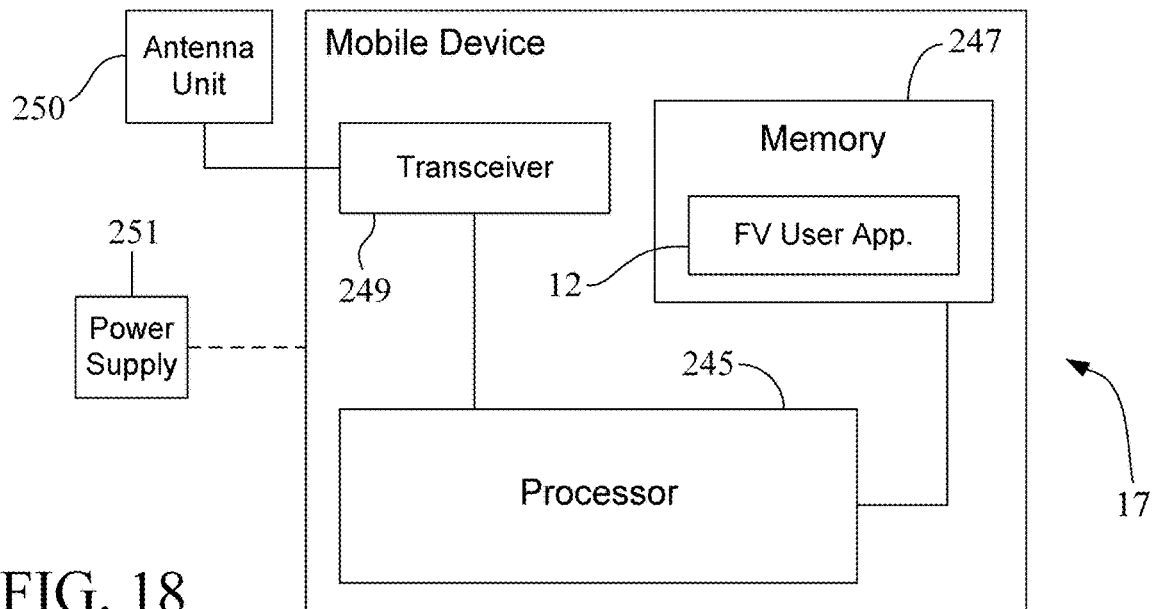
FIG. 18 is a block diagram of an exemplary mobile device according to one embodiment of the present disclosure.

FIG. 18 is a block diagram of an exemplary mobile device 17 according to one embodiment of the present disclosure. As noted earlier, the mobile or wireless device 17 may be a UE, a smartphone, or any other wireless device operable for hands-free fare validation and other transit applications as per particular embodiments of the present disclosure. The wireless device 17 may include a processor 245, a memory 247 (which may, in some embodiments, also include memory on UE's Subscriber Identity Module (SIM) card), a transceiver 249, and an antenna unit 250. The memory 247 may include the program code for the FV user app 12. The program code may be executed by the processor 245, which, in one embodiment, may be similar to the CPU 22 in FIG. 2. Upon execution of the user app's program code by the processor 245, the processor may configure the mobile device 17 to perform various mobile device-specific tasks associated with the hands-free fare validation and gateless entry/exit methodologies as per the teachings of the present disclosure. In one embodiment, such tasks may include, for example, the process steps illustrated in FIG. 3 and/or the process steps illustrated in FIG. 9. Such tasks also may include, for example, mobile device-specific (or FV user app-based) operations discussed earlier.

The memory 247 may store data or other related communications received from the controller unit 18 (FIG. 2) or the controller unit 148 (in case of a gateless environment in FIGS. 11-12) as well as other content needed to facilitate hands-free fare validation and/or gateless entry/exit. For example, in one embodiment, the memory 247 may store, for example, pre-purchased electronic ticket(s), itinerary information, electronic purchase receipts, Bluetooth beacon ID, and the like. The memory 247 also may store results of fare validation (for example, ticket activation status, valid/invalid transaction, and the like) received from the controller unit 18 (or the controller unit 148) as well as entry/exit notifications for the user. In the embodiments of FIGS. 14-17, the memory 247 may store the relevant content, such as the mobile device's GPS location, for transmission to the respective server or control unit (discussed with reference to FIG. 13).

The transceiver 249 may communicate with the processor 245 to perform transmission/reception of data, control, or other signaling information (via the antenna unit 250) to/from the controller unit 18 (or the controller unit 148) with which the mobile device 17 may be in communication during hands-free fare validation or gateless entry/exit. In the embodiments of FIGS. 14-17, the mobile device 17 may perform communication with the respective "control unit" (discussed with reference to FIG. 13) or application-specific server, such as the capacity management server 204 in FIG. 14. In particular embodiments, the transceiver 249 may support the Bluetooth based—such as, for example, the Bluetooth LE-based—communication with the controller unit 18 (or the controller unit 148) to implement the hands-free fare validation methodology (and also the gateless entry methodology in some embodiments) as per the teachings of the present disclosure. The transceiver 249 may be a single unit or may comprise of two separate units—a transmitter (not shown) and a receiver (not shown). The antenna unit 250 may include one or more antennas. Alternative embodiments of the wireless device 17 may include additional components responsible for providing additional functionality, including any of the functionality identified herein, such as, for example, receiving Bluetooth beacon signals, transmitting electronic ticket information, communicating with the controller unit 18 (or the controller unit 148), displaying various notifications or messages to the user of the device 17, etc., and/or any functionality necessary to support the solutions as per the teachings of the present disclosure. For example, in one embodiment, the wireless device 17 may also include an on-board power supply unit 251 (e.g., a battery or other source of power) to allow the device to be operable in a mobile manner.

In one embodiment, the mobile device 17 may be configured (in hardware, via software, or both) to implement device-specific aspects of hands-free fare validation and gateless entry/exit as per teachings of the present disclosure. As noted before, the software or program code may be part of the FV user app 12 and may be stored in the memory 247 and executable by the processor 245. For example, when existing hardware architecture of the device 17 cannot be modified, the functionality desired of the device 17 may be obtained through suitable programming of the processor 245 using the program code of the FV user app 12. The execution of the program code (by the processor 245) may cause the processor to perform as needed to support the hands-free fare validation, gateless entry/exit, and other transit-related aspects as per the teachings of the present disclosure. Thus, although the wireless device 17 may be referred to as "performing," "accomplishing," or "carrying out" (or similar such other terms) a function/task or a process or a method step, such performance may be technically accomplished in hardware and/or software as desired.

FIG. 19 depicts a block diagram of an exemplary computing unit 253 according to one embodiment of the present disclosure. The computing unit or system 253 represents any of the earlier-discussed controller unit 18 (FIG. 2), the controller unit 148 (FIGS. 11-12), the control unit (FIGS. 10 and 13), or any of the application-specific servers 204, 225, 231, 239 (FIGS. 14-17, respectively). In some embodiments, the computing unit 253 may represent the architecture of non-server devices in FIGS. 14-17 as well—such as, for example, the capacity management client 207 or the fraud detection client 234, and the like. The computing unit 253 may be suitably configured—in hardware and/or software—to implement the hands-free fare validation methodology, the gateless entry/exit methodology, and/or one or more of the transit applications in FIGS. 14-17 according to the teachings of the present disclosure. The computing unit 253 may include a processor 255 and ancillary hardware to accomplish hands-free fare validation, gateless entry/exit, and/or transit applications-related tasks in FIGS. 14-17 discussed before. In one embodiment, the processor 255 may be similar to the CPU 30 in FIG. 2. The processor 255 may be configured to interface with a number of external devices. In one embodiment, a number of input devices 257 may be part of the system 253 and may provide data inputs—such as user input, camera images, statistical data, and the like—to the processor 255 for further processing. The input devices 257 may include, for example, a touchpad, a camera, a proximity sensor, a GPS sensor, a computer keyboard, a touch-screen, a joystick, a physical or virtual "clickable button," a computer mouse/pointing device, and the like. In FIG. 19, the processor 255 is shown coupled to a system memory 259, a peripheral storage unit 261, one or more output devices 262, and a network interface unit 264. A display screen is an example of an output device 262. In some embodiments, the computing unit 253 may include more than one instance of the devices (or components) shown. In various embodiments, all of the components shown in FIG. 19 may be housed within a single housing. In other embodiments, the computing unit 253 may not include all of the components shown in FIG. 19. Furthermore, the computing unit 253 may be configured as a standalone system, as a server system, as a client system, or in any other suitable form factor (including a distributed processing system).

In particular embodiments, the computing unit 253 may include more than one processor (e.g., in a distributed processing configuration). When the computing unit 253 is a multiprocessor system, there may be more than one instance of the processor 255 or there may be multiple processors coupled to the processor 255 via their respective interfaces (not shown). The processor 255 may be a System on Chip (SoC) and/or may include more than one Central Processing Units (CPUs).

The system memory 259 may be any semiconductor-based storage system such as, for example, Dynamic Random Access Memory (DRAM), Static RAM (SRAM), Synchronous DRAM (SDRAM), Rambus® DRAM, flash memory, various types of Read Only Memory (ROM), and the like. In some embodiments, the system memory 259 may include multiple different types of semiconductor memories, as opposed to a single type of memory. In other embodiments, the system memory 259 may be a non-transitory data storage medium.

The peripheral storage unit 261, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, Secure Digital (SD) memory cards, Universal Serial Bus (USB) memories, and the like. In some embodiments, the peripheral storage unit 261 may be coupled to the processor 255 via a standard peripheral interface such as a Small Computer System Interface (SCSI) interface, a Fibre Channel interface, a Firewire® (IEEE 1394) interface, a Peripheral Component Interface Express (PCI Express™) standard based interface, a USB protocol based interface, or another suitable interface. Various such storage devices may be non-transitory data storage media. In certain embodiments, one or more databases 205, 226, 232, and 240 in FIGS. 14-17, respectively, may be integral to the computing unit 253 as part of the peripheral storage 261.

As mentioned earlier, a display screen may be an example of the output device 262. Other examples of an output device include a graphics/display device, a computer screen, an alarm system, or any other type of data output device. In some embodiments, the input device(s) 257 and the output device(s) 262 may be coupled to the processor 255 via an I/O or peripheral interface(s).

In one embodiment, the network interface unit 264 may communicate with the processor 255 to enable the computing unit 253 to couple to a network or a communication interface. In another embodiment, the network interface unit 264 may be absent altogether. The network interface 264 may include any suitable devices, media and/or protocol content for connecting the computing unit 253 to a network/interface—whether wired or wireless. In various embodiments, the network may include Local Area Networks (LANs), Wide Area Networks (WANs), wired or wireless Ethernet, telecommunication networks, or other suitable types of networks/interfaces. For example, the network may be a packet-switched network such as, for example, an Internet Protocol (IP) network like the Internet, a circuit-switched network, such as the Public Switched Telephone Network (PSTN), or a combination of packet-switched and circuit-switched networks. In another embodiment, the network may be an IP Multimedia Subsystem (IMS) based network, a satellite-based communication link, a Bluetooth or Bluetooth LE (BLE) based network/interface, an NFC based network/interface, a Worldwide Interoperability for Microwave Access (WiMAX) system based on Institute of Electrical and Electronics Engineers (IEEE) standard IEEE 802.16e, an IP-based cellular network such as, for example, a Third Generation Partnership Project (3GPP) or 3GPP2 cellular network like a Long Term Evolution (LTE) network, a combination of cellular and non-cellular networks, a proprietary corporate network, a Public Land Mobile Network (PLMN), an Ethernet connection, and the like.

The computing unit 253 may include an on-board power supply unit 265 to provide electrical power to various system components illustrated in FIG. 19. The power supply unit 265 may receive batteries or may be connectable to an AC electrical power outlet. In one embodiment, the power supply unit 265 may convert solar energy or other renewable energy into electrical power.

In one embodiment, a non-transitory, computer-readable data storage medium, such as, for example, the system memory 259 or a peripheral data storage unit, such as a removable memory, may store program code or software for the FV controller driver 14. In the embodiment of FIG. 19, the system memory 194 is shown to include such program code, as indicated by a dotted block with reference numeral "14". The processor 255 may be configured to execute the program code, whereby the computing unit 253 may be operative to perform various control tasks associated with the hands-free fare validation methodology and/or the gateless entry/exit methodology as per the teachings of the present disclosure. In one embodiment, such tasks may include, for example, some or all of the process steps illustrated in any of the FIGS. 4 and 10. Such tasks also may include, for example, relevant controller driver-based operations discussed earlier with reference to FIGS. 5-17. The program code or software may be proprietary software or open source software which, upon execution by the processor 255, may enable the computing unit 253 to perform controller unit-specific operations to support the hands-free fare validation and gateless entry/exit aspects as per teachings of the present disclosure as well as to support other related actions (such as, for example, operating in the maintenance mode). In certain embodiments, the program code for the FV controller driver 14 may operate in conjunction with additional program code in the memory 259 to enable the computing unit 253 to perform the control unit-related tasks discussed with reference to FIG. 13 or various information handling tasks (including data collection, analysis, and processing tasks) of one or more of the servers—such as, for example, the capacity management server 204, the dynamic trip planning server 225, and so on—discussed with reference to FIGS. 14-17.

In the preceding description, for purposes of explanation and not limitation, specific details are set forth (such as particular architectures, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Thus, for example, it will be appreciated by those skilled in the art that block diagrams herein (e.g., in FIGS. 2 and 18-19) can represent conceptual views of illustrative circuitry or other functional units embodying the principles of the technology. Similarly, it will be appreciated that the flowcharts in FIGS. 3-4, 9-10, and 13 represent various processes which may be substantially performed by a respective processor (e.g., the processor 245 in FIG. 18 or the processor 255 in FIG. 19, as applicable). Such a processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 1-17 also may be provided by a respective processor 245 or 255, in the hardware and/or software. Any of the processors 245 and 255 may employ distributed processing in certain embodiments.

When certain inventive aspects require software-based processing, such software or program code may reside in a computer-readable data storage medium. As noted earlier with reference to FIG. 19, such data storage medium may be part of the peripheral storage 261, or may be part of the system memory 259, or the processor's 255 internal memory (not shown). In case of the embodiment in FIG. 18, such data storage medium may be part of the memory 247 or the processor's 245 internal memory (not shown). In certain embodiments, the processors 245 and 255 may execute instructions stored on a respective such medium to carry out the software-based processing. The computer-readable data storage medium may be a non-transitory data storage medium containing a computer program, software, firmware, or microcode for execution by a general purpose computer or a processor mentioned above. Examples of computer-readable storage media include a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the computing unit 253 according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various FV controller driver-based functions and FV user app-based functions discussed herein may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a transit system in which various sensors may collect and/or generate data points that can be analyzed to provide automated features in the transit system such as, for example: (i) automatic capacity management of a transit station and/or a transit vehicle to alert a transit operator of potential capacity issues in advance to enable the operator to handle the situation before the station or the vehicle reaches its capacity limit, (ii) automatic trip planning for a passenger to enable the passenger to dynamically plan the fastest route to a destination according to real time data and historical data trends, (iii) automatic fraud detection in the transit system to alert a fare inspector to a ticket fraud or other fraudulent activity at a specific transit station or on a specific transit vehicle, and (iv) automatic vehicle routing in the transit system to automatically (and dynamically) route autonomous transit vehicles to stations, notify transit vehicle drivers to stop at a particular station, and/or notify transit operators to route a vehicle to a particular station based on current and historical demand from passengers.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a control unit associated with a mass transit system, the method comprising:
  receiving, by the control unit, sensor data from a plurality of sensors in the mass transit system, wherein the control unit is electrically communicatively coupled with the sensors, and wherein the sensor data include:
   a sensor-specific passenger data from each sensor in a first set of sensors in the plurality of sensors, wherein the sensor-specific passenger data defines one or more attributes of a user availing a transit service in the mass transit system,
   a sensor-specific vehicle data from each sensor in a second set of sensors in the plurality of sensors, wherein the sensor-specific vehicle data defines one or more attributes of a transit vehicle associated with the transit service, and
   a sensor-specific station data from each sensor in a third set of sensors in the plurality of sensors, wherein the sensor-specific station data defines one or more attributes of a transit station associated with the transit service, wherein each sensor in the third set of sensors is installed at the transit station and the transit station is stationary;
  combining, by the control unit, received sensor-specific passenger data to generate a system-specific passenger data, received sensor-specific vehicle data to generate a system-specific vehicle data, and received sensor-specific station data to generate a system-specific station data;

analyzing, by the control unit, the system-specific passenger data, the system-specific vehicle data, and the system-specific station data; and performing, by the control unit, at least one of the following based on the analysis of the system-specific passenger data, the system-specific vehicle data, and the system-specific station data:
- facilitating management of passenger-handling capacity of at least one of the transit station and the transit vehicle,
- dynamically planning a trip for the user availing the transit service,
- facilitating detection of fraud for the transit service, and
- dynamically planning a route for the transit vehicle.

2. The method of claim 1, wherein the plurality of sensors includes two or more of the following:
- a Global Positioning System (GPS) sensor;
- a Bluetooth Low Energy (BLE) beacon sensor;
- a positioning unit including a BLE receiver and a positioning engine for determining position of a mobile device carried by the user;
- an object detection camera;
- a fare payment monitor; and
- a location tracker on the transit vehicle.

3. The method of claim 1, wherein the sensor-specific passenger data includes one or more of the following attributes:
- a unique ID assigned to the user;
- a geographical location of the user;
- an Estimated Time of Arrival (ETA) of the user at a first transit station for boarding the transit vehicle;
- a first identifier for the first transit station, wherein the first transit station is stationary;
- a second identifier for a second transit station where the user is scheduled to disembark the transit vehicle and wherein the second transit station is stationary;
- a first flag for indicating that the user is in proximity of the first transit station;
- a second flag for indicating that the user is inside the first transit station; and
- a third flag for indicating that the user is inside the transit vehicle.

4. The method of claim 1, wherein the sensor-specific vehicle data includes one or more of the following attributes:
- a unique ID assigned to the transit vehicle;
- a first value indicating a maximum number of passengers the transit vehicle can carry;
- a second value indicating a number of passengers currently on the transit vehicle;
- identifiers for transit stations where the transit vehicle stops along the route;
- a transit station-specific Estimated Time of Arrival (ETA) of the transit vehicle for the transit stations along the route;
- a geographical location of the transit vehicle; and
- a flag for indicating that the transit vehicle is currently at full capacity.

5. The method of claim 1, wherein the sensor-specific station data includes one or more of the following attributes:
- a unique ID assigned to the transit station;
- a first value indicating a maximum number of passengers that can be present at the transit station at a given time;
- a second value indicating a number of passengers currently present at the transit station; and
- a third value indicating a number of passengers on way to the transit station.

6. The method of claim 1, wherein said combining includes:
- establishing, by the control unit, a first plurality of data fields in a database, wherein each data field in the first plurality of data fields corresponds to a distinct attribute of the user;
- establishing, by the control unit, a second plurality of data fields in the database, wherein each data field in the second plurality of data fields corresponds to a distinct attribute of the transit vehicle;
- establishing, by the control unit, a third plurality of data fields in the database, wherein each data field in the third plurality of data fields corresponds to a distinct attribute of the transit station;
- populating, by the control unit, a first data field in the first plurality of data fields with the sensor-specific passenger data corresponding to a user attribute associated with the first data field being populated;
- populating, by the control unit, a second data field in the second plurality of data fields with the sensor-specific vehicle data corresponding to a transit vehicle attribute associated with the second data field being populated; and
- populating, by the control unit, a third data field in the third plurality of data fields with the sensor-specific station data corresponding to a transit station attribute associated with the third data field being populated.

7. The method of claim 1, wherein said analyzing includes performing, by the control unit, the following data point determinations:
- using the system-specific passenger data to determine a first number of users approaching the transit station, a second number of users currently present at the transit station, a third number of users to be embarking the transit vehicle, a fourth number of users to be disembarking the transit vehicle, and an estimated time of arrival for each user approaching the transit station,
- using the system-specific vehicle data to determine a fifth number of users currently present inside the transit vehicle, an estimated time of arrival of the transit vehicle at the transit station, and passenger-handling capacity of the transit vehicle, and
- using the system-specific station data to determine a sixth number of users currently present at the transit station and passenger-handling capacity of the transit station; and wherein facilitating management of passenger-handling capacity includes performing, by the control unit, at least one of the following based on the data point determinations:
- determining that the transit station is currently operating at capacity,
- predicting when the transit station will be operating at capacity,
- determining that the transit vehicle is currently operating at capacity, and
- predicting when the transit vehicle will be operating at capacity.

8. The method of claim 1, wherein dynamically planning a trip includes performing at least one of the following:
- recommending, by the control unit, a different transit vehicle to the user;

recommending, by the control unit, a different transit station to the user; and recommending, by the control unit, a different transit service to the user.

9. The method of claim 1, wherein said analyzing includes performing the following by the control unit:
determining a first number of users who have actually paid for the transit service,
determining a second number of users who are present in an area of the transit station designated for users who have paid for the transit service, and
determining a third number of users who are inside the transit vehicle; and
wherein facilitating detection of fraud includes performing one of the following by the control unit:
comparing the first, the second, and the third numbers to indicate that a fare fraud is detected for the transit vehicle, and
comparing the first, the second, and the third numbers to indicate that a fare fraud is detected at the transit station.

10. The method of claim 1, wherein said analyzing includes performing, by the control unit, the following data point determinations:
using the system-specific passenger data to determine a first number of users approaching the transit station, a second number of users currently present at the transit station, a third number of users to be embarking the transit vehicle, and an estimated time of arrival for each user approaching the transit station,
using the system-specific vehicle data to determine a fifth number of users currently present inside the transit vehicle, a current location of the transit vehicle, an estimated time of arrival of the transit vehicle at the transit station, and passenger-handling capacity of the transit vehicle, and
using the system-specific station data to determine a sixth number of users currently present at the transit station and passenger-handling capacity of the transit station; and
wherein dynamically planning a route includes performing, by the control unit, at least one of the following based on the data point determinations:
recommending a different transit station for the transit vehicle,
recommending a different transit vehicle to be sent to the transit station, and
recommending a modified time of arrival of the transit vehicle at the transit station.

11. A control unit associated with a mass transit system, wherein the control unit comprises:
an interface unit for receiving sensor data from a plurality of sensors in the mass transit system, wherein the control unit is electrically communicatively coupled with the sensors, and wherein the sensor data include:
a sensor-specific passenger data from each sensor in a first set of sensors in the plurality of sensors, wherein the sensor-specific passenger data defines one or more attributes of a user availing a transit service in the mass transit system,
a sensor-specific vehicle data from each sensor in a second set of sensors in the plurality of sensors, wherein the sensor-specific vehicle data defines one or more attributes of a transit vehicle associated with the transit service, and
a sensor-specific station data from each sensor in a third set of sensors in the plurality of sensors, wherein the sensor-specific station data defines one or more attributes of a transit station associated with the transit service, and wherein each sensor in the third set of sensors is installed at the transit station and the transit station is stationary;
a memory for storing program instructions and the sensor data received by the interface unit; and
a processor coupled to the interface unit and to the memory, wherein the processor is operable to execute the program instructions, which, when executed by the processor, cause the control unit to:
combine received sensor-specific passenger data to generate a system-specific passenger data, received sensor-specific vehicle data to generate a system-specific vehicle data, and received sensor-specific station data to generate a system-specific station data,
analyze the system-specific passenger data, the system-specific vehicle data, and the system-specific station data, and
perform at least one of the following based on the analysis of the system-specific passenger data, the system-specific vehicle data, and the system-specific station data:
facilitate management of passenger-handling capacity of at least one of the transit station and the transit vehicle,
dynamically plan a trip for the user availing the transit service,
facilitate detection of fraud for the transit service, and
dynamically plan a route for the transit vehicle.

12. The control unit of claim 11, wherein the program instructions, when executed by the processor, cause the control unit to carry out the following data point determinations:
use the system-specific passenger data to determine a first number of users approaching the transit station, a second number of users currently present at the transit station, a third number of users to be embarking the transit vehicle, a fourth number of users to be disembarking the transit vehicle, and an estimated time of arrival for each user approaching the transit station;
use the system-specific vehicle data to determine a fifth number of users currently present inside the transit vehicle, an estimated time of arrival of the transit vehicle at the transit station, and passenger-handling capacity of the transit vehicle;
use the system-specific station data to determine a sixth number of users currently present at the transit station and passenger-handling capacity of the transit station; and
perform at least one of the following based on the data point determinations to facilitate management of passenger-handling capacity:
determine that the transit station is currently operating at capacity,
predict when the transit station will be operating at capacity,
determine that the transit vehicle is currently operating at capacity, and
predict when the transit vehicle will be operating at capacity.

13. The control unit of claim 11, wherein the program instructions, when executed by the processor, cause the control unit to perform at least one of the following to dynamically plan a trip for the user:

recommend a different transit vehicle to the user;
recommend a different transit station to the user; and
recommend a different transit service to the user.

14. The control unit of claim 11, wherein the program instructions, when executed by the processor, cause the control unit to:
   determine a first number of users who have actually paid for the transit service;
   determine a second number of users who are present in an area of the transit station designated for users who have paid for the transit service;
   determine a third number of users who are inside the transit vehicle; and
   perform one of the following to facilitate detection of fraud:
      compare the first, the second, and the third numbers to indicate that a fare fraud is detected for the transit vehicle, and
      compare the first, the second, and the third numbers to indicate that a fare fraud is detected at the transit station.

15. The control unit of claim 11, wherein the program instructions, when executed by the processor, cause the control unit to carry out the following data point determinations:
   use the system-specific passenger data to determine a first number of users approaching the transit station, a second number of users currently present at the transit station, a third number of users to be embarking the transit vehicle, and an estimated time of arrival for each user approaching the transit station;
   use the system-specific vehicle data to determine a fifth number of users currently present inside the transit vehicle, a current location of the transit vehicle, an estimated time of arrival of the transit vehicle at the transit station, and passenger-handling capacity of the transit vehicle;
   use the system-specific station data to determine a sixth number of users currently present at the transit station and passenger-handling capacity of the transit station; and
   perform at least one of the following based on the data point determinations to dynamically plan a route for the transit vehicle:
      recommend a different transit station for the transit vehicle,
      recommend a different transit vehicle to be sent to the transit station, and
      recommend a modified time of arrival of the transit vehicle at the transit station.

16. The control unit of claim 11, wherein the sensor-specific passenger data includes one or more of the following attributes:
   a unique ID assigned to the user;
   a geographical location of the user;
   an Estimated Time of Arrival (ETA) of the user at a first transit station for boarding the transit vehicle;
   a first identifier for the first transit station, wherein the first transit station is stationary;
   a second identifier for a second transit station where the user is scheduled to disembark the transit vehicle and wherein the second transit station is stationary;
   a first flag for indicating that the user is in proximity of the first transit station;
   a second flag for indicating that the user is inside the first transit station; and
   a third flag for indicating that the user is inside the transit vehicle.

17. The control unit of claim 11, wherein the sensor-specific vehicle data includes one or more of the following attributes:
   a unique ID assigned to the transit vehicle;
   a first value indicating a maximum number of passengers the transit vehicle can carry;
   a second value indicating a number of passengers currently on the transit vehicle;
   identifiers for transit stations where the transit vehicle stops along the route;
   a transit station-specific Estimated Time of Arrival (ETA) of the transit vehicle for the transit stations along the route;
   a geographical location of the transit vehicle; and
   a flag for indicating that the transit vehicle is currently at full capacity.

18. The control unit of claim 11, wherein the sensor-specific station data includes one or more of the following attributes:
   a unique ID assigned to the transit station;
   a first value indicating a maximum number of passengers that can be present at the transit station at a given time;
   a second value indicating a number of passengers currently present at the transit station; and
   a third value indicating a number of passengers on way to the transit station.

19. A transit system for mass transit comprising:
   a plurality of sensors to provide sensor data, wherein the plurality of sensors includes a first set of sensors, a second set of sensors, and a third set of sensors; and
   a control unit that is electrically communicatively coupled with the sensors and adapted to implement a method comprising:
      receiving the sensor data from the plurality of sensors, wherein the sensor data include:
         a sensor-specific passenger data from each sensor in the first set of sensors, wherein the sensor-specific passenger data defines one or more attributes of a user availing a transit service in the mass transit system,
         a sensor-specific vehicle data from each sensor in the second set of sensors, wherein the sensor-specific vehicle data defines one or more attributes of a transit vehicle associated with the transit service, and
         a sensor-specific station data from each sensor in the third set of sensors, wherein the sensor-specific station data defines one or more attributes of a transit station associated with the transit service, and wherein each sensor in the third set of sensors is installed at the transit station;
      combining received sensor-specific passenger data to generate a system-specific passenger data, received sensor-specific vehicle data to generate a system-specific vehicle data, and received sensor-specific station data to generate a system-specific station data;
      analyzing the system-specific passenger data, the system-specific vehicle data, and the system-specific station data; and
      performing at least one of the following based on the analysis of the system-specific passenger data, the system-specific vehicle data, and the system-specific station data:

facilitating management of passenger-handling capacity of at least one of the transit station and the transit vehicle, dynamically planning a trip for the user availing the transit service, facilitating detection of fraud for the transit service, and dynamically planning a route for the transit vehicle.

20. The system of claim 19, wherein the plurality of sensors includes two or more of the following:

a Global Positioning System (GPS) sensor;

a Bluetooth Low Energy (BLE) beacon sensor;

a positioning unit including a BLE receiver and a positioning engine for determining position of a mobile device carried by the user;

an object detection camera;

a fare payment monitor; and a location tracker on the transit vehicle.

* * * * *